US012158723B2

(12) United States Patent
Miyashita et al.

(10) Patent No.: US 12,158,723 B2
(45) Date of Patent: Dec. 3, 2024

(54) IMAGE FORMING APPARATUS HAVING WIDTHWISELY EXTENDING EXHAUST FAN

(71) Applicant: CANON KABUSHIKI KAISHA, Tokyo (JP)

(72) Inventors: Takehiro Miyashita, Kanagawa (JP); Takeo Kawanami, Kanagawa (JP); Ryosuke Takahashi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/335,693

(22) Filed: Jun. 15, 2023

(65) Prior Publication Data

US 2023/0418224 A1 Dec. 28, 2023

(30) Foreign Application Priority Data

Jun. 22, 2022 (JP) ................................ 2022-100037
Jun. 22, 2022 (JP) ................................ 2022-100483
May 10, 2023 (JP) ................................ 2023-077857

(51) Int. Cl.
*G03G 21/00* (2006.01)
*G03G 21/20* (2006.01)

(52) U.S. Cl.
CPC ... *G03G 21/206* (2013.01); *G03G 2221/1645* (2013.01)

(58) Field of Classification Search
CPC ..................... G03G 21/206; G03G 2221/1645
See application file for complete search history.

(56) References Cited

U.S. PATENT DOCUMENTS 9,377,750 B2 6/2016 Takahashi .............. G03G 21/00
9,546,693 B2 1/2017 Matsumoto et al. .. G03G 21/16
9,822,822 B2 11/2017 Matsumoto et al. .. G03G 21/16
10,289,055 B2 5/2019 Koyama et al. ....... G03G 15/00
10,775,719 B2 * 9/2020 Sakamoto ............ G03G 21/206
11,048,204 B2 6/2021 Sawashima et al. .. G03G 21/16
11,524,852 B2 12/2022 Hayashi et al. ......... B65H 1/26
2014/0147160 A1 * 5/2014 Konishi ............... G03G 21/206 399/92
2016/0349701 A1 12/2016 Masuta et al. ....... G03G 21/206
2022/0057748 A1 * 2/2022 Yuzawa ............... G03G 21/206
2022/0365481 A1 * 11/2022 Watanabe ............ G03G 21/206
(Continued)

FOREIGN PATENT DOCUMENTS

JP H06-317 1/1994
JP H10-307525 11/1998
(Continued)

*Primary Examiner* — Sophia S Chen
(74) *Attorney, Agent, or Firm* — Venable LLP

(57) ABSTRACT

An image forming apparatus forming an image on a sheet conveyed in a sheet conveyance direction includes a frame including a first side plate and a second side plate disposed in parallel in a width direction orthogonal to the sheet conveyance direction, an intake unit disposed on an outer side of the frame in the width direction and configured to draw air into an interior of the frame, an exhaust unit disposed between the first side plate and the second side plate and configured to discharge air outside of the frame, and a cooling object unit disposed on a path of the air which is drawn into the interior of the frame by the intake unit and moves toward the exhaust unit.

18 Claims, 37 Drawing Sheets

(56) References Cited

U.S. PATENT DOCUMENTS

| | | | | |
|---|---|---|---|---|
| 2023/0053404 | A1 | 2/2023 | Hayashi et al. | B65H 1/26 |
| 2023/0176521 | A1* | 6/2023 | Kawanami | G03G 21/206<br>399/92 |
| 2023/0305483 | A1* | 9/2023 | Takayama | G03G 21/206 |
| 2023/0408969 | A1* | 12/2023 | Noda | G03G 21/206 |

FOREIGN PATENT DOCUMENTS

| | | |
|---|---|---|
| JP | 2016-218333 | 12/2016 |
| JP | 2017-040748 | 2/2017 |

* cited by examiner

FIG.15A
FIG.15B
FIG.15C
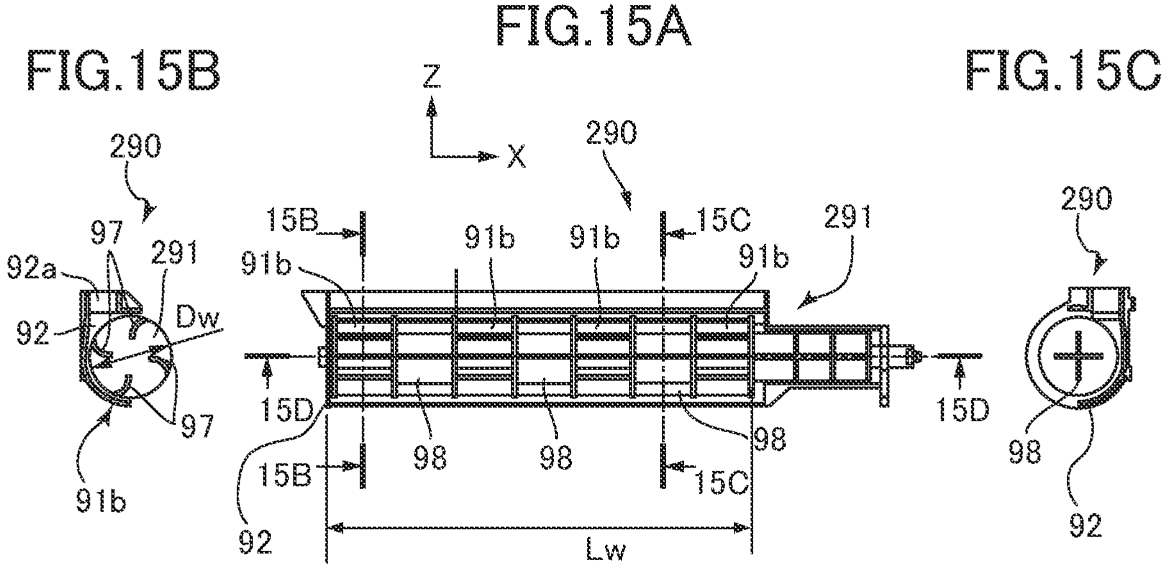
FIG.15D
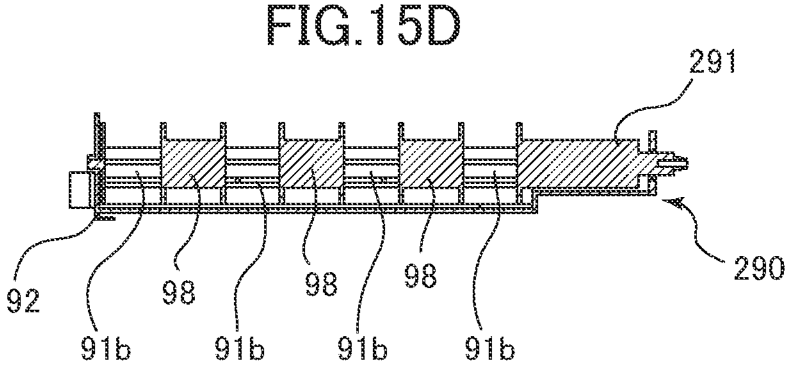

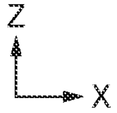
FIG.16A
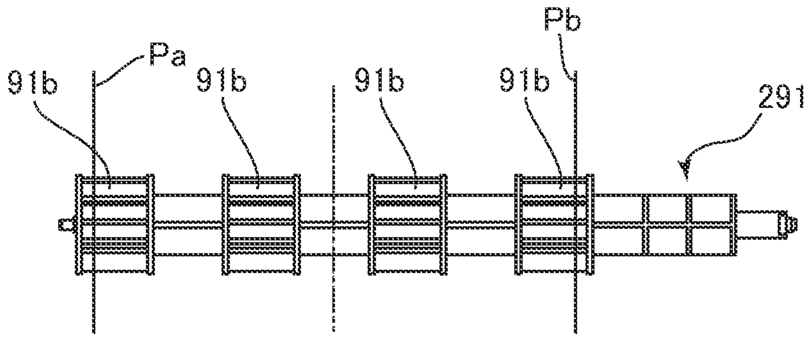
FIG.16B
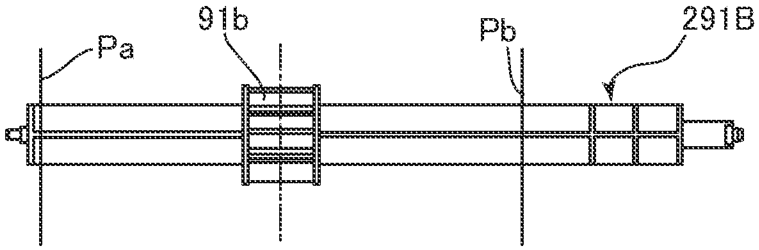
FIG.16C
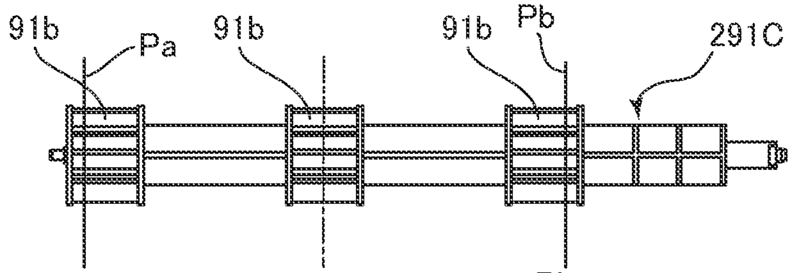
FIG.16D
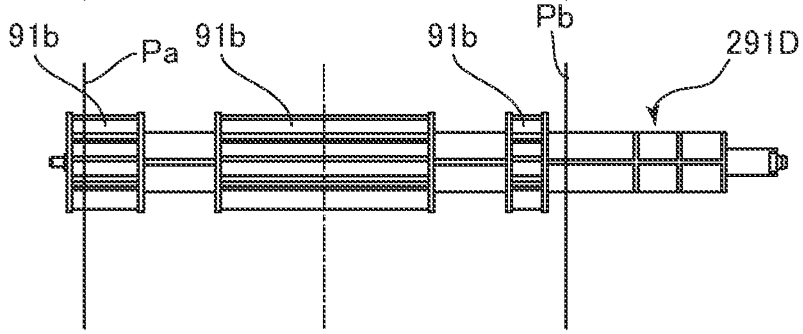

C-C

IMAGE FORMING APPARATUS HAVING WIDTHWISELY EXTENDING EXHAUST FAN

BACKGROUND OF THE INVENTION

Field of the Invention

This disclosure relates to an image forming apparatus forming an image on a sheet.

Description of the Related Art

Japanese Patent Laid-Open No. 2016-218333 proposes an image forming apparatus including a fixing unit fixing a toner image transferred onto a sheet, and a cooling unit arranged above the fixing apparatus. The cooling apparatus includes a drive motor, a cylindrically shaped fan body, which is driven by the drive motor and in which a plurality of blades are disposed around a shaft, and a housing rotatably supporting the fan body. A blower port is disposed in the housing, and a direction of the blower port is switched by rotating the housing using a switching motor. The blower port is, in a normal state, directed toward a reverse conveyance path through which the sheet passes at the time of printing on both surfaces of the sheet, and, in a case where a temperature of a heating roller of the fixing unit has risen excessively, is directed toward the fixing unit.

However, since the colling unit described in Japanese Patent Laid-Open No. 2016-218333 includes a mechanism for rotating the housing to switch the blower port, there was a problem of being large and costly.

SUMMARY OF THE INVENTION

According to one aspect of the present invention, an image forming apparatus forming an image on a sheet conveyed in a sheet conveyance direction includes a frame including a first side plate and a second side plate disposed in parallel in a width direction orthogonal to the sheet conveyance direction, an intake unit disposed on an outer side of the frame in the width direction and configured to draw air into an interior of the frame, an exhaust unit disposed between the first side plate and the second side plate and configured to discharge air outside of the frame, and a cooling object unit disposed on a path of the air which is drawn into the interior of the frame by the intake unit and moves toward the exhaust unit.

Further features of the present invention will become apparent from the following description of exemplary embodiments with reference to the attached drawings.

BRIEF DESCRIPTION OF THE DRAWINGS

FIG. 15A is a front view illustrating an exhaust unit of a second embodiment.

FIG. 15B is a cross-sectional view illustrating a cross section 15B-15B of FIG. 15A.

FIG. 15C is a cross-sectional view illustrating a cross section 15C-15C of FIG. 15A.

FIG. 15D is a cross-sectional view illustrating a cross section 15D-15D of FIG. 15A.

FIG. 16A is a diagram illustrating an exhaust fan with four blower units.

FIG. 16B is a diagram illustrating an exhaust fan with one blower unit.

FIG. 16C is a diagram illustrating an exhaust fan with three blower units.

FIG. 16D is a diagram illustrating an exhaust fan with three blower units.

DESCRIPTION OF THE EMBODIMENTS

Hereinafter, with reference to drawings, embodiments for implementing this disclosure will be exemplarily described in detail based on examples. However, sizes, materials, shapes, relative arrangements, and the likes of components described in the embodiments should be appropriately changed according to configurations and various conditions of apparatuses to which this disclosure is applied. That is, purposes of the following embodiments shall not be regarded as limiting the scope of this disclosure.

First Embodiment

Overall Configuration of Image Forming Apparatus

An image forming apparatus 1, as the image forming apparatus of a first embodiment, is a laser beam printer of an electrophotographic system forming a monochromatic toner image. In the following descriptions, in a case where the image forming apparatus 1 is installed on a horizontal surface, a height direction (direction opposite to a vertical direction) of the image forming apparatus 1 is referred to as a Z direction. A direction intersecting with the Z direction and parallel to a rotational axis direction (main scanning direction) of a photosensitive drum 21, described below, is referred to as an X direction. A direction intersecting with the X and Z direction is referred to as a Y directions. The X, Y, and Z directions intersect preferably orthogonally to each other. Further, for convenience, a plus side and a minus side in the X direction are respectively called as a right side and a left side, a plus side and a minus side in the Y direction are respectively called as a front side (or a front surface side) and a back side (or a back surface side), and a plus side and a minus side in the Z direction are respectively called as an upper side and a lower side.

Figure 1:
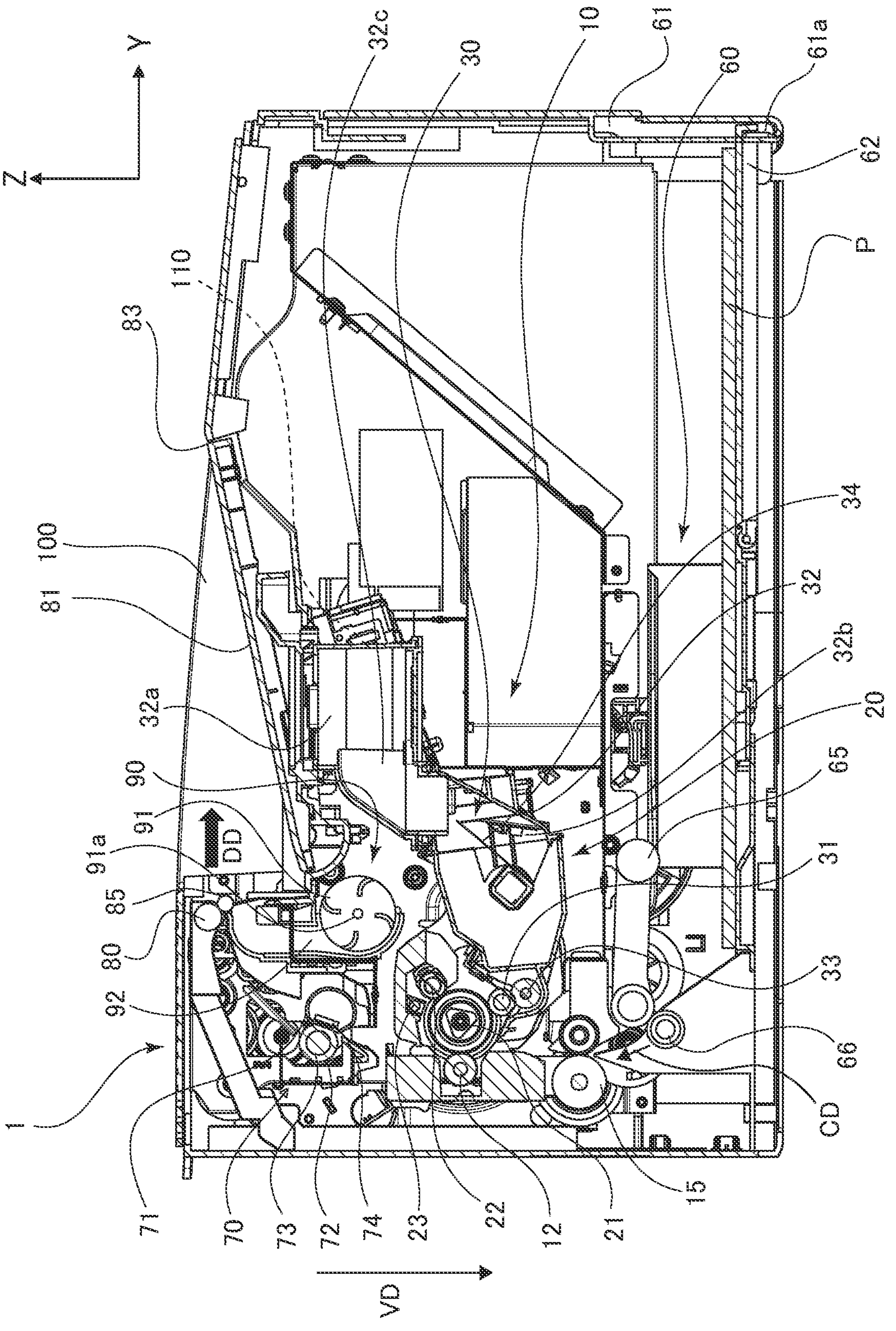
FIG. 1 is an overall schematic diagram illustrating an image forming apparatus of a first embodiment.

As illustrated in FIG. 1, the image forming apparatus 1 includes an image forming unit 10 forming a toner image on a sheet P, a sheet feed unit 60 feeding the sheet P, a fixing unit 70 fixing the toner image, formed by the image forming unit 10, on the sheet P, and a sheet discharge roller pair 80.

The image forming unit 10 includes a scanner unit 110, a process cartridge 20, serving as a cartridge, and a transfer roller 12. The process cartridge 20 includes the photosensitive drum 21, a charge roller 22 arranged around the photosensitive drum 21, a pre-exposure unit 23, and a developing unit 30 including a developing roller 31.

The photosensitive drum 21 is a photosensitive member formed in a cylindrical shape. Further, the photosensitive drum 21, serving as an image bearing member, is rotatably driven at a predetermined process speed in a clockwise direction in FIG. 1 by a drive motor 121 (refer to FIGS. 5A and 5B). Along with the rotation of the photosensitive drum 21, a surface of the photosensitive drum 21 is sequentially charged by the charge roller 22.

The scanner unit 110, serving as an exposure unit, scans and exposes the surface of the photosensitive drum 21 by irradiating the photosensitive drum 21 with a laser beam, corresponding to image information input from an external apparatus, by using a polygon mirror. By this exposure, an electrostatic latent image corresponding to the image information is formed on the surface of the photosensitive drum 21. To be noted, the scanner unit 110 is not limited to the configuration described above, and, for example, it is acceptable to apply a light-emitting diode (LED) exposure unit including an LED array in which a plurality of LEDs are arranged in a row along a longitudinal direction of the photosensitive drum 21.

The developing unit 30 includes the developing roller 31, serving as a developer bearing member bearing developer (toner), a developing container 32, which becomes a frame body of the developing unit 30, and a developer feed roller 33 capable of feeding the developer to the developing roller 31. The developing roller 31 and the developer feed roller 33 are rotatably supported by the developing container 32.

The developing unit 30 of the present embodiment uses a contact developing system as a developing system. That is, the developing roller 31 comes into contact with the photosensitive drum 21. A developing voltage is applied to the developing roller 31 by a developing high voltage power source. By the transfer of the toner, borne by the developing roller 31, from the developing roller 31 to the drum surface in accordance with potential distribution on the surface of the photosensitive drum 21 under the developing voltage, the electrostatic latent image is developed to the toner image.

To be noted, while details will be described below, a toner pack 40 (refer to FIG. 2B) that is a toner replenishing container is attachable and detachable to and from the image forming apparatus 1 of the present embodiment. The developing container 32 includes a replenishing port 32*a*, to and from which the toner pack 40 is attached and detached, a storage portion 32*b*, and a replenishing portion 32*c*. The storage portion 32*b* includes the developing roller 31, the developer feed roller 33, and an agitation member 34, agitating the toner, inside. The replenishing portion 32*c* connects the replenishing port 32*a* and the storage portion 32*b*, and guides the toner, replenished from the toner pack 40, to the storage portion 32*b*.

The sheet feed unit 60 includes a front cover 61, openable and closable with respect to the apparatus body 100 (also referred to as a casing), a sheet feed tray 62, and a vertically movable pickup roller 65. With the configuration of the present embodiment, by opening the front cover 61 to the plus side in the Y direction around a front cover pivot center 61*a* as a center, it becomes possible to place the sheet P on the sheet feed tray 62. The sheet P includes, for example, recording paper, label paper, an overhead projector (OHP) sheet, cloth, and the like.

The fixing unit 70 is a heat-fixing type in which a fixing process is performed by heating and melting the toner. The fixing unit 70 includes a fixing film 71, a heater 74 (heating member), such as a ceramic heater heating the fixing film 71, and a thermistor (not shown) measuring a temperature of the fixing heater. Further, the fixing unit 70 includes a press roller 72 (pressing member) forming a fixing nip with the heater 74 via the fixing film 71 and applying pressure to the sheet P The press roller 72 is rotatable around a rotation shaft 73 as a center.

Operation of Image Forming Apparatus

Next, an image forming operation of the image forming apparatus 1 will be described. When an instruction of image formation is input to the image forming apparatus 1, an image forming process is started by the image forming unit 10 based on the image information input from an external computer connected to the image forming apparatus 1. The scanner unit 110 emits the laser beam toward the photosensitive drum 21 based on the input image information. At this time, the photosensitive drum 21 has been charged by the charge roller 22 beforehand, and, by being irradiated with the laser beam, the electrostatic latent image is formed on the photosensitive drum 21. Thereafter, this electrostatic latent image is developed by the developing roller 31, and the toner image is formed on the photosensitive drum 21.

In parallel with the image forming process described above, the pickup roller 65 of the sheet feed unit 60 sends out the sheet P placed on the sheet feed tray 62. While being conveyed in a sheet conveyance direction CD, the sheet P is separated into one sheet at a time by a separation roller pair 66. Then, the sheet P is conveyed to a registration roller pair 15 by the separation roller pair 66, and skew is corrected by abutting onto a nip of the registration roller pair 15. Then, the registration roller pair 15 is driven in synchronization with the transfer timing of the toner image, and coveys the sheet P toward a transfer nip formed by the transfer roller 12 and the photosensitive drum 21.

A transfer voltage is applied to the transfer roller 12 from a transfer high voltage power source, and the toner image borne on the photosensitive drum 21 is transferred onto the sheet P conveyed by the registration roller pair 15. The sheet P onto which the toner image has been transferred is conveyed to the fixing unit 70, and the toner image is heated and pressed at a time passing through the fixing nip formed by the fixing film 71 and the press roller 72 of the fixing unit 70. Thereby, a toner particle is melted and then fixed, so that the toner image is fixed on the sheet P.

The sheet P which has passed through the fixing unit 70 is discharged from a sheet discharge port 85, formed in the apparatus body 100, to the outside by the sheet discharge roller pair 80. A direction in which the sheet P is discharged from the sheet discharge port 85 is represented by a sheet discharge direction DD in FIG. 1. The sheet P is discharged from the sheet discharge port 85 to the outside of the image forming apparatus 1, and stacked on a sheet discharge tray 81, serving as a stacking portion arranged on an upper part of the apparatus body 100.

Attachment and Detachment Configuration of Replenishing Container

Figure 2A:
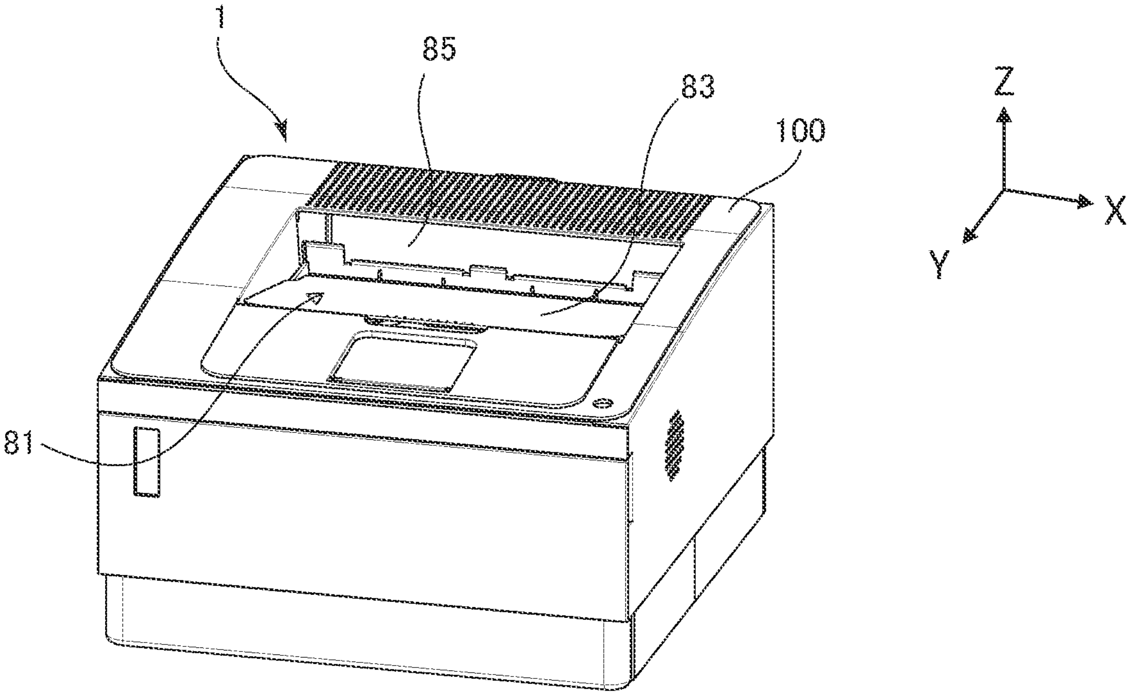
FIG. 2A is a perspective view illustrating the image forming apparatus in a state in which a cover is positioned in a closed position.

Next, using FIGS. 2A and 2B, an attachment and detachment configuration of a replenishing container will be described. As illustrated in FIG. 2A, the sheet discharge port 85 is formed in the apparatus body 100 of the image forming apparatus 1, and the sheet discharge tray 81 is disposed near the sheet discharge port 85. A cover 83 is a part of the sheet discharge tray 81, and is openable and closable with respect to the apparatus body 100. FIG. 2A illustrates a state in which the cover 83 is positioned in a closed position, and FIG. 2B illustrates a state in which the cover 83 is positioned in an opening position.

Figure 2B:
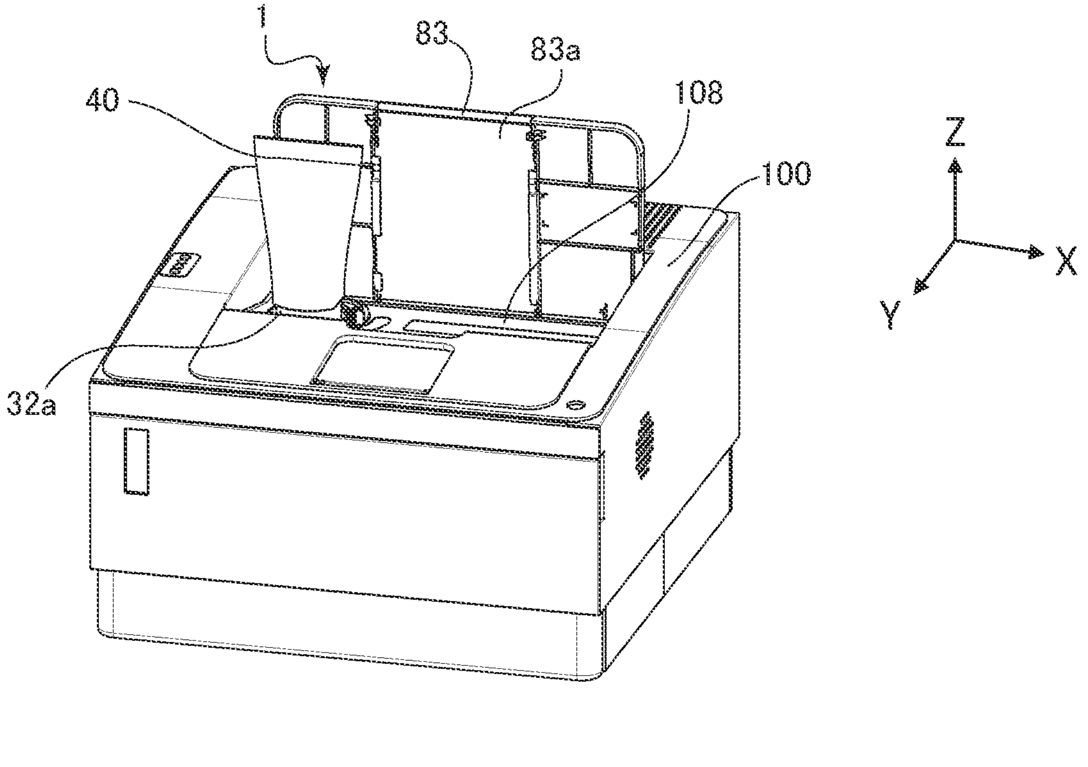
FIG. 2B is a perspective view illustrating the image forming apparatus in a state in which the cover is positioned in an opening position.

As illustrated in FIG. 2B, when the cover 83 is opened, a cover back surface 83*a*, an upper wall 108, and the replenishing port 32*a* are exposed to the outside. The upper wall 108 serves to protect the developing container 32 from above, and the replenishing port 32*a* is used to attach the toner pack 40 so as to replenish the developer in the developing container 32. An opening is formed in the upper wall 108, and the replenishing port 32*a* is exposed from the opening. When the toner pack 40 is attached to the replenishing port 32*a*, a part of the toner pack 40 projects toward the outside of the apparatus body 100, and a movement of the cover 83 to the closed position is restricted.

When the cover 83 is in the closed position, the replenishing port 32*a* and the upper wall 108 are covered by the cover 83. At this time, the replenishing port 32*a* and the upper wall 108 face the cover back surface 83*a*. By opening the cover 83, a user can access the replenishing port 32*a*. To be noted, in the present embodiment, a direct replenishing method is adopted, so that the user replenishes the toner from the toner pack 40, filled with the toner for replenishment, to the developing unit 30 in a state in which the developing unit 30 (process cartridge 20) is mounted in the image forming apparatus 1.

Therefore, since, in a case where a toner remainder in the process cartridge 20 has decreased, work of removing the process cartridge 20 from the apparatus body 100 and replacing the process cartridge 20 with new one becomes unnecessary, it is possible to improve usability. Further, it is possible to replenish the toner in the developing container 32 at a lower cost than replacing the entire process cartridge 20. To be noted, even in comparison with a case of replacing only the developing unit 30 of the process cartridge 20, since it is not necessary to replace various rollers, gears, and the like, it is possible to reduce costs by the direct replenishment method. Further, it is acceptable to configure the process cartridge 20 in a detachable manner from the apparatus body 100.

Frame Configuration

Figure 3A:
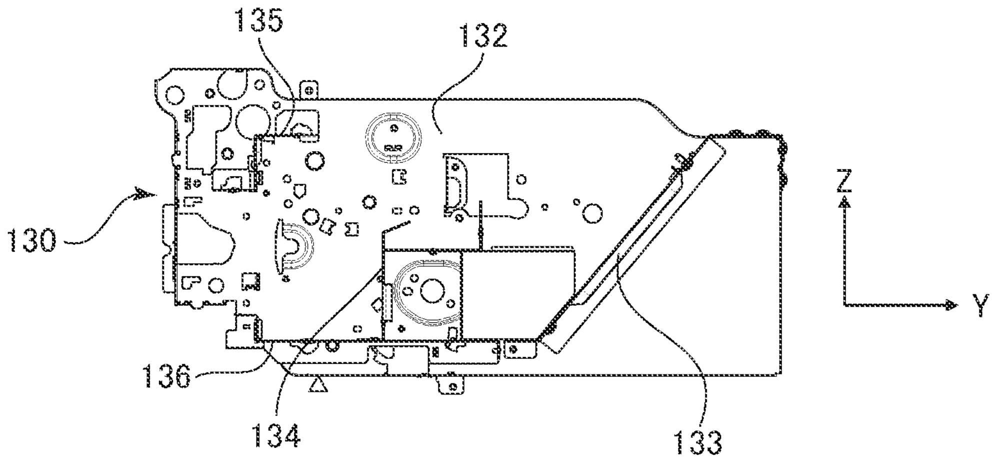
FIG. 3A is a front view illustrating a second side plate.
Figure 3B:
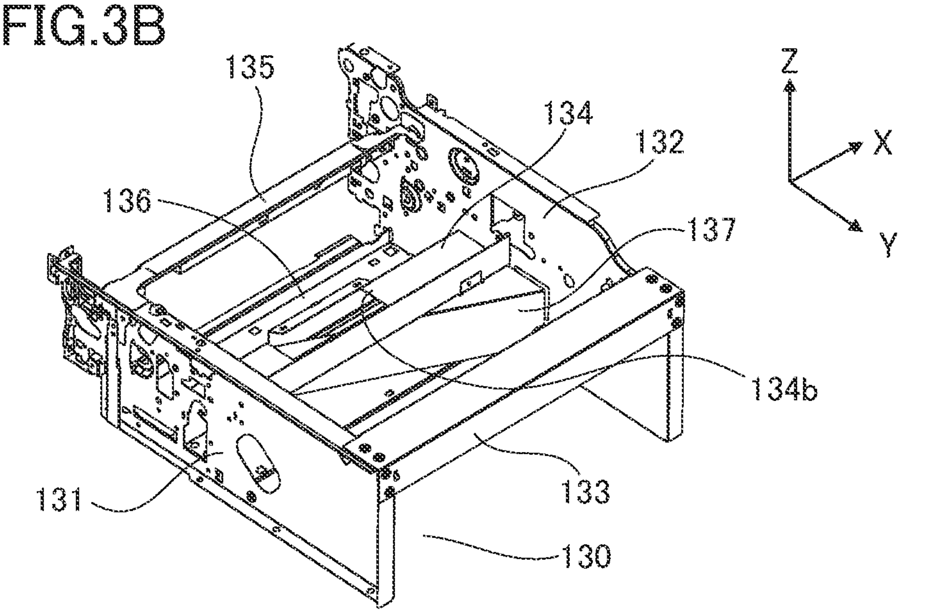
FIG. 3B is a perspective view illustrating a sheet metal frame.
Figure 3C:
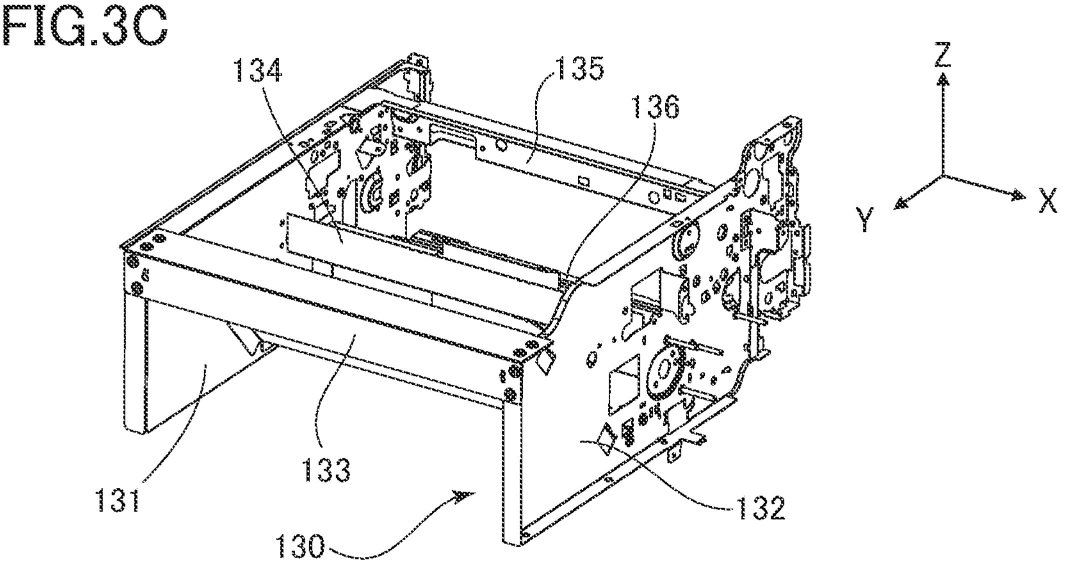
FIG. 3C is the other perspective view illustrating the sheet metal frame.

Next, using FIGS. 3A to 3C, a frame configuration of the image forming apparatus 1 will be described. As illustrated in FIGS. 3A to 3C, the image forming apparatus 1 includes a sheet metal frame 130, serving as a frame. The sheet metal frame 130 includes a first side plate 131 and a second side plate 132 disposed in parallel in the X direction which is a width direction orthogonal to the sheet conveyance direction CD (refer to FIG. 1). The second side plate 132 is arranged farther to the plus side in the X direction, that is, farther to the downstream side in the X direction, than the first side plate 131.

Further, the sheet metal frame 130 includes a front sheet metal stay 133 connecting the first and second side plates 131 and 132, a center sheet metal stay 134, a back sheet metal stay 135, and a lower sheet metal stay 136. These four sheet metal stays each extend in the X direction, and first ends and second ends of these stays are respectively fixed to the first and second side plates 131 and 132. Further, a duct sheet metal stay 137 is arranged between the center and lower sheet metal stays 134 and 136, and the duct sheet metal stay 137 is fixed to the center and lower sheet metal stays 134 and 136.

Schematic Configurations of Intake Unit and Exhaust Unit

Figure 4A:
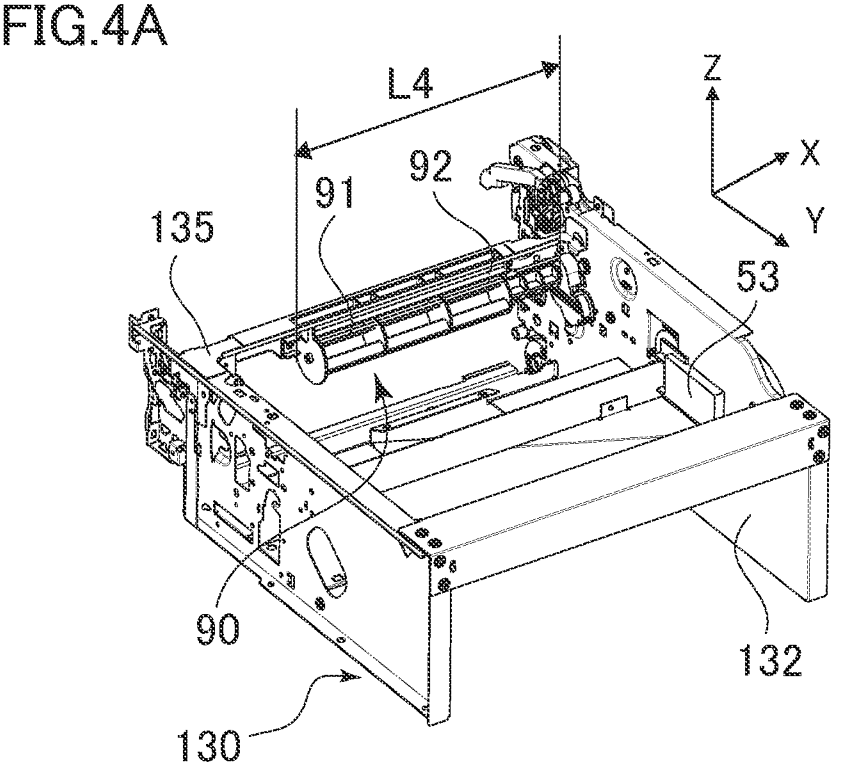
FIG. 4A is a perspective view illustrating the sheet metal frame and an exhaust unit.
Figure 4B:
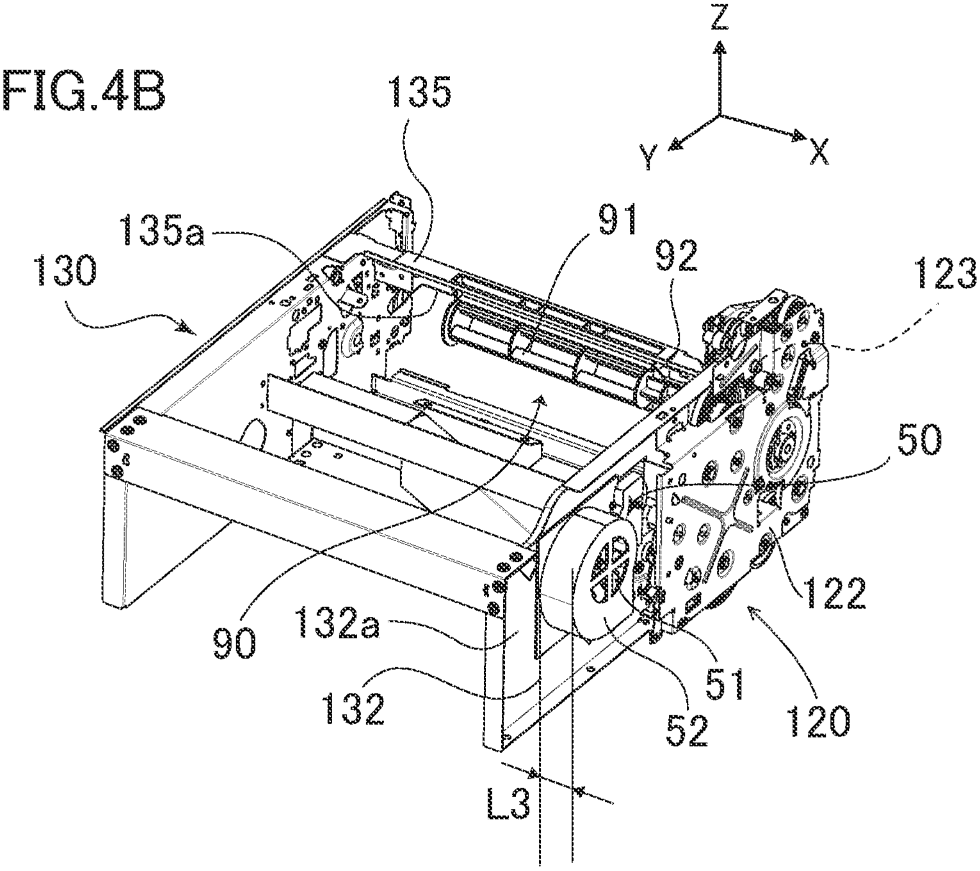
FIG. 4B is a perspective view illustrating the sheet metal frame and an intake unit.

Next, using FIGS. 4A to 5B, schematic configurations of an intake unit 50 and an exhaust unit 90 will be described. As illustrated in FIGS. 4A and 4B, the intake unit 50 is fixed to an outer surface 132*a* on the plus side in the X direction of the second side plate 132. The intake unit 50 is, in the X direction, arranged on the other side of the first side plate 131 with respect to the second side plate 132, and draws air into an interior of the sheet metal frame 130.

Further, the exhaust unit 90 is fixed to a lower surface 135*a* which is a surface on the minus side in the Z direction of the back sheet metal stay 135, serving as a connection frame. The exhaust unit 90 is arranged between the first and second side plates 131 and 132 in the X direction, and discharges the air to the outside of the sheet metal frame 130. As described above, the intake unit 50 is fixed with respect to the sheet metal frame 130 in the X direction, and the exhaust unit 90 is fixed with respect to the sheet metal frame 130 in the Z direction.

Further, in the X direction, the width L3 of the intake unit 50 illustrated in FIG. 4B is shorter than the width L4 of the exhaust unit 90 illustrated in FIG. 4A. Therefore, even if the intake unit 50 is arranged on the plus side in the X direction (on the outer side in the width direction) of the second side plate 132, it is possible to reduce the enlargement of the image forming apparatus 1 to the plus side in the X direction.

While details will be described below, the intake unit 50 includes an intake fan 51, delivering the air, and an intake fan holder 52, rotatably supporting the intake fan 51 and forming an airflow path. The exhaust unit 90 includes an exhaust fan 91, serving as a fan delivering the air, and an exhaust fan holder 92, rotatably supporting the exhaust fan 91 and forming the airflow path.

As illustrated in FIG. 1, a rotation shaft 91*a* of the exhaust fan 91, extending in the X direction, is arranged farther downstream than the rotation shaft 73 of the press roller 72 in the sheet discharge direction DD. Further, the exhaust fan 91 is arranged directly above the developing unit 30 in a vertical direction VD, and, in a top view, the exhaust fan 91 and part of the developing unit 30 overlap each other. Further, in the top view, in the developing unit 30, the exhaust fan 91 overlaps part of the storage portion 32*b* included in the developing container 32, but does not overlap the replenishing portion 32*c*.

Figure 5A:
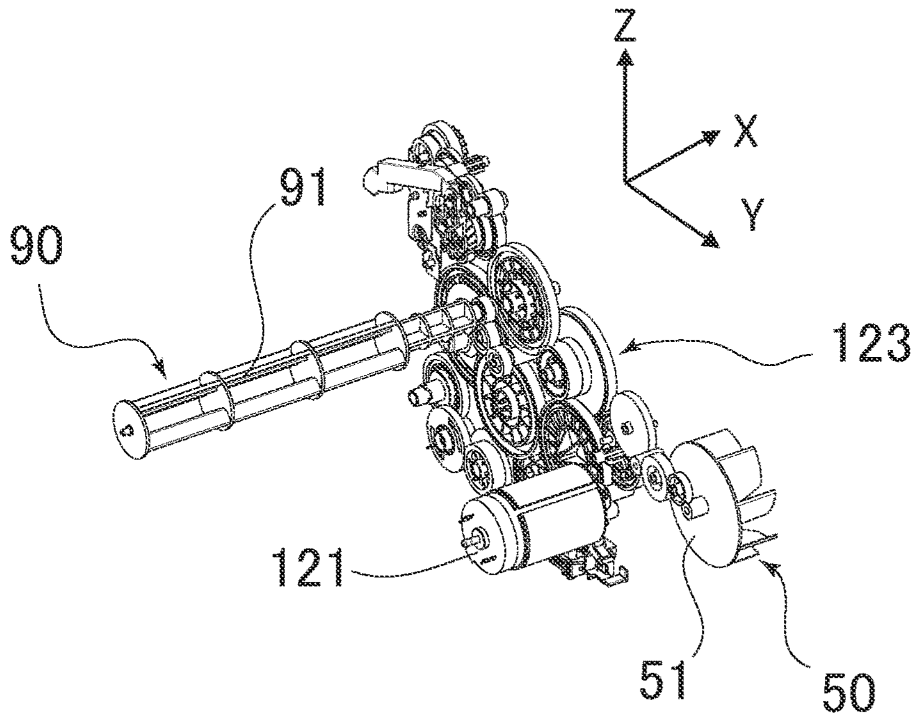
FIG. 5A is a perspective view illustrating a drive motor, an intake fan, a drive train, and an exhaust fan.
Figure 5B:
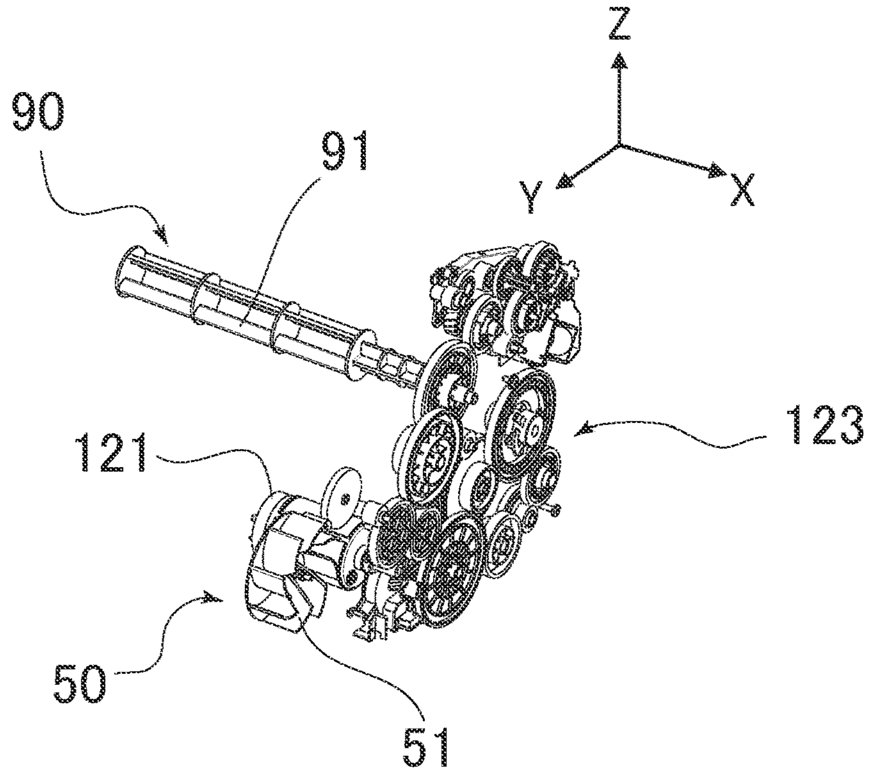
FIG. 5B is the other perspective view illustrating the drive motor, the intake fan, the drive train, and the exhaust fan.

Further, as illustrated in FIG. 4B, a drive unit 120 is fixed to the outer surface 132*a* of the second side plate 132. The drive unit 120 includes a drive motor 121, a drive sheet metal frame 122 supported by the second side plate 132, and a drive train 123. The drive motor 121, serving as a driving source, is supported by the outer surface 132*a* of the second side plate 132. As illustrated in FIGS. 5A and 5B, the drive train 123 includes a plurality of gears rotatably supported by the second side plate 132 and the drive sheet metal frame 122. Then, the drive train 123 transmits the driving force of the drive motor 121 to the sheet feed unit 60, the image forming unit 10, the fixing unit 70, the exhaust unit 90, and the intake unit 50. To be noted, the process cartridge 20 is driven by the drive motor 121.

Configuration of Exhaust Unit

Next, using FIG. 1 and FIGS. 6A to 8, a configuration of the exhaust unit 90 will be described in detail. As illustrated in FIG. 1, when viewed in the X direction, the exhaust fan 91 of the exhaust unit 90 is arranged between the fixing unit 70 and the process cartridge 20 and below the sheet discharge roller pair 80 and the sheet discharge tray 81. With this arrangement, as described below, it is possible to prevent the transfer of heat generated in the fixing unit 70 to the process cartridge 20, and becomes possible to reduce the transfer of the heat from the sheet P heated in the fixing unit 70 to the process cartridge 20. Further, while cooling the entire interior of the apparatus body 100, it becomes possible to cool the sheet P being conveyed by the sheet discharge roller pair 80.

The exhaust fan 91 rotates in the clockwise direction in FIG. 1, and cools the interior of the apparatus body 100 by drawing outside air while discharging warmed air in the interior of the apparatus body 100 outside. Further, by cooling the sheet P at a time of discharging the air in the interior of the apparatus body 100 outside, it is possible to prevent adhesion of sheets of the sheet P to each other, due to an effect of the toner, on the sheet discharge tray 81.

The exhaust fan holder 92 is fixed to the back sheet metal stay 135 of the apparatus body 100. Since, by securing the exhaust fan holder 92 to the sheet metal frame 130 including the back sheet metal stay 135 as described above, it becomes possible to firmly fix the exhaust fan holder 92, vibration caused by the rotation of the exhaust fan 91 and noise caused by the vibration are prevented. Further, in a case where the image forming apparatus 1 is installed on a distorted floor surface, since it is possible to suppress the distortion of the exhaust fan holder 92, it is possible to reduce such as an odd sound during the rotation of the exhaust fan 91.

Figure 6B:
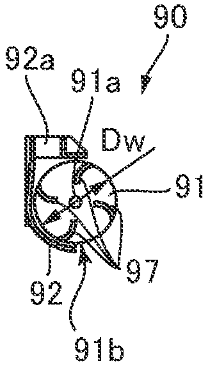
FIG. 6B is a cross-sectional view illustrating a cross section 6B-6B of FIG. 6A.
Figure 6A:
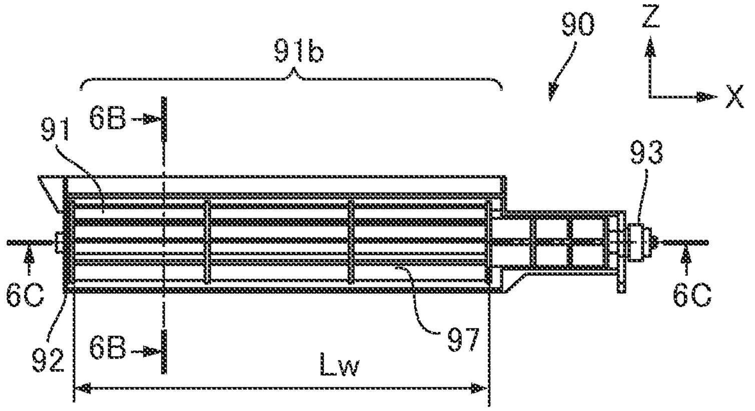
FIG. 6A is a front view illustrating the exhaust unit.
Figure 6C:
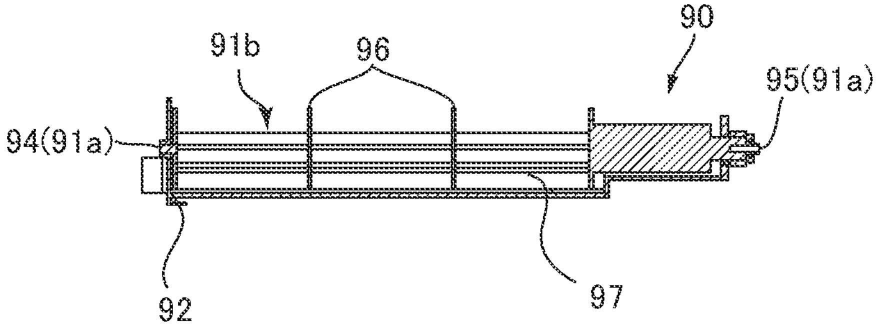
FIG. 6C is a cross-sectional view illustrating a cross section 6C-6C of FIG. 6A.

FIG. 6A is a front view, when viewed from the plus side in the Y direction, illustrating the exhaust unit 90, FIG. 6B is a cross-sectional view illustrating a cross section 6B-6B of FIG. 6A, and FIG. 6C is a diagram illustrating a cross-sectional view illustrating a cross section 6C-6C of FIG. 6A. As illustrated in FIG. 6A, the exhaust unit 90 includes the exhaust fan holder 92 and the exhaust fan 91, rotatably supported by the exhaust fan folder 92 and the second side plate 132.

The exhaust fan 91 is a cross-flow fan extending in the X direction (longitudinal direction of the photosensitive drum 21). The length of the blade 97 of the exhaust fan 91 in the X direction is represented by a length Lw. As illustrated in FIG. 6B, a blower unit 91*b* which plays a role of actually delivering the air in the exhaust fan 91 includes four blades 97 around a rotation shaft 91*a*. As illustrated in FIG. 6B, a diameter of a rotation locus of this blade 97 is represented by a diameter Dw. A magnitude relationship between the length Lw of the blade 97 of the exhaust fan 91 in the X direction and the diameter Dw of the rotation locus is that Lw is larger than Dw.

Since such an exhaust fan 91 is possible to uniformly efficiently deliver the air to a wide cooling object, the exhaust fan 91 has a characteristic of being able to prevent left/right cooling unevenness in the X direction (width direction). Further, since it is possible to increase the total area of the blade 97 by increasing the length of the blade 97 in the X direction (width direction), it is possible to ensure a large airflow quantity only by slow rotation. Accordingly, it is not necessary to rotate the exhaust fan 91 fast, and possible to reduce an operating sound.

As illustrated in FIG. 6A, a drive gear 93 is disposed at an end on the plus side in the X direction of the exhaust unit 90. The drive gear 93 is a gear that serves to rotate the exhaust fan 91 by receiving the driving force of the drive motor 121 disposed in the image forming apparatus 1.

As illustrated in FIG. 6C, a boss 94 is disposed at an end on the minus side in the X direction of the exhaust fan 91, and this boss 94 is supported by the exhaust fan holder 92. A boss 95 is disposed at an end on the plus side in the X direction of the exhaust fan 91, and this boss 95 is supported by the second side plate 132 of the apparatus body 100. The boss 95 penetrates the drive gear 93, and is fixed with respect to the drive gear 93. Both of the bosses 94 and 95 constitute the rotation shaft 91*a* of the exhaust fan 91. Since the boss 95 is supported by the second side plate 132 of the apparatus body 100, it is possible to ensure the positional accuracy of a drive input gear (not shown) of the drive motor 121 disposed to the second side plate 132, and the drive gear 93.

Since, as illustrated in FIG. 6C, two reinforcing ribs 96 are disposed in the exhaust fan 91, stiffness with respect to the torsion of the exhaust fan 91 during rotation is ensured. As illustrated in FIG. 6B, by rotating the exhaust fan 91 using the driving force of the drive motor 121, the air in the interior of the apparatus body 100 is drawn into the exhaust fan holder 92 by the blades 97 of the exhaust fan 91. Then, the air drawn into the exhaust fan holder 92 is guided to a blower port 92*a* of the exhaust fan holder 92, serving as a holder.

To be noted, while, in the present embodiment, the reinforcing ribs 96 are disposed so as to ensure the stiffness with respect to the torsion of the exhaust fan 91 during the rotation, in a case where it is possible to obtain the stiffness without the ribs, it is not necessary to dispose the reinforcing ribs 96. Further, the number of the blades 97 is not limited to four, and a shape of the blade 97 is not limited to the shape disclosed by the present embodiment.

In FIGS. 7A to 7D, the width of a maximum size sheet usable by the image forming apparatus 1 is represented by a width L1. Further, an end on the minus side in the X direction of the maximum size sheet is represented by a first end Pa, and an end on the plus side in the X direction of the maximum size sheet is represented by a second end Pb. Further, an end on the minus side in the X direction of the blade 97 is represented by a first end 97*a*, and an end on the plus side in the X direction of the blade 97 is represented by a second end 97*b*.

Figures 7A, 7B, 7C, 7D:
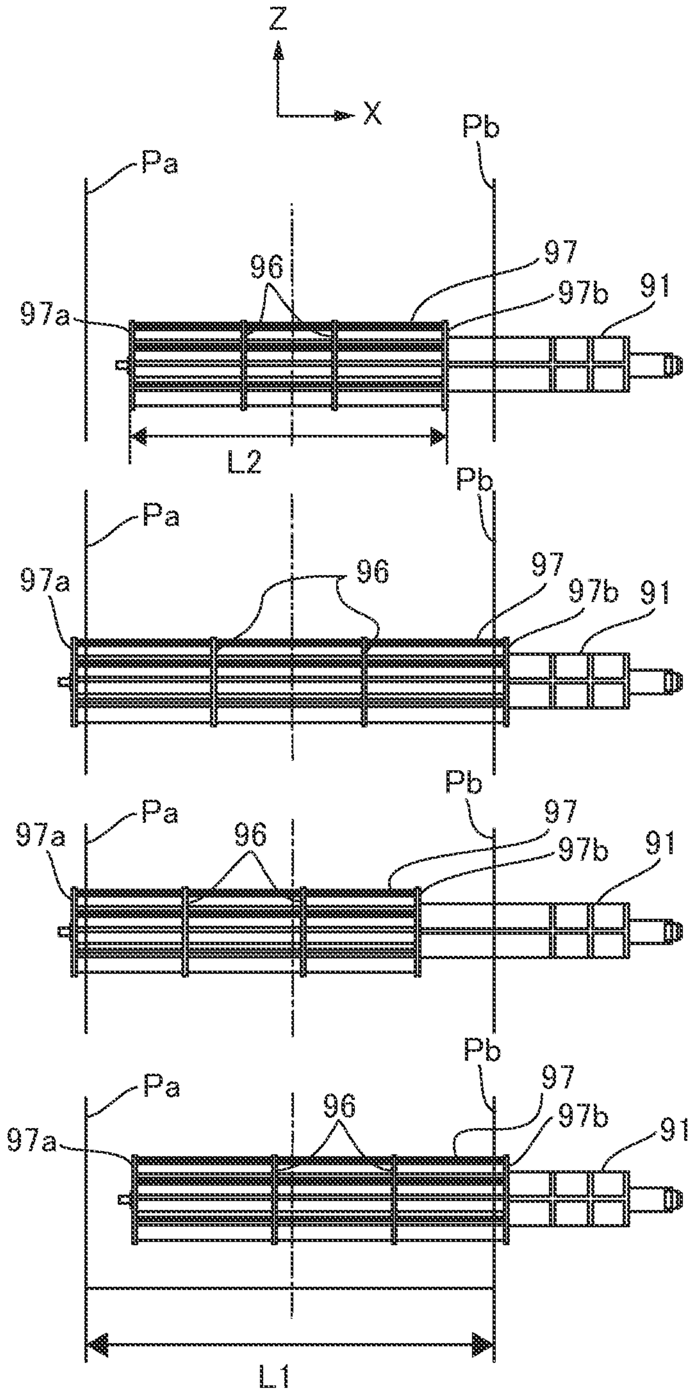
FIG. 7A is a diagram illustrating the width of a blade.
FIG. 7B is a diagram illustrating blades of variant examples.
FIG. 7C is a diagram illustrating blades of variant examples.
FIG. 7D is a diagram illustrating blades of variant examples.

As illustrated in FIG. 7A, the first end 97*a* of the blade 97 of the present embodiment is positioned farther to the plus side in the X direction than the first end Pa, and the second end 97*b* of the blade 97 is positioned farther to the minus side in the X direction than the second end Pb. That is, the blade 97 is, in the X direction, arranged in an area between the first end Pa and the second end Pb of the maximum size sheet. The airflow quantity of the exhaust fan 91 increases as the length Lw (refer to FIG. 6A) of the blade 97 of the exhaust fan 91 in the X direction lengthens, and increases as the diameter Dw (refer to FIG. 6B) of the rotational locus of the blade 97 enlarges. Therefore, by appropriately setting the length Lw and the diameter Dw depending on an arrangement space of the exhaust unit 90 in the image forming apparatus 1, it is possible to ensure the airflow quantity of the exhaust fan 91.

In the present embodiment, in the interior of the image forming apparatus 1, as a placeable space for disposing the exhaust unit 90, there is a sufficient space in a diameter direction, but, on the other hand, only a narrower space than the width L1 is available in the X direction. Therefore, as illustrated in FIG. 7A, in the X direction, the width L2 of the blade 97 of the exhaust fan 91 is shorter than the width L1 of the maximum size sheet usable by the image forming apparatus 1. Thereby, along with miniaturizing the blade 97 in the X direction, it is possible to sufficiently ensure the airflow quantity of the exhaust unit 90.

FIGS. 7B to 7D illustrate variant examples of the blade 97. In a variant example illustrated in FIG. 7B, the first end 97*a* of the blade 97 is positioned farther to the minus side in the X direction than the first end Pa, and the second end 97*b* of the blade 97 is positioned farther to the plus side in the X direction than the second end Pb. This variant example is applied, for example, to a case where a placeable space for the exhaust unit 90 in the interior of the image forming apparatus 1 exists sufficiently in the X direction but, on the other hand, only a relatively narrow space is available in the diameter direction.

In a variant example illustrated in FIG. 7C, the first end 97*a* of the blade 97 is positioned farther to the minus side in the X direction than the first end Pa, and the second end 97*b* of the blade 97 is positioned farther to the minus side in the X direction than the second end Pb. In a variant example illustrated in FIG. 7D, the first end 97*a* of the blade 97 is positioned farther to the plus side in the X direction than the first end Pa, and the second end 97*b* of the blade 97 is positioned farther to the plus side in the X direction than the second end Pb. As described above, by appropriately setting the length Lw and the diameter Dw depending on the space in which the exhaust unit 90 is arranged, along with improving the freedom in the arrangement of the exhaust unit 90, it is possible to ensure the airflow quantity of the exhaust fan

91. Further, if, in any configurations of FIGS. 7A to 7D, in the case where it is possible to obtain the stiffness with respect to the torsion of the exhaust fan 91 during the rotation without the ribs, it is acceptable to eliminate the reinforcing ribs 96.

Figure 8:
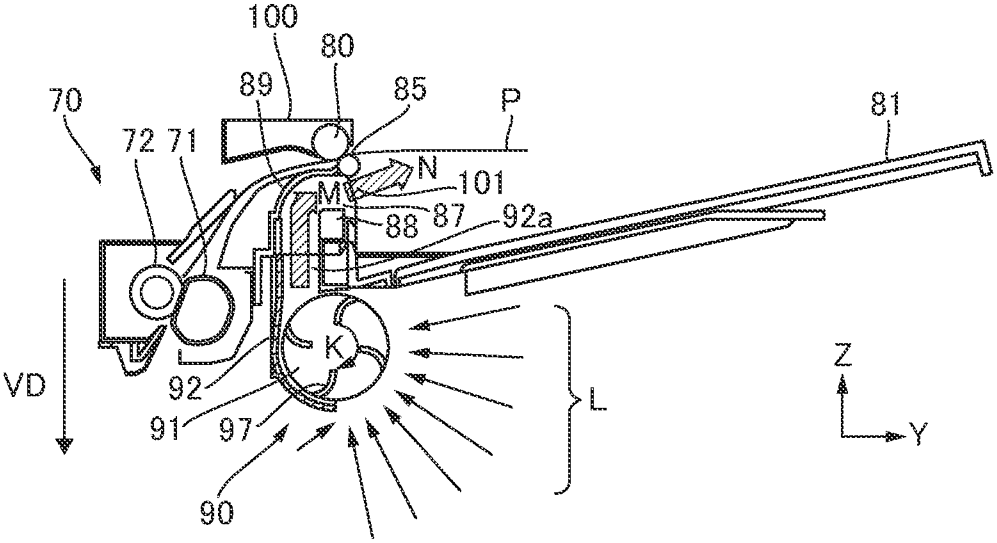
FIG. 8 is a diagram illustrating airflow paths generated by the exhaust unit.

FIG. 8 is a diagram for illustrating airflow by the exhaust fan 91. As illustrated in FIG. 8, by the rotation of the exhaust fan 91 in an arrow K direction that is the clockwise direction, the air in the interior of the apparatus body 100 flows in arrows L direction by the blades 97 of the exhaust fan 91, and is drawn into the exhaust fan holder 92. The air drawn into the exhaust fan holder 92 is sent from the blower port 92*a* disposed in an upper end of the exhaust fan holder 92 to the inside of a duct 87 formed by a lower discharge guide 88 and an upper discharge guide 89. The air sent to the duct 87 is guided in an arrow M direction by the duct 87. That is, the duct 87 guides the air toward the sheet discharge tray 81. Here, so as not to decrease blowing efficiency, the length of the duct 87 is shortened as much as possible, and a duct shape is optimized.

In an exterior of the apparatus body 100, an exhaust port 101 is formed below the sheet discharge port 85, from which the sheet P is discharged, in the vertical direction VD. The air sent inside of the duct 87 is, as represented by an arrow N, discharged outside of the apparatus body 100 by passing through the exhaust port 101. As described above, the warmed air in the interior of the apparatus body 100 is discharged outside of the apparatus body 100 toward the sheet discharge tray 81.

At this time, the air discharged outside hits a lower surface, which is on a side of a printing surface, of the sheet P being sent to the sheet discharge tray 81, and cools the sheet P While the air hitting the sheet P is the air warmed in the interior of the apparatus body 100, since a temperature of the air hitting the lower surface of the sheet P is equal to or more than 40° C. lower than a temperature of the sheet P which has been heated in the fixing unit 70, it is possible to sufficiently cool the sheet P By cooling the sheet P, on the sheet discharge tray 81, it is possible to reduce the adhesion of sheets of the sheet P to each other due to the effect of the toner. At a time when the sheet P is not being discharged, instead of the sheet P being discharge by the sheet discharge roller pair 80, the sheet P stacked on the sheet discharge tray 81 is cooled.

Further, the exhaust unit 90 sends the warmed air in the interior of the apparatus body 100 to the outside, and, at the same time, can draw the outside air into the interior of the apparatus body 100 from such as gaps of exterior members, a gap with the floor surface, and the sheet feed tray 62. As described above, the interior of the apparatus body 100 is cooled by drawing the air from many places of the apparatus body 100 and by flowing the outside air to the interior of the apparatus body 100, and the warmed air is discharged to the outside of the apparatus body 100 by the exhaust unit 90. Thereby, it becomes possible to cool the entire apparatus body 100 stably.

Configuration of Intake Unit

Figure 9A:
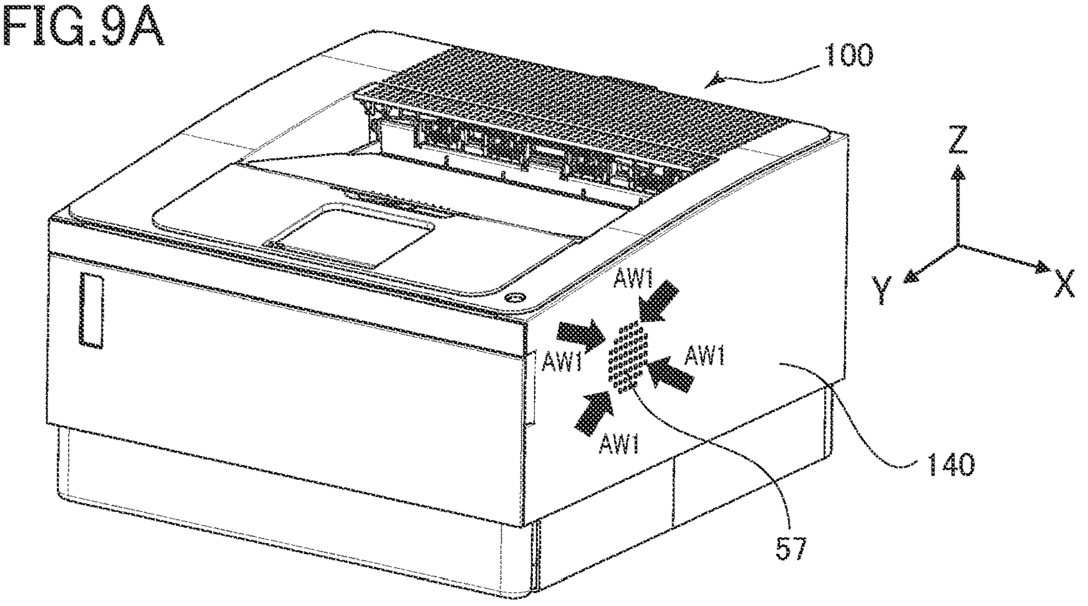
FIG. 9A is a perspective view illustrating intake holes of an exterior member.
Figure 9B:
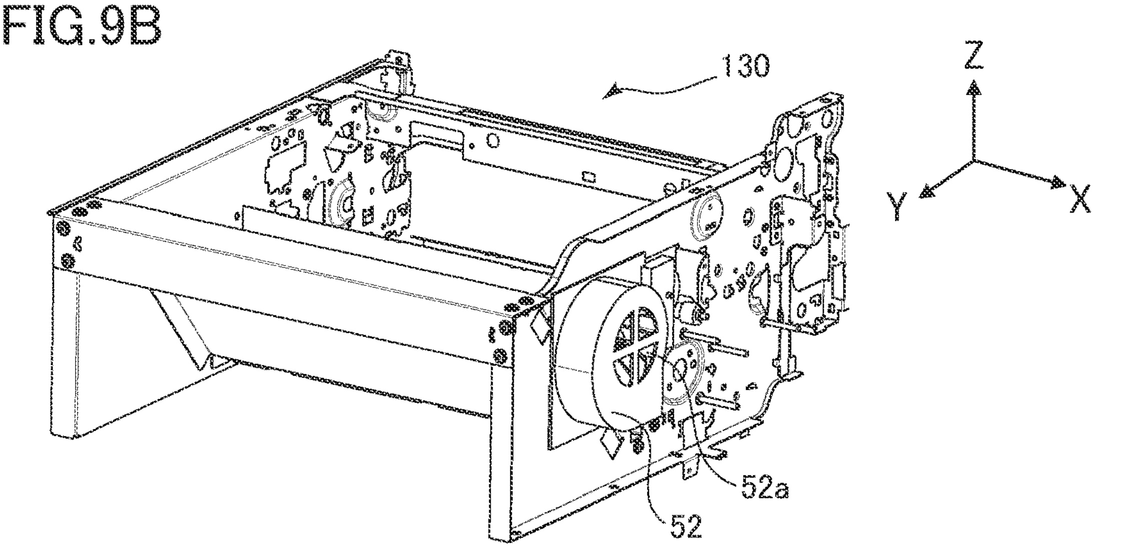
FIG. 9B is a perspective view illustrating the intake unit.
Figure 9C:
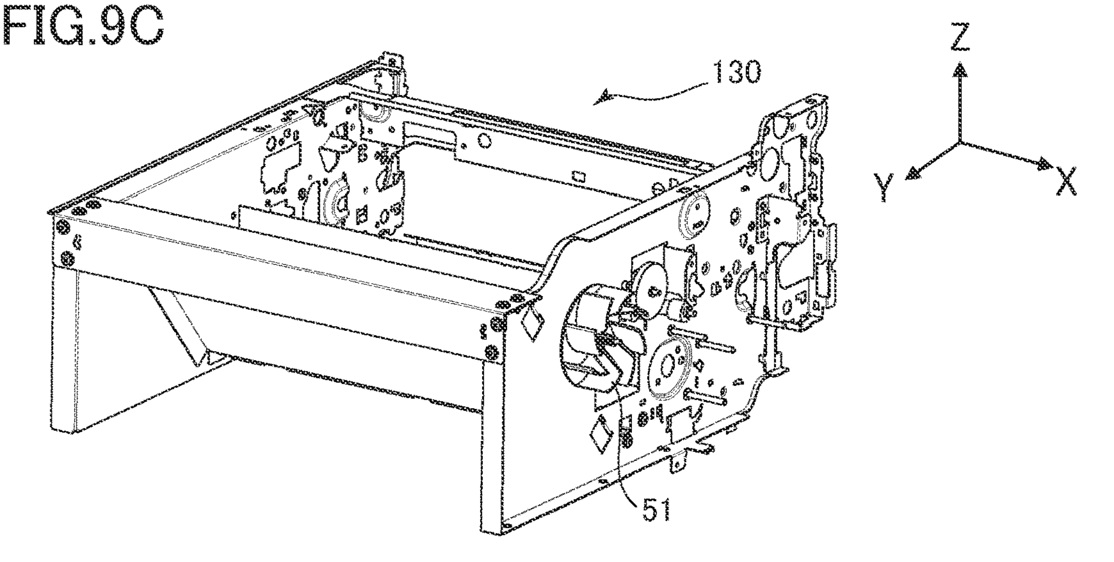
FIG. 9C is a perspective view illustrating the intake fan.

A configuration of the intake unit 50 in the present embodiment will be described using FIGS. 9A to 9C. FIG. 9A is a perspective view illustrating the apparatus body 100, FIG. 9B is a perspective view illustrating only the sheet metal frame 130 and the intake unit 50, and FIG. 9C is a diagram illustrating the sheet metal frame 130 and the intake fan 51.

As represented by airflow paths AW1, the intake unit 50 draws the outside air into the interior of the apparatus body from intake holes 57 disposed in an exterior member 140 illustrated in FIG. 9A. The drawn outside air is drawn into an interior of the intake fan holder 52 from intake holes 52*a* disposed in the intake fan holder 52 illustrated in FIG. 9B, and, further, drawn into the interior of the sheet metal frame 130 by the intake fan 51 illustrated in FIG. 9C. The intake holes 57 and the intake holes 52*a* are arranged adjacently to each other so as to draw the outside air as much as possible.

Figure 10:
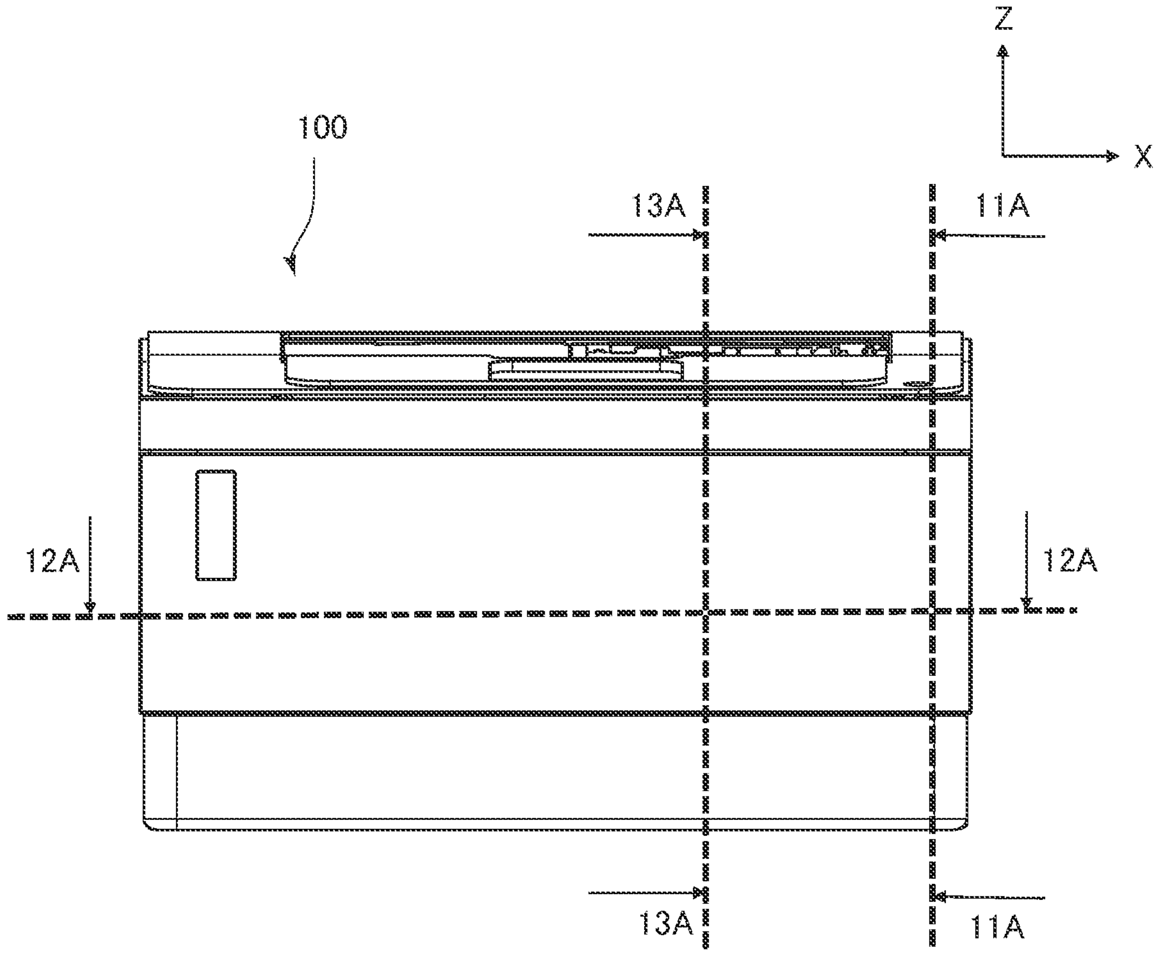
FIG. 10 is a front view illustrating an apparatus body.
Figure 11:
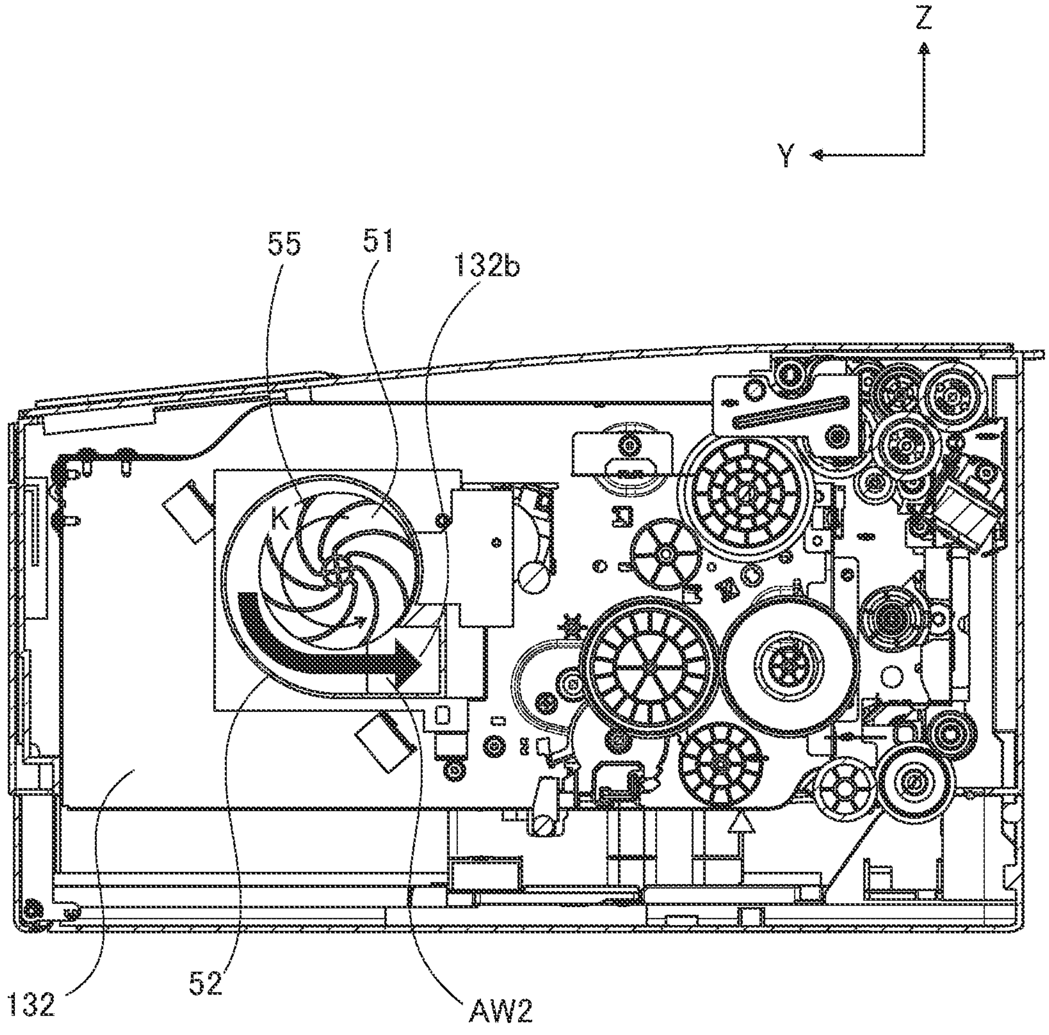
FIG. 11 is a cross-sectional view illustrating a cross section 11A-11A of FIG. 10.
Figure 12:
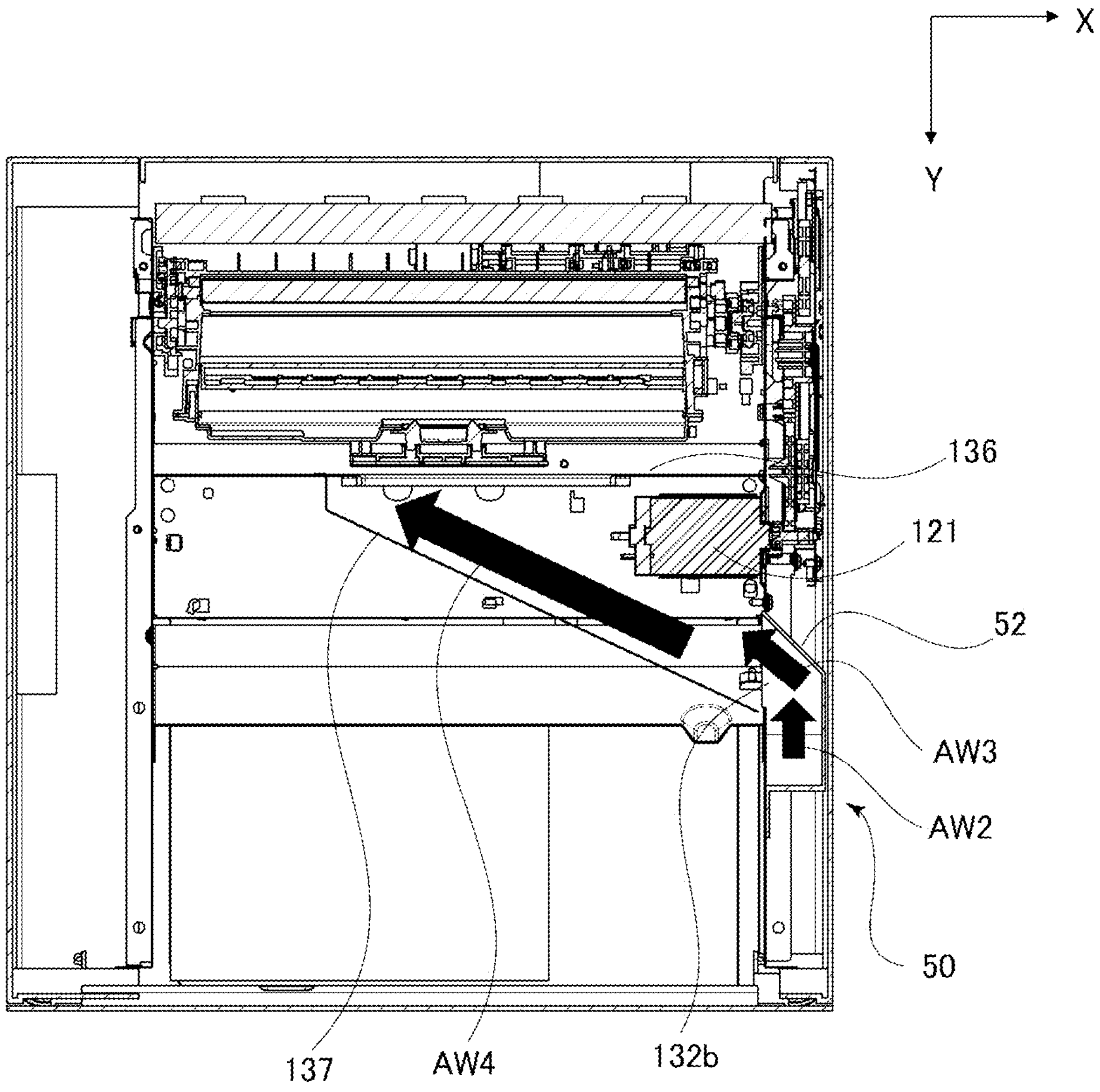
FIG. 12 is a cross-sectional view illustrating a cross section 12A-12A of FIG. 10.
Figure 13:
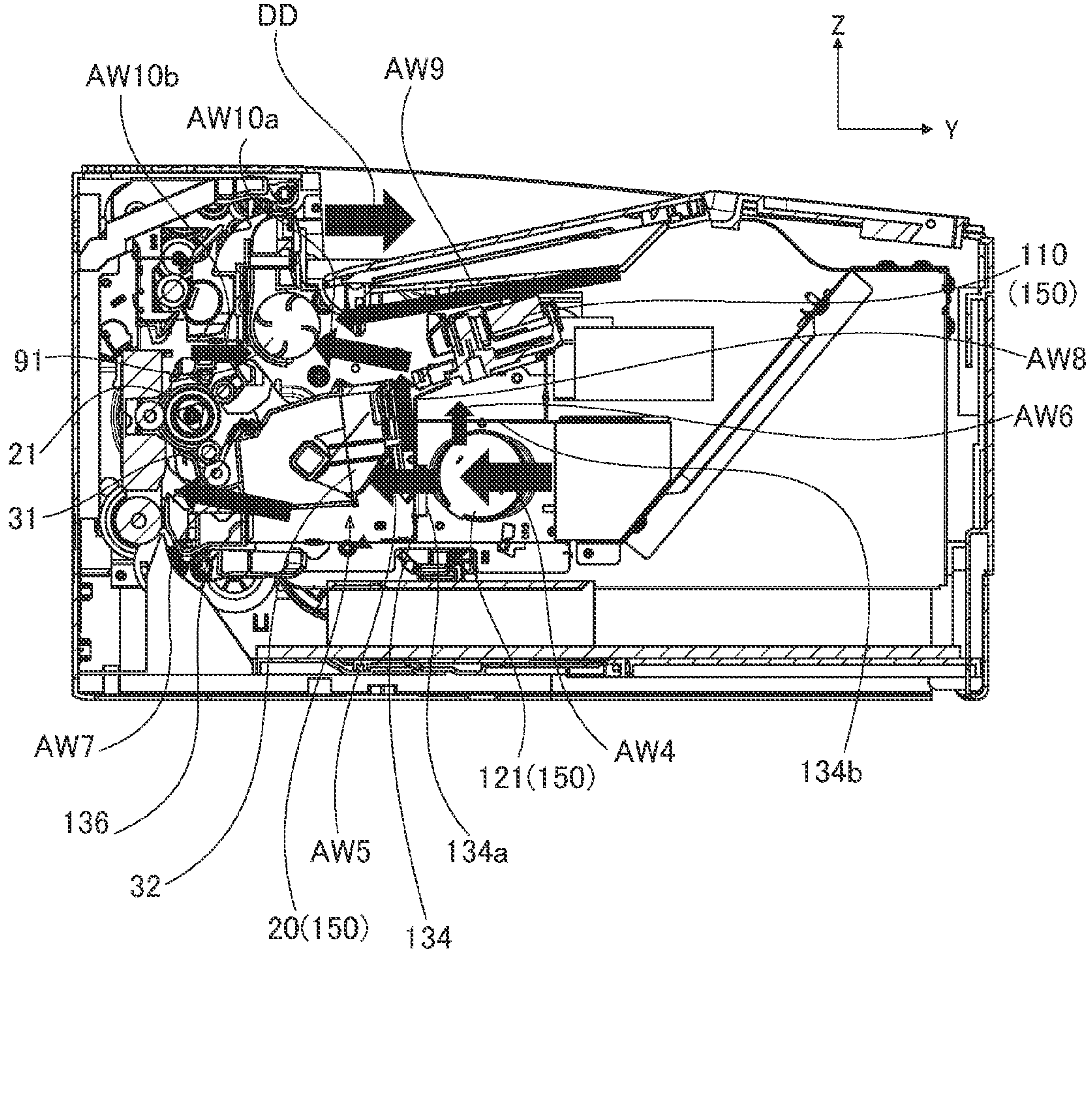
FIG. 13 is a cross-sectional view illustrating a cross section 13A-13A of FIG. 10.

The airflow paths generated in the interior of the apparatus body 100 by the intake unit 50 will be described using the FIGS. 10 to 13. FIG. 10 is a front view illustrating the apparatus body 100 viewed from the plus side in the Y direction. FIGS. 11 to 13 are cross-sectional views respectively illustrating cross sections 11A-11A, 12A-12A, and 13A-13A of FIG. 10.

As illustrated in FIG. 11, the intake fan 51 includes eight blades 55 having a blade shape of a turbofan, and rotates in the arrow K direction that is a counter-clockwise direction. To be noted, the number of the blades 55 is not limited to eight, and also the shape of the blades 55 is not limited to a shape presented by the present embodiment.

The blade shape of the turbofan is sometimes referred to as a centrifugal fan, and an air blow in a centrifugal direction is powerful. Therefore, the intake fan holder 52 around the intake fan 51 is formed into a shape in which a distance from a rotation center of the intake fan 51 is lengthened as the distance advances in the counter-clockwise direction. Thereby, it is possible to efficiently guide the outside air, drawn from the outside of the intake unit 50, in a minus Y direction as represented by an airflow path AW2. As illustrated in FIG. 12, the air drawn by the intake unit 50 is thereafter guided in a minus X direction, as represented by an airflow path AW3, by a duct shape of the intake fan holder 52, and enters inside of the second side plate 132 by passing through a ventilation hole 132*b* disposed in the second side plate 132. Thereafter, the air proceeding through the airflow path AW3 is guided to an airflow path AW4 by the duct sheet metal stay 137 illustrated in FIG. 3B. Since these airflow paths AW2, AW3, and AW4 pass through the vicinity of the drive motor 121, it is possible to efficiently cool the drive motor 121.

As illustrated in FIG. 13, a ventilation hole 134*a*, penetrating in the Y direction and leading to the process cartridge 20, and a ventilation hole 134*b*, penetrating in the Z direction and leading to the scanner unit 110, are disposed in the center sheet metal stay 134. The airflow path AW4 branches to an airflow path AW5, exiting from the ventilation hole 134*a*, and an airflow path AW6, exiting from the ventilation hole 134*b*. After having passed through the vicinity of the scanner unit 110, the airflow path AW6 merges with an airflow path AW10*a* which is a path of the air drawn by the exhaust unit 90. Thereby, it is possible to efficiently cool the scanner unit 110.

The airflow path AW5 proceeding in the minus Y direction branches to an airflow path AW7, passing through a lower side of the process cartridge 20, and an airflow path AW8, passing through a side of the process cartridge 20. After having passed through the vicinity of the process cartridge 20, the airflow path AW7 passes through the vicinity of the photosensitive drum 21, and merges with an airflow path AW10*b* which is a path of the air drawn by the exhaust unit 90. Thereby. it is possible to efficiently cool the process cartridge 20 and prevent the adhesion of the toner around the developing roller 31.

After having passed through the vicinity of the process cartridge 20, the airflow path AW8 merges with the airflow path AW10*a* described above. Thereby, it is possible to cool the process cartridge 20 and prevent the adhesion of the toner in an interior of the developing container 32.

In the present embodiment, the airflow quantity of the exhaust unit 90 is set so as to become slightly larger with respect to the airflow quantity of the intake unit 50. Therefore, airflow paths such as an airflow path AW9 different from the airflow paths generated by the intake unit 50 are generated. This airflow path AW9 is a path of the outside air passing through small gaps in the entire apparatus body 100. To be noted, while the airflow quantity of the exhaust unit 90 is preferably equal to or larger than the airflow quantity of the intake unit 50, equal to or less than the airflow quantity of the intake unit 50 is acceptable.

Figure 14A:
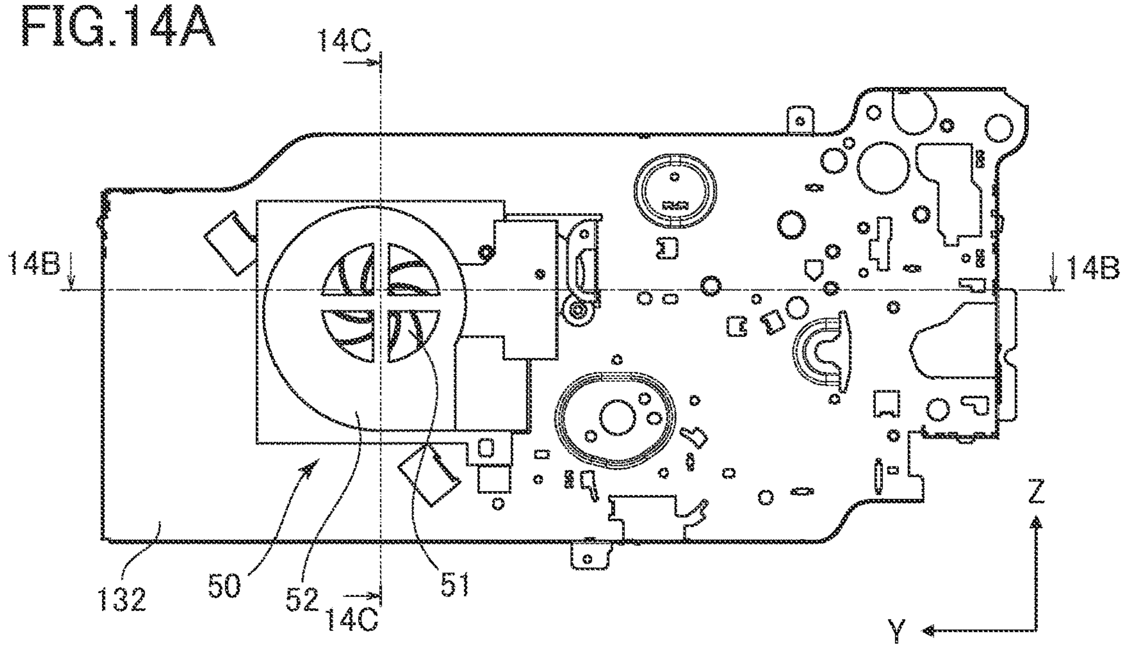
FIG. 14A is a front view illustrating the intake unit and the second side plate.
Figure 14B:
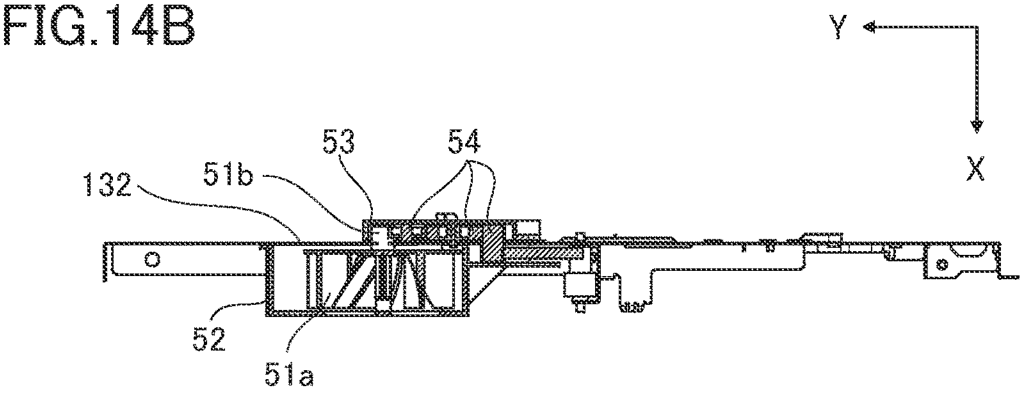
FIG. 14B is a cross-sectional view illustrating a cross section 14B-14B of FIG. 14A.
Figure 14C:
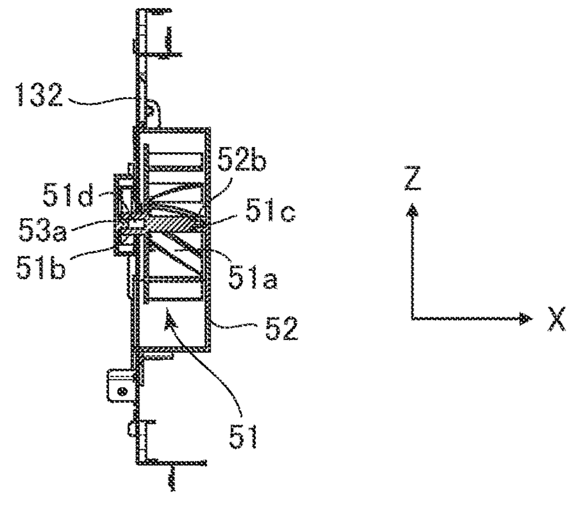
FIG. 14C is a cross-sectional view illustrating a cross section 14C-14C of FIG. 14A.

FIG. 14A is a front view illustrating the intake unit 50 and the second side plate 132, FIG. 14B is a cross-sectional view illustrating a cross section 14B-14B of FIG. 14A, and FIG. 14C is a cross-sectional view illustrating a cross section 14C-14C of FIG. 14A. As illustrated in FIG. 14B, the intake unit 50 includes an intake fan gear holder 53 arranged on the other side of the intake fan holder 52 across the second side plate 132. Further, the intake unit 50 includes an intake gear group 54, rotatably supported by the intake fan gear holder 53 and the second side plate 132, and transmitting the driving force of the drive motor 121 to the intake fan 51.

The intake fan 51 and the intake gear group 54 are fixed to the second side plate 132 via the intake fan holder 52 and the intake fan gear holder 53. The intake fan 51 includes a blade portion 51*a* and a gear portion 51*b*. The gear portion 51*b* and the intake gear group 54 are on the minus side in the X direction with respect to the second side plate 132, and the blade portion 51*a* is on the plus side in the X direction with respect to the second side plate 132. The gear portion 51*b* of the intake fan 51 engages with the intake gear group 54. By performing the engagement of the gear portion 51*b* with the intake gear group 54 in an inner side of the second side plate 132 (minus side in the X direction), without increasing the width of the image forming apparatus 1, it is possible to increase the width of the blade portion 51*a*, and is possible to increase the airflow quantity of the intake fan 51.

As illustrated in FIG. 14C, a boss 51*c* is disposed on the plus side in the X direction of the intake fan 51, and the boss 51*c* is supported by a bearing 52*b* disposed in the intake fan holder 52. Further, a hole 51*d* is disposed on the minus side in the X direction of the intake fan 51, and the hole 51*d* is supported by a boss 53*a* disposed in the intake fan gear holder 53. The boss 51*c* and the hole 51*d* integrally constitute the rotation shaft of the intake fan 51.

Cooling Effect by Combination of Intake Unit and Exhaust Unit

In the present embodiment, by devising a positional relationship between the exhaust unit 90 and the intake unit 50, the suppression of temperature rises in various units is performed efficiently. While the exhaust unit 90 contributes to discharging the warmed air from the interior of the apparatus body and the intake unit 50 contributes to drawing the low temperature outside air into the interior of the apparatus body, with either unit alone, the performance of suppressing the temperature rise is decreased.

For example, while, in a case where only the exhaust unit 90 is mounted in the image forming apparatus 1, the exhaust unit 90 collects the air from the entire apparatus evenly, in a case where an increase in the cooling performance of a specific unit is required, it is necessary to extend a duct toward such a unit. In a case where a unit which requires cooling is, like the drive motor 121, not very large and apart from the exhaust unit 90, since air resistance increases along with the extension of the duct toward the unit which requires cooling, the performance of the exhaust unit 90 is decreased.

Therefore, in the present embodiment, by arranging cooling object units 150 (refer to FIG. 13) between the exhaust unit 90 and the intake unit 50, the cooling of various units is performed efficiently without unnecessarily increasing the number of ducts which guide the air.

In the present embodiment, by arranging the drive motor 121, the scanner unit 110, and the process cartridge 20 between the exhaust unit 90 and the intake unit 50, these units are cooled efficiently. That is, the cooling object units 150 (refer to FIG. 13) include the drive motor 121, the scanner unit 110, and the process cartridge 20. Then, the cooling object units 150 are arranged on paths, in which the air is drawn into the interior of the sheet metal frame 130 by the intake unit 50 and heads toward the exhaust unit 90, that is, on the airflow paths.

In particular, as illustrated in FIG. 13, flow velocities of flows in the airflow paths AW4, AW5, AW7, AW10*b* route, the airflow paths AW4, AW5, AW8, AW10*a* route, and the airflow paths AW4, AW6, AW10*a* route are increased by the combination of air intake and exhaust. Then, the cooling performance around these flows is greatly increased. Then, by cooling the process cartridge 20, it is possible to prevent the solidification of the toner stored inside of the developing container 32. Further, by cooling the drive motor 121 and a motor disposed inside of the scanner unit 110, it is possible to continuously drive for a longer time, and, at the same time, is possible to extend a service life.

In the present embodiment, further, by arranging the exhaust unit 90 inside of the sheet metal frame 130 and by arranging the intake unit 50 outside of the sheet metal frame 130, the cooling performance of the cooling object units 150 is improved. Since, by this arrangement relationship, it is possible to increase a space between the exhaust unit 90 and the intake unit 50 so as to be able to increase the number of the cooling object units 150 arranged in the space, it is possible to cool a wider range of the cooling object units 150.

In the present embodiment, further, by securing the exhaust unit 90 and the intake unit 50 to the sheet metal frame 130 in directions different from each other, the cooling performance of the cooling object units 150 is improved. That is, the exhaust unit 90 is fixed to the plus side in the X direction of the sheet metal frame 130, and the intake unit 50 is fixed to the plus side in the Z direction of the sheet metal frame 130. Since, by this arrangement relationship, it is possible to increase the space between the exhaust unit 90 and the intake unit 50 so as to be able to increase the number of the cooling object units 150 arranged in the space, it is possible to cool the cooling object units 150 of a wider area. Further, since the exhaust unit 90 is configured so as to be wide in the X direction, it is possible to cool a wider range of the cooling object units 150.

In the present embodiment, further, the exhaust unit 90 is arranged above the intake unit 50 in the vertical direction VD. Further, at least part of the cooling object units 150 is arranged between the intake unit 50 and the exhaust unit 90 in the vertical direction VD. In the present embodiment, regarding any of the drive motor 121, the scanner unit 110, and the process cartridge 20, at least a part is arranged between the intake unit 50 and the exhaust unit 90 in the vertical direction VD. Since, generally, high temperature air rises, basically, the air naturally flows from below to above even in the interior of the apparatus body 100 without disposing a fan. Therefore, by the arrangement of the intake unit 50 and the exhaust unit 90 as described above, it is possible to construct the airflow paths in a manner so as to accelerate the natural flow of the air, and is possible to efficiently cool the cooling object units 150. Further, since it is possible to satisfactorily construct the paths of the airflow by the intake unit 50 and the exhaust unit 90, a mechanism or the like to switch an orientation of a blower port is not necessary, and it is possible to miniaturize the apparatus and reduce the cost.

Second Embodiment

While, next, a second embodiment of the present disclosure will be described, a configuration of the exhaust fan 91 of the first embodiment is changed in the second embodiment. Therefore, illustrations of configurations similar to the first embodiment will be omitted herein, or descriptions will be provided by putting the same reference characters on drawings.

FIG. 15A is a front view, when viewed from the plus side in the Y direction, illustrating an exhaust unit 290, FIG. 15B is a cross-sectional view illustrating a cross section 15B-15B of FIG. 15A, FIG. 15C is a cross-sectional view illustrating a cross section 15C-15C of FIG. 15A, and FIG. 15D is a cross-sectional view illustrating a cross section 15D-15D of FIG. 15A. As illustrated in FIG. 15A, the exhaust unit 290 of the present embodiment includes an exhaust fan 291, serving as a fan, and the exhaust fan holder 92.

The exhaust fan 291 includes a plurality (in the present embodiment, 4 units) of blower units 91*b* and a plurality (in the present embodiment, 3 ribs) of cross-shaped ribs 98 connecting adjacent two blower units 91*b*. Also in the present embodiment, as with the first embodiment, by appropriately setting the length Lw and the diameter Dw depending on an arrangement space of the exhaust unit 290 in the image forming apparatus 1, it is possible to fix the airflow quantity of the exhaust fan 291.

As illustrated in FIG. 16A, the exhaust fan 291 of the present embodiment includes four blower units 91*b*. By disposing a plurality of blower units and connecting the blower units 91*b* using the cross-shaped ribs 98 as described above, in a case where it is not necessary to cool the entire width of the cooling object units 150 (refer to FIG. 13), it is possible to reduce a load of the drive motor 121. Therefore, it is possible to miniaturize the drive motor 121 and reduce the cost. Further, it is possible to configure in a manner so as not to deliver the air to a place in which the cooling is not desirable. Further, it is also suitable to a case where a small airflow quantity is sufficient for cooling the cooling object units 150 (refer to FIG. 13).

To be noted, it is acceptable to configure such that, as with the first embodiment, the air is drawn into the interior of the apparatus body 100 from such as the gaps of the exterior members, the gap with the floor surface, and the sheet feed tray 62. Further, in a case where the improvement in the cooling performance of the cooling object units 150 is desired, it is acceptable to dispose a louver to the exterior member and guide the air discharged from the exhaust unit 290 to the cooling object units 150.

Further, while, in the present embodiment, the exhaust fan 291 includes the four blower units 91*b*, it is not limited to this. For example, as illustrated in FIG. 16B, in a case where the cooling object units 150 are disposed only in the center in the X direction (width direction) of the interior of the apparatus body 100, it is acceptable that the exhaust fan 291B includes only one blower unit 91*b*. It is acceptable to configure such that the blower unit 91*b* is disposed in the center in the X direction (width direction) of the interior of the apparatus body 100 and the air delivered by the blower unit 91*b* is, for example, guided to the cooling object units 150 by a louver.

Further, in a case where it is desired to send the air to the center and both ends in the X direction (width direction) of the interior of the apparatus body 100, as illustrated in FIGS. 16C and 16D, it is acceptable to include three blower units 91*b* in each of an exhaust fan 291C and an exhaust fan 291D. The blower unit 91*b* arranged in the center in the X direction of the exhaust fan 291D is configured so as to be wider than the blower unit 91*b* arranged in the center in the X direction of the exhaust fan 291C. It is acceptable to appropriately set the width of the blower unit 91*b* in accordance with the cooling object units 150.

As described above, with the present embodiment, in addition to the effects of the first embodiment, it is possible to prevent the delivery of the air to a place in which the cooling is not desirable, and is possible to improve usability. Further, it is possible to miniaturize the drive motor 121 and reduce the cost.

Third Embodiment

While, next, a third embodiment of the present disclosure will be described, configurations of the exhaust fan 91 and the exhaust fan holder 92 of the first embodiment are changed in the third embodiment. Therefore, illustrations of configurations similar to the first embodiment will be omitted herein, or descriptions will be provided by putting the same reference characters on drawings.

Figure 17A:
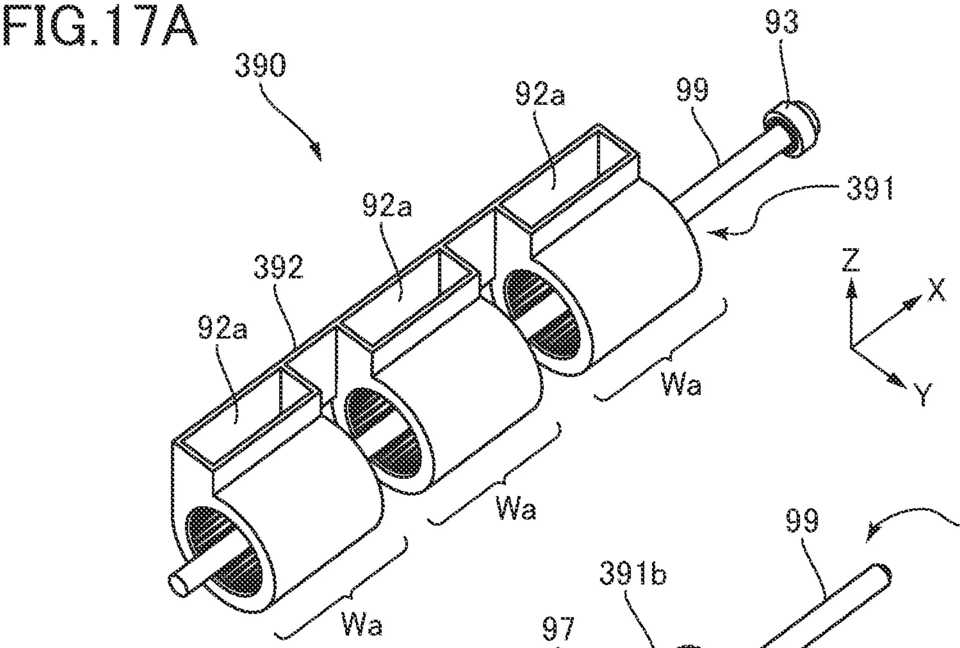
FIG. 17A is a perspective view illustrating an exhaust unit of a third embodiment.
Figure 17B:
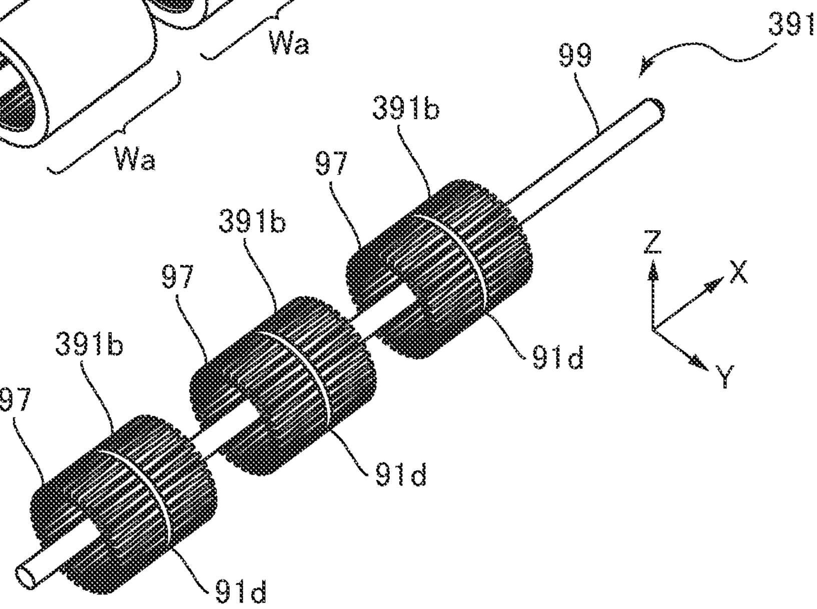
FIG. 17B is a perspective view illustrating an exhaust fan.
Figure 17C:
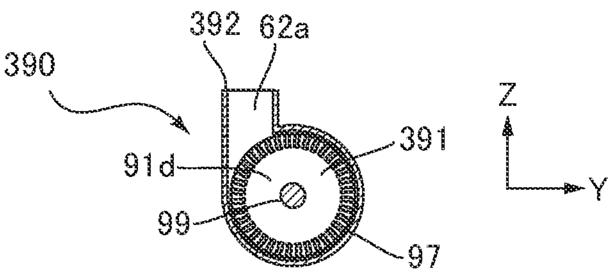
FIG. 17C is a cross-sectional view illustrating the exhaust unit.

As illustrated in FIGS. 17A to 17C, an exhaust unit 390 of the present embodiment includes an exhaust fan 391 and an exhaust fan holder 392. The exhaust fan 391, serving as the fan, includes a rotation shaft 99 and a plurality (in the present embodiment, three units) of blower units 391*b*. The blower unit 391*b* includes ribs 91*d* fixed to the rotation shaft 99 and a plurality of blades 97 fixed to the ribs 91*d*. In the present embodiment, each of the blower unit 391*b* includes thirty blades 97.

The exhaust fan holder 392 includes three blower ports 92*a* that are a plurality of opening portions discharging the air sent from each of the blower units 391*b*. Each of the blower ports 92*a* has a width Wa in the X direction corresponding to the width of the blade 97. Since, as described above, by delivering the air by forming the blower ports 92*a* only in areas in which the blades 97 are disposed, it becomes possible to more intensively deliver a large quantity of airflow to units and members that require cooling, it is possible to cool efficiently.

In this case, the units and members which are cooled are limited to units and members whose temperatures are higher than a temperature of the air drawn by the blades 97. It is acceptable to configure such that, as with the first embodiment, the air is drawn into the interior of the apparatus body 100 from such as the gaps of the exterior members, the gap with the floor surface, and the sheet feed tray 62. Further, in the case where the improvement in the cooling performance of the cooling object units 150 is desired, it is acceptable to dispose a louver in exterior members.

To be noted, while, in the present embodiment, the exhaust unit 390 includes three blower units 391*b* and three blower ports 92*a*, it is not limited to this. For example, it is acceptable that the number of each of the blower units 391*b* and the blower ports 92*a* is two or equal to or more than four. Further, the number of the blades 97 of the blower unit 391*b* is not limited to thirty. Further, also a shape and the width of the blade 97 are not limited, and, for example, it is acceptable to be either shorter or longer than the width Wa.

As described above, with the present embodiment, in addition to the effects of the first embodiment, it is possible to prevent the delivery of the air to a place in which the cooling is not desirable, and is possible to improve the usability. Further, it is possible to miniaturize the drive motor 121 and reduce the cost.

Fourth Embodiment

While, next, a fourth embodiment of the present disclosure will be described, a configuration of the exhaust fan 391 of the third embodiment is changed in the fourth embodiment. Therefore, illustrations of configurations similar to the first embodiment will be omitted herein, or descriptions will be provided by putting the same reference characters on drawings.

Figure 18A:
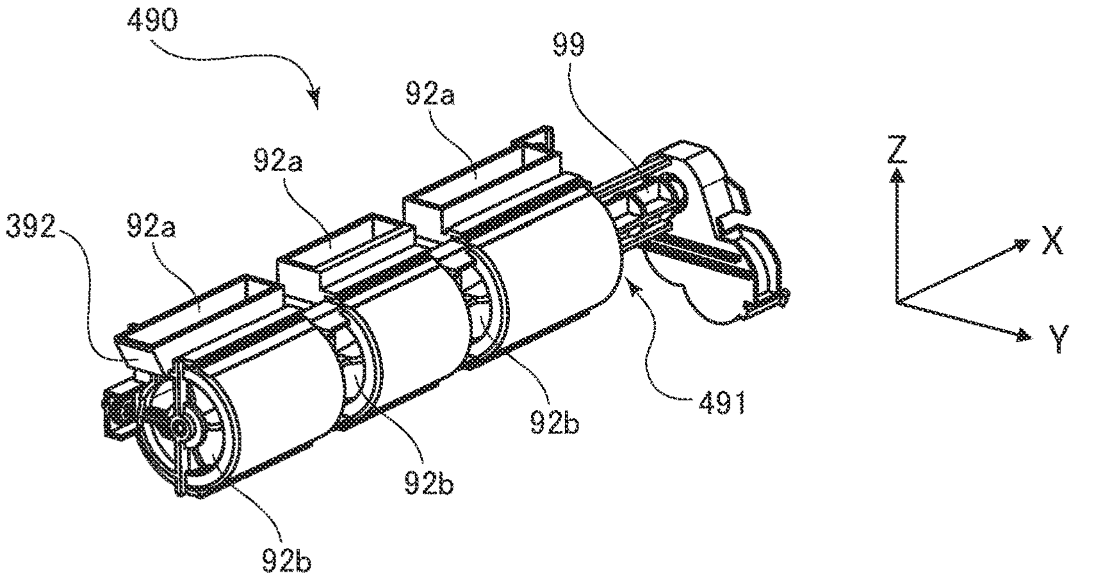
FIG. 18A is a perspective view illustrating an exhaust unit of a fourth embodiment.
Figure 18B:
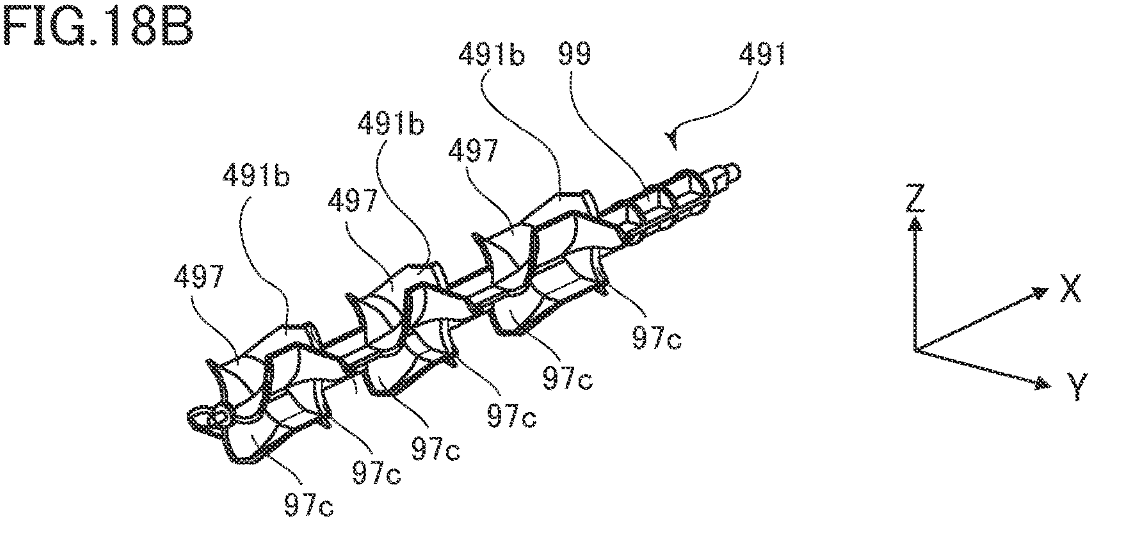
FIG. 18B is a perspective view illustrating an exhaust fan.
Figure 18C:
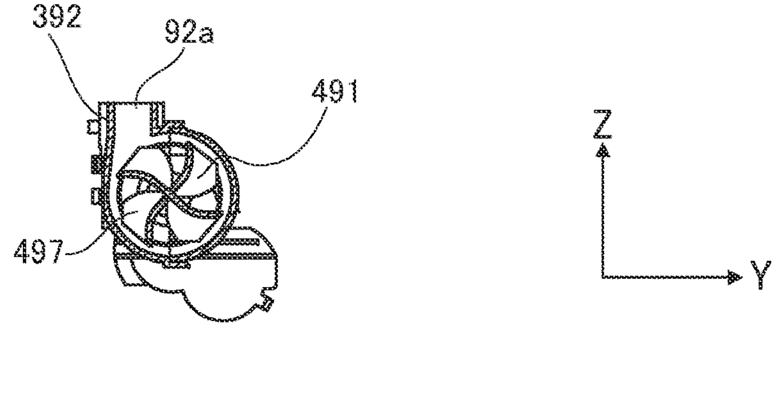
FIG. 18C is a cross-sectional view illustrating the exhaust unit.

As illustrated in FIGS. 18A to 18C, an exhaust unit 490 of the present embodiment includes an exhaust fan 491 and an exhaust fan holder 392. The exhaust fan 491, serving as the fan, includes the rotation shaft 99 and a plurality (in the present embodiment, three units) of blower units 491*b*. The blower unit 491*b* includes a plurality (in the present embodiment, four blades) of blades 497.

The exhaust fan holder 392 includes intake holes 92*b* on the minus side in the X direction, and, as with the intake fan 51, the blade 497 has the blade shape of the turbofan. Further, the blade 497 has a helical portion 97*c* in which a portion close to the intake hole 92*b* is twisted in a helical shape. Thereby, since the helical portion 97*c* of the blade 497 becomes a shape close to a blade shape of a propeller fan, it is possible to accelerate the air drawn from the intake hole 92*b* in the X direction, and is possible to send the air with higher airflow pressure.

Fifth Embodiment

While, next, a fifth embodiment of the present disclosure will be described, a configuration of the exhaust unit 90 of the first embodiment is changed in the fifth embodiment. Therefore, illustrations of configurations similar to the first embodiment will be omitted herein, or descriptions will be provided by putting the same reference characters on drawings.

Figure 19A:
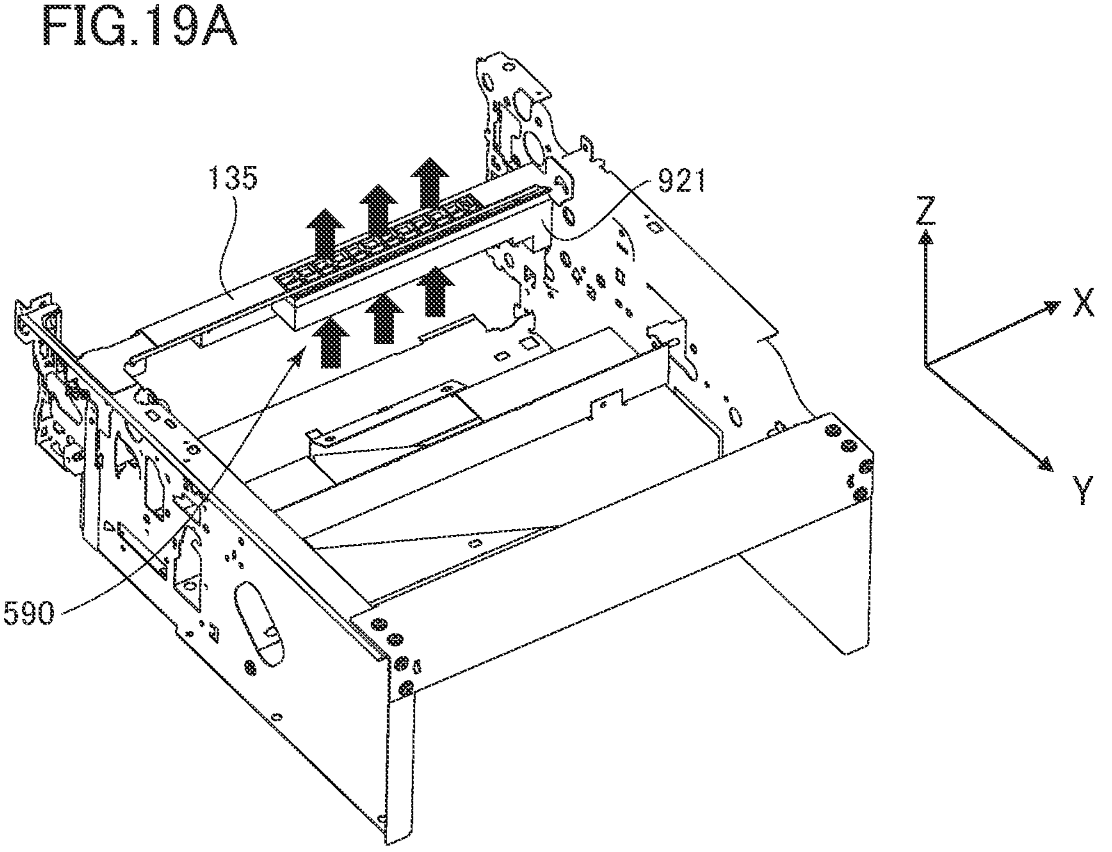
FIG. 19A is a perspective view illustrating an exhaust unit of a fifth embodiment.
Figure 19B:
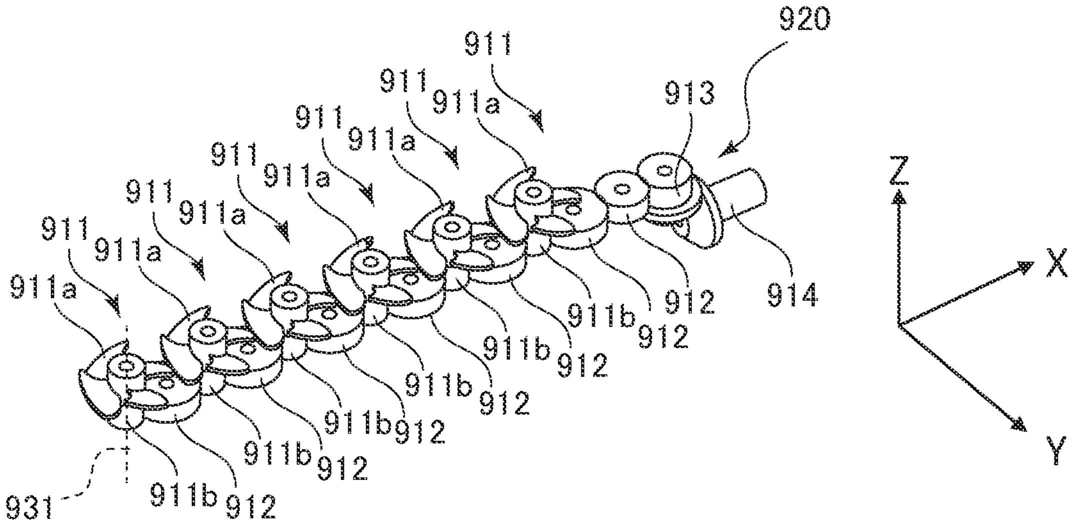
FIG. 19B is a perspective view illustrating an exhaust fan and a drive transmission unit.

As illustrated in FIGS. 19A and 19B, an exhaust unit 590 includes an exhaust fan holder 921, fixed to the back sheet metal stay 135, and a plurality of exhaust fans 911 held by the exhaust fan holder 921. As illustrated by arrows in FIG. 19A, the exhaust unit 590 draws the air from the minus side in the Z direction of the exhaust fan holder 921, and discharges the air from ventilation holes disposed in the back sheet metal frame 135 to the plus side in the Z direction. As illustrated in FIG. 8. the air discharged from the exhaust unit 590 is guided to the arrow M and N directions, and is discharged toward the sheet discharge tray 81.

As illustrated in FIG. 19B, the exhaust fan 911 is rotatable around a rotation shaft 931 extending in the Z direction as a center, and includes a plurality (in the present embodiment, four portions) of blade portions 911*a* and a gear portion 911*b*. That is, the exhaust fan 911 rotates around the rotation shaft 931 extending in a direction intersecting with the X direction as a center. The driving force of the drive motor 121 (refer to FIG. 5A) is transmitted by a drive transmission unit 920. The drive transmission unit 920 includes bevel gears 913 and 914 and a gear group 912 constituted by a plurality of gears.

Figure 20A:
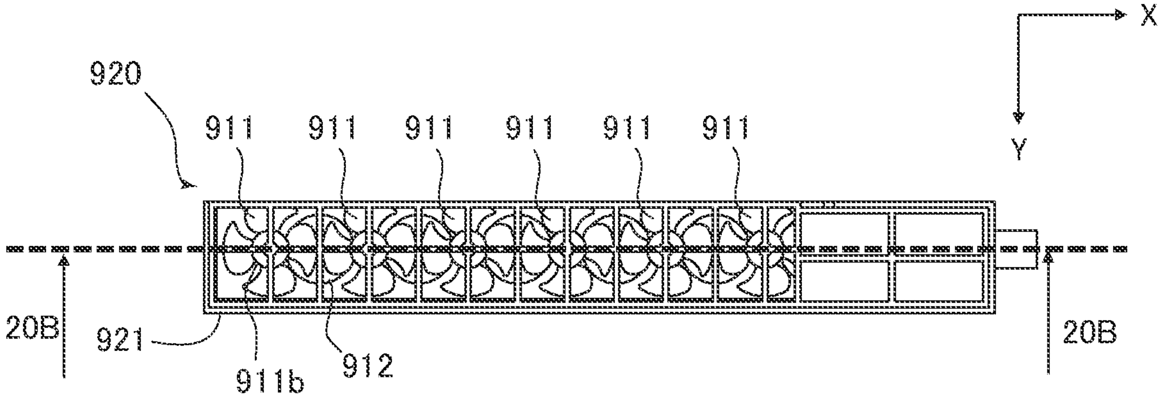
FIG. 20A a front view illustrating the exhaust unit.
Figure 20B:
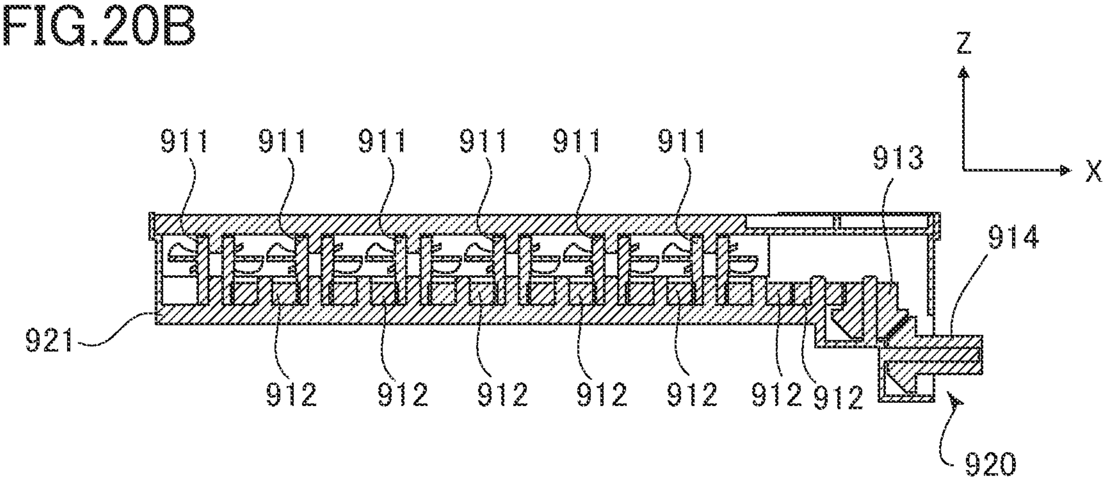
FIG. 20B is a cross-sectional view illustrating a cross section 20B-20B of FIG. 20A.

FIG. 20A is a front view illustrating the exhaust unit 590, and FIG. 20B is a cross-sectional view illustrating a cross section 20B-20B of FIG. 20A. As illustrated in FIGS. 19B to 20B, the bevel gear 914 rotates around a rotation shaft extending in the X direction as a center, and the bevel gear 913, the gear group 912, and the gear portion 911*b* of the exhaust fan 911 rotates around rotation shafts extending in the Z direction as centers. That is, rotation shaft directions of gears of the drive transmission unit 920 are changed by 90 degrees by the plurality of bevel gears 913 and 914. The gear group 912 transmits the drive to each of the gear portions 911*b* of the exhaust fans 911.

As described above, with the present embodiment. the rotation shaft directions of the gears are changed by 90 degrees by the drive transmission unit 920. Therefore, since it is possible to improve the freedom of the rotation shaft direction of the exhaust fan 911, it becomes possible to reduce size by changing an exhaust fan type and match the exhaust fan performance with configurations of surrounding units.

To be noted, while, in the present embodiment, the drive transmission unit 920 includes the two bevel gears 913 and 914, it is not limited to this. For example, the drive transmission unit 920 can include any number of bevel gears, as long as it is an even number.

Sixth Embodiment

Figure 21:
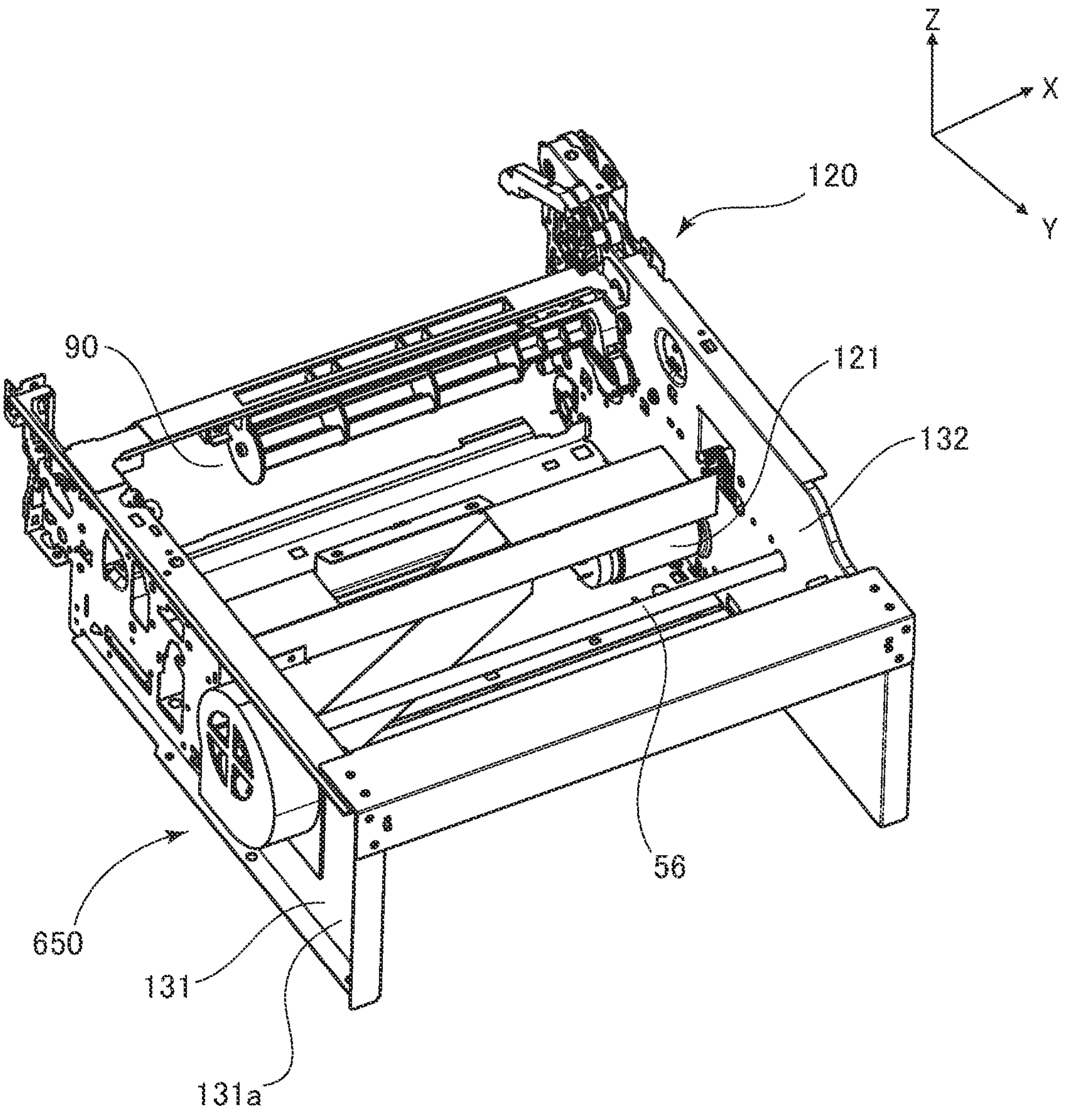
FIG. 21 is a perspective view illustrating an exhaust unit of a sixth embodiment.

While, next, a sixth embodiment of the present disclosure will be described, a configuration of the intake unit 50 of the first embodiment is changed in the sixth embodiment. As illustrated in FIG. 21, an intake unit 650 of the present embodiment is fixed to the first side plate 131 of the sheet metal frame 130. In particular, the intake unit 650 is arranged on the other side of the second side plate 132 with respect to the first side plate 131 in the X direction, and fixed to an outer surface 131*a* of the first side plate 131. To be noted, the intake unit 650 is configured similarly to the intake unit 50 of the first embodiment.

A drive transmission shaft 56 extending in the X direction is rotatably supported by the first and second side plates 131 and 132. The drive transmission shaft 56 transmits the driving force of the drive motor 121 supported by the second side plate 132 to the intake unit 650 supported by the first side plate 131. Thereby, the intake unit 650 is driven. Since the intake unit 650 draws the air from the minus side in the X direction, airflow paths of the image forming apparatus 1 become symmetrical in the X direction with respect to the first embodiment.

To be noted, while only the intake unit 650 fixed to the first side plate 131 is disposed in the present embodiment, it is not limited to this. For example, it is acceptable to dispose both of the intake unit 650 fixed to the first side plate 131 and the intake unit 50 fixed to the second side plate 132. Thereby, it is possible to improve a cooling capacity to cool the cooling object units 150.

Seventh Embodiment

Overall Configuration of Image Forming Apparatus

Figure 22:
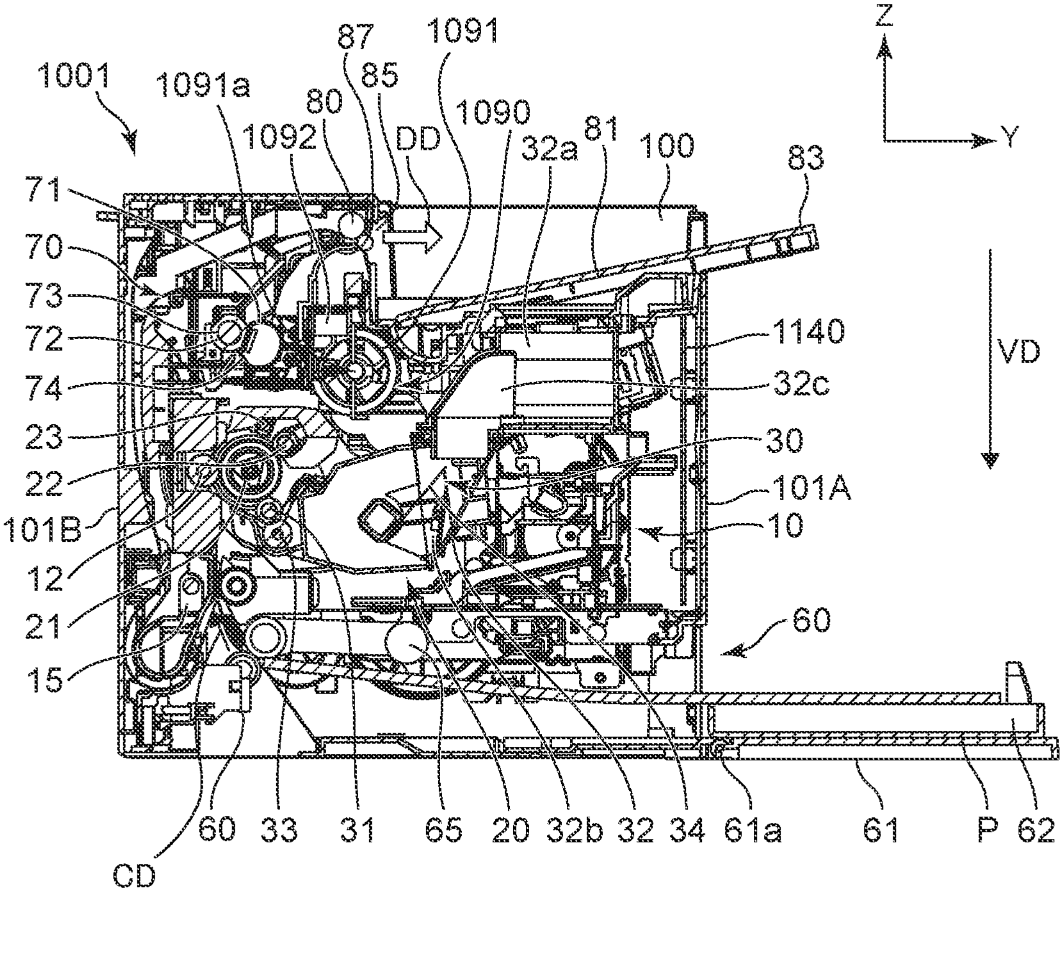
FIG. 22 is an overall schematic diagram illustrating an image forming apparatus of a seventh embodiment.

FIG. 22 is a schematic diagram illustrating an overall configuration of an image forming apparatus 1001. To be noted, in FIG. 22, reference characters as used in FIG. 1 are put on configurations with functions similar to those in FIG. 1. The image forming apparatus 1001 includes an image forming unit 10 forming a toner image on a sheet P, a sheet feed unit 60 feeding the sheet P, a fixing unit 70 fixing the toner image formed by the image forming unit 10 on the sheet P, and a sheet discharge roller pair 80. Further, an apparatus body 100 of the image forming apparatus 1001 includes a control unit, not shown, controlling an image forming operation performed by the image forming unit 10 with respect to the sheet P.

The image forming unit 10 includes a scanner unit 110 (illustrated in FIG. 32), a process cartridge 20, and a transfer roller 12. The process cartridge 20 includes a photosensitive drum 21, a charge roller 22 arranged around the photosensitive drum 21, a pre-exposure unit 23, and a developing unit 30 including a developing roller 31.

The photosensitive drum 21 is a photosensitive member formed in a cylindrical shape. Further, the photosensitive drum 21, serving as an image bearing member, is rotatably driven at a predetermined process speed in a clockwise direction in FIG. 22 by a drive motor 1121 (refer to FIG. 24A). Along with the rotation of the photosensitive drum 21, a surface of the photosensitive drum 21 is sequentially charged by the charge roller 22.

The scanner unit 110 (illustrated in FIG. 32) scans and exposes the surface of the photosensitive drum 21 by irradiating the photosensitive drum 21 with a laser beam, corresponding to image information input from an external apparatus, by using a polygon mirror. By this exposure, an electrostatic latent image corresponding to the image information is formed on the surface of the photosensitive drum 21. To be noted, the scanner unit 110 is not limited to the configuration described above, and, for example, it is acceptable to apply a light-emitting diode (LED) exposure unit including an LED array in which a plurality of LEDs are arranged in a row along a longitudinal direction of the photosensitive drum 21.

The developing unit 30 includes the developing roller 31, serving as a developer bearing member bearing developer (toner), a developing container 32, which becomes a frame body of the developing unit 30, and a developer feed roller 33 capable of feeding the developer to the developing roller 31. The developing roller 31 and the developer feed roller 33 are rotatably supported by the developing container 32.

The developing unit 30 of the present embodiment uses a contact developing system as a developing system. That is, the developing roller 31 comes into contact with the photosensitive drum 21. A developing voltage is applied to the developing roller 31 by a developing high voltage power source. By the transfer of the toner, borne by the developing roller 31, from the developing roller 31 to the drum surface in accordance with potential distribution on the surface of the photosensitive drum 21 under the developing voltage, the electrostatic latent image is developed to the toner image.

To be noted, while details will be described below, a toner pack 40 (refer to FIG. 25B) that is a toner replenishing container is attachable and detachable to and from the image forming apparatus 1001 of the present embodiment. The developing container 32 includes a replenishing port 32*a*, to and from which the toner pack 40 is attached and detached, a storage portion 32*b*, and a replenishing portion 32*c*. The storage portion 32*b* includes the developing roller 31, the developer feed roller 33, and an agitation member 34 agitating the toner, inside. The replenishing portion 32*c* connects the replenishing port 32*a* and the storage portion 32*b*, and guides the toner, replenished from the toner pack 40, to the storage portion 32*b*.

The sheet feed unit 60 includes a front cover 61, openable and closable with respect to the apparatus body 100 (also referred to as a casing), a sheet feed tray 62, and a vertically movable pickup roller 65. With the configuration of the present embodiment, by opening the front cover 61 to the plus side in the Y direction around a front cover pivot center 61*a* as a center, it becomes possible to place the sheet P on the sheet feed tray 62.

The fixing unit 70 is a heat-fixing type performing a fixing process by heating and melting the toner. The fixing unit 70 includes a fixing film 71, a heater 74 (heating member), such as a ceramic heater, heating the fixing film 71, and a thermistor, not shown, measuring a temperature of the fixing heater. Further, the fixing unit 70 includes a press roller 72 (pressing member) forming a fixing nip with the heater 74 via the fixing film 71 and applying pressure to the sheet P The press roller 72 is rotatable around a rotation shaft 73 as a center.

Figure 23A:
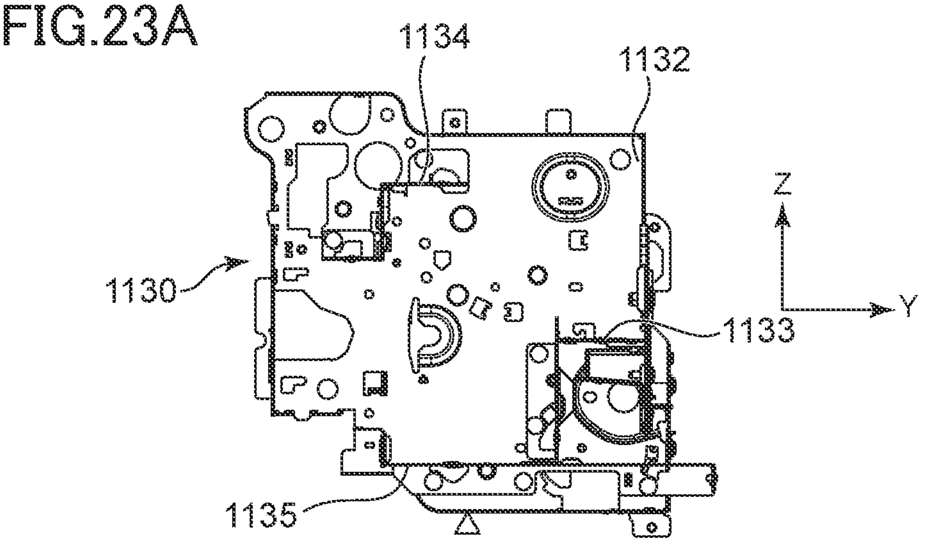
FIG. 23A is a side view illustrating a sheet metal frame.
Figure 23B:
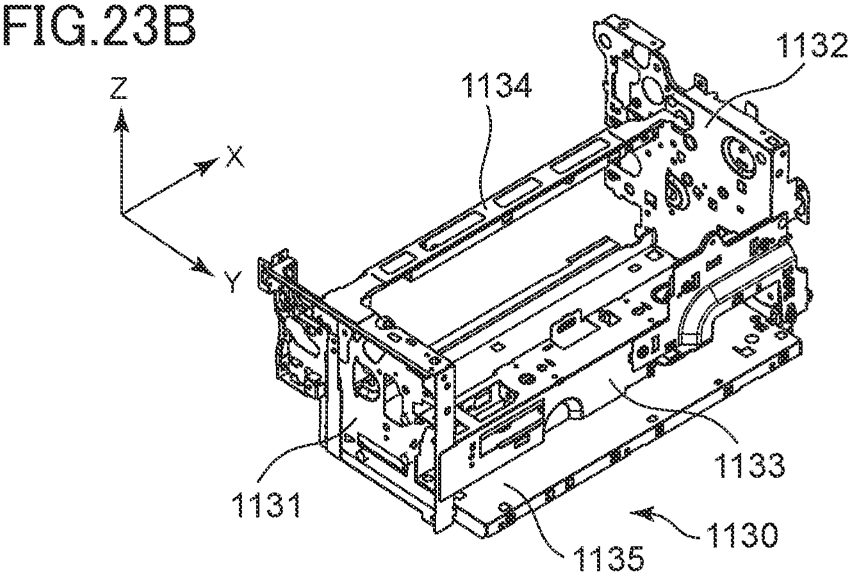
FIG. 23B is a perspective view illustrating the sheet metal frame.
Figure 23C:
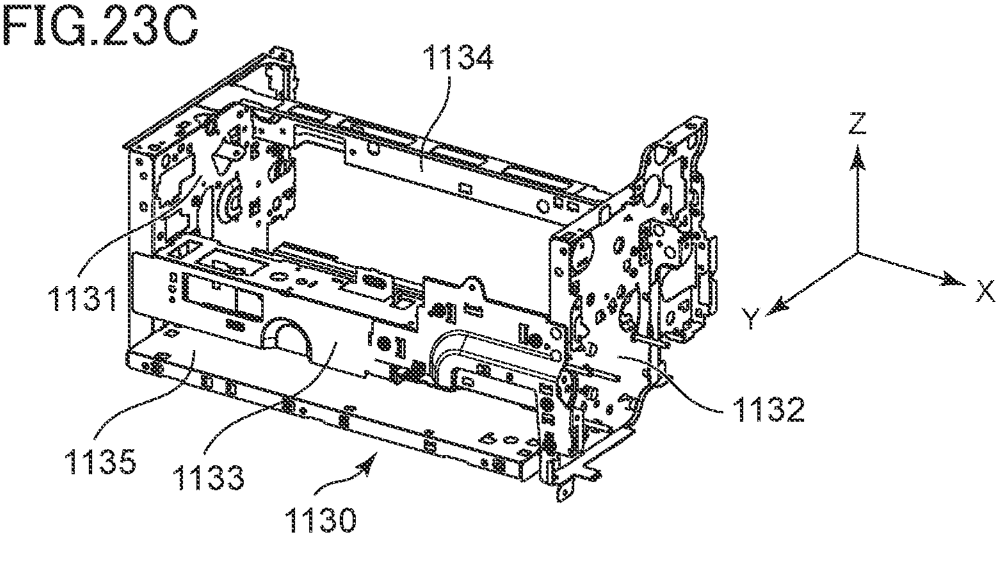
FIG. 23C is the other perspective view illustrating the sheet metal frame.

As illustrated in FIGS. 23A to 23C, the image forming apparatus 1001 includes a sheet metal frame 1130, serving as a frame. The sheet metal frame 1130 is a framework which maintains the whole strength of the apparatus body 100. Using FIGS. 23A to 23C, the sheet metal frame 1130 will be described. FIG. 23A is a side view illustrating only the sheet metal frame 1130 taken from the overall schematic diagram illustrated in FIG. 22, and FIGS. 23B and 23C are perspective views illustrating the sheet metal frame 1130. The sheet metal frame 1130 includes a first side plate 1131 and a second side plate 1132 disposed in parallel in the X direction which is a width direction orthogonal to a sheet conveyance direction CD (refer to FIG. 22). The second side plate 1132 is arranged farther to the plus side in the X direction, that is, farther to the downstream side in the X direction, than the first side plate 131.

Further, the sheet metal frame 1130 includes a front sheet metal stay 1133, connecting the first and second side plates 1131 and 1132, a back sheet metal stay 1134, and a lower sheet metal stay 1135. These three sheet metal stays each extend in the X direction, and first ends and second ends of these stays are respectively fixed to the first and second side plates 1131 and 1132.

Figure 24A:
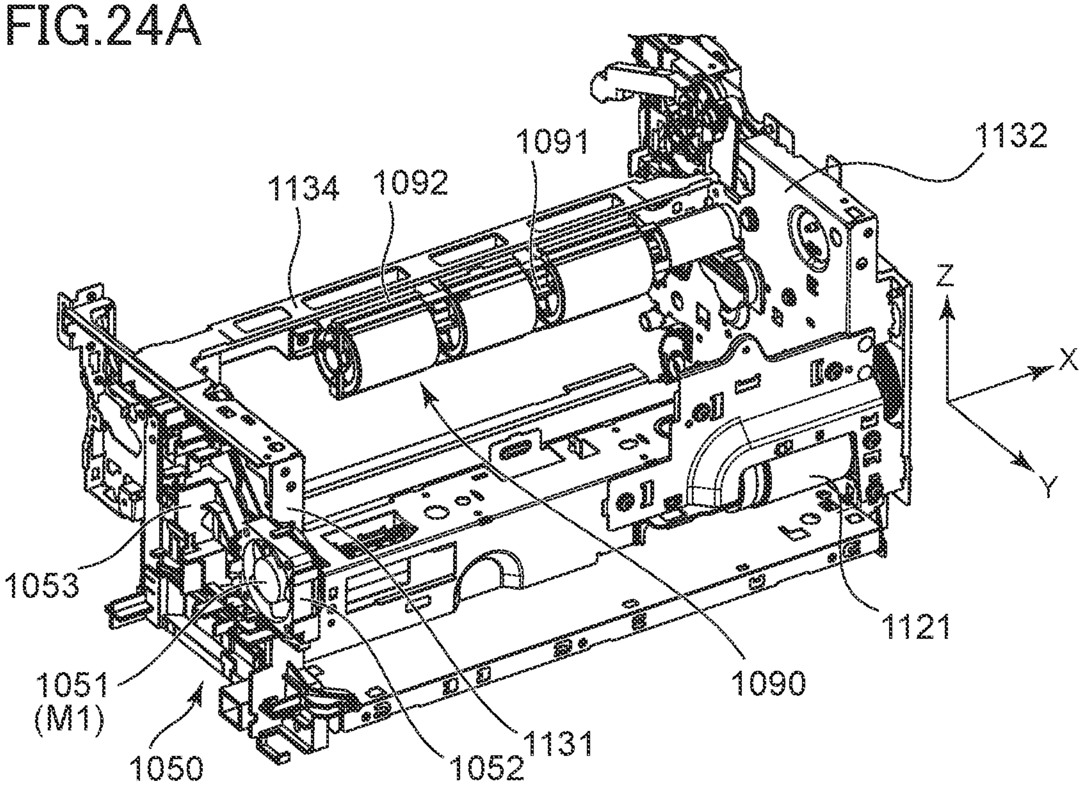
FIG. 24A is a perspective view illustrating a sheet metal frame, an intake unit, an exhaust unit, and a drive unit.
Figure 24B:
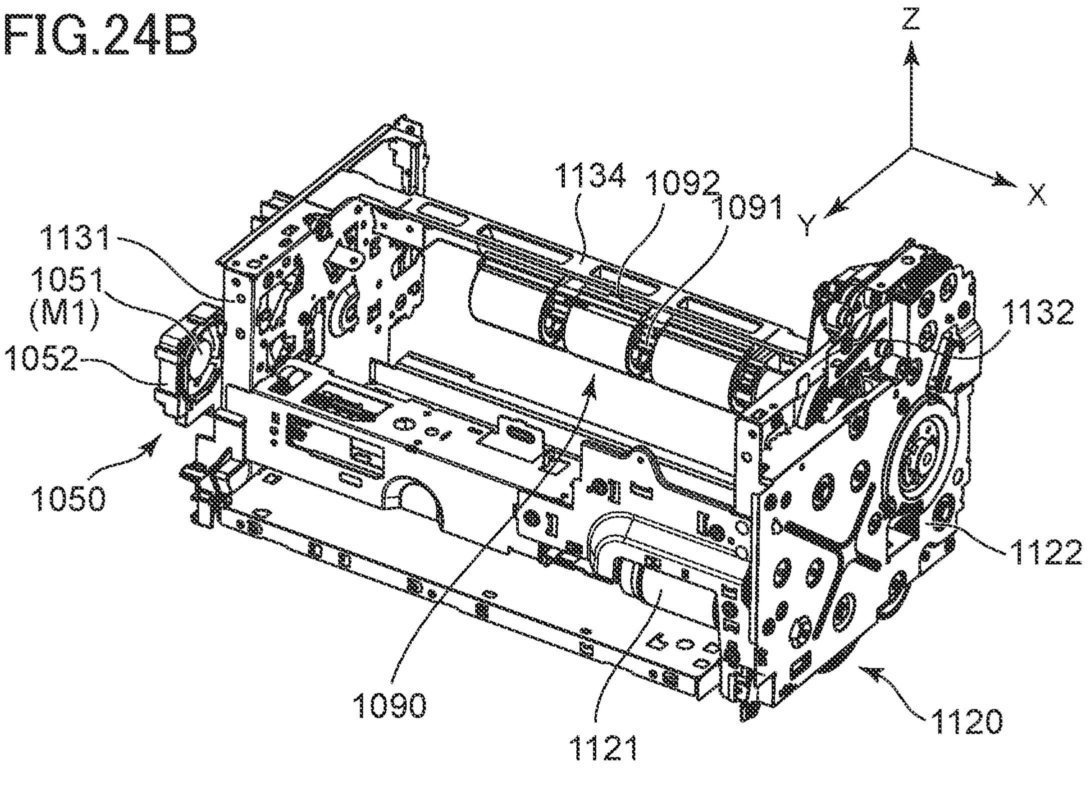
FIG. 24B is the other perspective view illustrating the sheet metal frame, the intake unit, the exhaust unit, and the drive unit.

The image forming apparatus 1001 of the present embodiment includes a plurality of blower units so as to cool such as the process cartridge 20, the scanner unit 110, and the sheet P stacked on the sheet discharge tray 81. In particular, the image forming apparatus 1001 includes an exhaust unit 1090 fixed to the back sheet metal stay 1134, serving as a connection frame, and an intake unit 1050 fixed to the first side plate 1131. A positional relationship between the exhaust unit 1090 and the intake unit 1050 is illustrated in FIGS. 24A and 24B. Here, a sheet discharge direction DD (refer to FIG. 22) in which the sheet P is discharged from a sheet discharge port 85 is a direction parallel to the Y direction in FIG. 22, and a width direction of the sheet P orthogonal to the sheet discharge direction DD is a direction parallel to the X direction.

As illustrated in FIGS. 24A and 24B, the intake unit 1050 is arranged on a side of the first end with respect to the width direction parallel to the X direction, and at least part of the exhaust unit 1090 is arranged on a side of the second end with respect to the width direction. In more particular, the intake unit 1050 is arranged on the minus side in the X direction with respect to the center in the X direction of the sheet metal frame 1130, and the exhaust unit 1090 is arranged closer to the plus side in the X direction with respect to the center in the X direction of the sheet metal frame 1130. In other words, the exhaust unit 1090 is arranged closer to the second side plate 1132 than the first side plate 1131 in the X direction.

While details will be described below, the intake unit 1050 includes an intake fan 1051, incorporating a motor M1, and an intake fan holder 1052, supporting the intake fan 1051 and forming an airflow path. The intake fan holder 1052 is supported by a holder supporting member 1053, and the holder supporting member 1053 is supported by the first side plate 1131. The exhaust unit 1090 includes an exhaust fan 1091, driven by a gear, and an exhaust fan holder 1092, rotatably supporting the exhaust fan 1091 and forming the airflow path.

As illustrated in FIG. 22, a rotation shaft 1091*a* of the exhaust fan 1091 is arranged downstream of the rotation shaft 73 of the press roller 72 in the sheet discharge direction DD (Y direction). Further, the exhaust fan 1091 is arranged directly above the developing unit 30 in a vertical direction VD, and, in a top view, the exhaust fan 1091 and part of the developing unit 30 overlap each other. Further, in the top view, in the developing unit 30, the exhaust fan 1091 overlaps part of the storage portion 32*b* included in the developer container 32, but does not overlap the replenishing portion 32*c*.

As illustrated in FIG. 24B, a drive unit 1120 is fixed to an outer surface of the second side plate 1132. The drive unit 1120 is a unit including a drive motor 1121 and a plurality of gears transmitting driving force of the drive motor 1121 to the sheet feed unit 60, the image forming unit 10, the fixing unit 70, and the exhaust unit 1090. That is, the drive motor 1121, serving as a driving source, drives such as the process cartridge 20, serving as a cartridge, and the exhaust unit 1090, but does not drive the intake unit 1050. The intake unit 1050 is driven by the motor M1, different from the drive motor 1121, incorporated in the intake unit 1050.

FIGS. 24A and 24B illustrate perspective views of the drive unit 1120, the sheet metal frame 1130, the intake unit 1050, and the exhaust unit 1090. The drive unit 1120 is disposed on a side of a second end of the image forming apparatus 1001 in the width direction parallel to the X direction, and fixed to the second side plate 1132. The plurality of gears of the drive unit 1120 are held by the second side plate 1132 and a drive sheet metal frame 1122. The drive motor 1121 is held on the minus side in the X direction with respect to the second side plate 1132.

Operation of Image Forming Apparatus

Next, with reference to FIG. 22, an image forming operation of the image forming apparatus 1001 will be described. When an instruction of image formation is input to the image forming apparatus 1001, an image forming process is started by the image forming unit 10 based on the image information input from an external computer connected to the image forming apparatus 1001. The scanner unit 110 emits the laser beam toward the photosensitive drum 21 based on the input image information. At this time, the photosensitive drum 21 has been charged by the charge roller 22 beforehand, and, by being irradiated with the laser beam, the electrostatic latent image is formed on the photosensitive drum 21. Thereafter, this electrostatic latent image is developed by the developing roller 31, and the toner image is formed on the photosensitive drum 21.

In parallel with the image forming process described above, the pickup roller 65 of the sheet feed unit 60 sends the sheet P placed on the sheet feed tray 62. The sheet P is conveyed to a registration roller pair 15 by the pickup roller 65, and skew is corrected by abutting onto a nip of the registration roller pair 15. Then, the registration roller pair 15 is driven in synchronization with the transfer timing of the toner image, and coveys the sheet P toward a transfer nip formed by the transfer roller 12 and the photosensitive drum 21.

A transfer voltage is applied to the transfer roller 12 from a transfer high voltage power source, and the toner image borne on the photosensitive drum 21 is transferred onto the sheet P conveyed by the registration roller pair 15. The sheet P onto which the toner image has been transferred is conveyed to the fixing unit 70, and the toner image is heated and pressed at a time passing through the fixing nip formed by the fixing film 71 and the press roller 72 of the fixing unit 70. Thereby, a toner particle is melted and then fixed, so that the toner image is fixed on the sheet P.

The sheet P which has passed through the fixing unit 70 is discharged from a sheet discharge port 85, formed in the apparatus body 100, to the outside by the sheet discharge roller pair 80. A direction in which the sheet P is discharged from the sheet discharge port 85 is represented by the sheet discharge direction DD in FIG. 22. The sheet P is discharged outside from the sheet discharge port 85, and stacked on a sheet discharge tray 81 arranged on an upper part of the apparatus body 100.

Attachment and Detachment Configuration of Replenishing Container

Figure 25A:
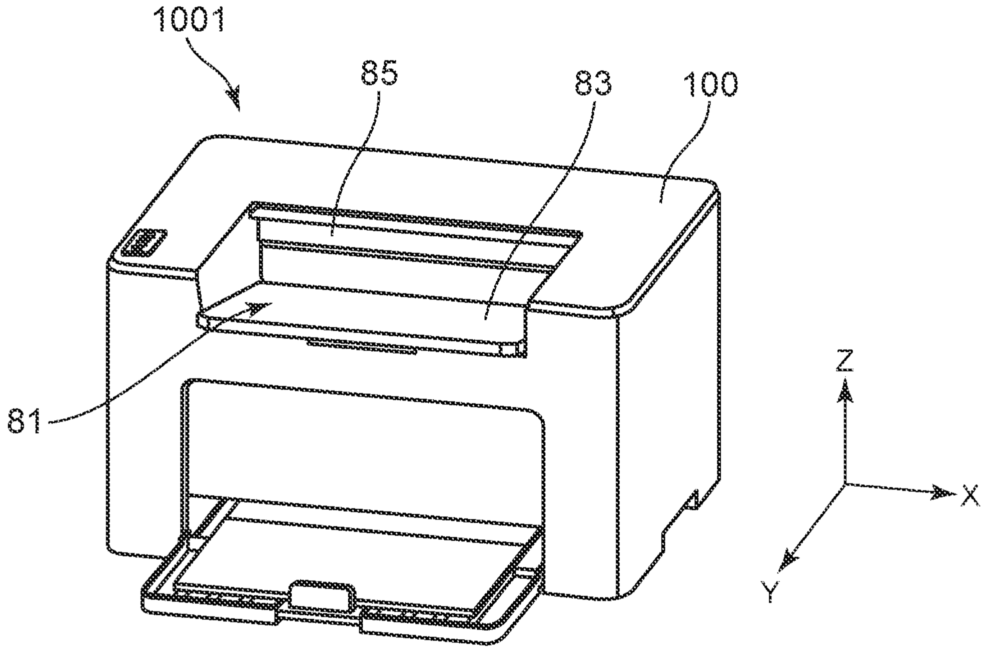
FIG. 25A is a perspective view illustrating the image forming apparatus in a state in which a cover is positioned in a closed position.
Figure 25B:
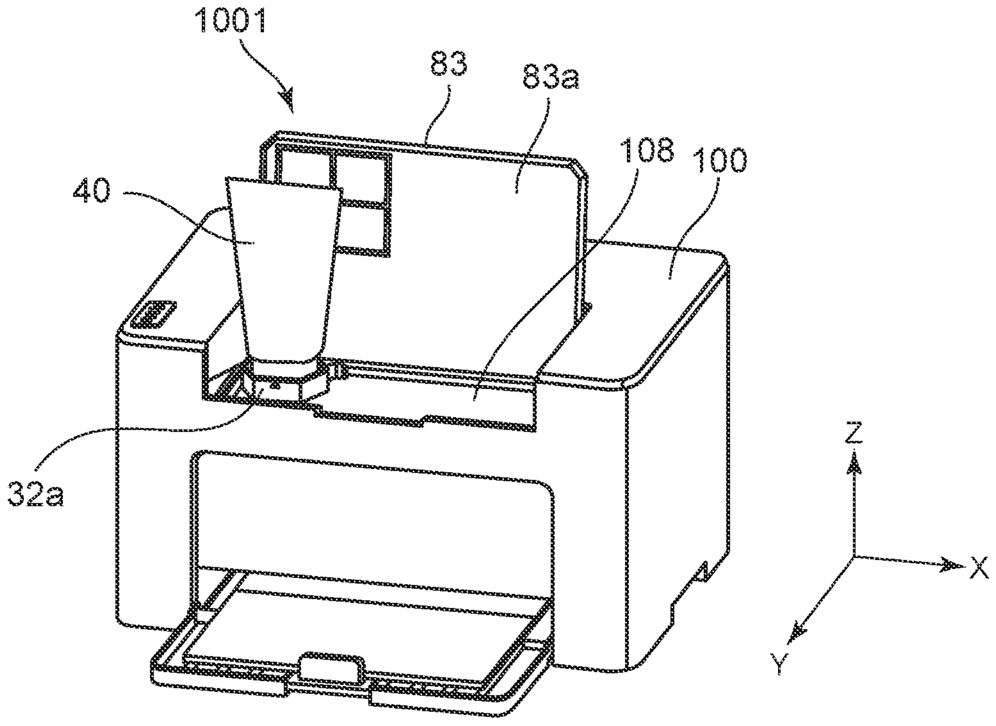
FIG. 25B is a perspective view illustrating the image forming apparatus in a state in which the cover is positioned in an opening position.

Next, using FIGS. 25A and 25B, an attachment and detachment configuration of a replenishing container will be described. FIGS. 25A and 25B are perspective views illustrating the image forming apparatus 1001. As illustrated in FIG. 25A, the sheet discharge port 85 is formed in the apparatus body 100 of the image forming apparatus 1001, and the sheet discharge tray 81 is disposed near the sheet discharge port 85. A cover 83 is a part of the sheet discharge tray 81, and is openable and closable with respect to the apparatus body 100. FIG. 25A illustrates a state in which the cover 83 is positioned in a closed position, and FIG. 25B illustrates a state in which the cover 83 is positioned in an opening position.

As illustrated in FIG. 25B, when the cover 83 is opened, a cover back surface 83*a*, an upper wall 108, and the replenishing port 32*a* are exposed to the outside. The upper wall 108 serves to protect the developing container 32 from above, and the replenishing port 32*a* is used to attach the toner pack 40 so as to replenish the developer in the developing container 32. An opening is formed in the upper wall 108, and the replenishing port 32*a* is exposed from the opening. When the toner pack 40 is attached to the replenishing port 32*a*, a part of the toner pack 40 projects toward the outside of the apparatus body 100, and the movement of the cover 83 to the closed position is restricted.

When the cover 83 is in the closed position, the replenishing port 32*a* and the upper wall 108 are covered by the cover 83. At this time, the replenishing port 32*a* and the upper wall 108 face the cover back surface 83*a*. By opening the cover 83, a user can access the replenishing port 32*a*. To be noted, in the present embodiment, a direct replenishing method is adopted, so that the user replenishes the toner from the toner pack 40, filled with the toner for replenishment, to the developing unit 30 in a state in which the developing unit 30 (process cartridge 20) is mounted in the image forming apparatus 1001.

Therefore, since, in a case where a toner remainder in the process cartridge 20 has decreased, work of removing the process cartridge 20 from the apparatus body 100 and replacing the process cartridge 20 with new one becomes unnecessary, it is possible to improve usability. Further, it is possible to replenish the toner in the developing container 32 at a lower cost than replacing the entire process cartridge 20. To be noted, since, even in comparison with a case of replacing only the developing unit 30 of the process cartridge 20, it is not necessary to replace various rollers, gears, and the like, it is possible to reduce costs by the direct replenishment method. Further, it is acceptable to configure the process cartridge 20 in a detachable manner from the apparatus body 100.

As illustrated in FIG. 22, the image forming apparatus 1001 of the present embodiment includes a rear door 101B, serving as an exterior member and an opening/closing member. The process cartridge 20 (including the developing unit 30) is replaceable through a space appeared by opening the rear door 101B.

Configuration of Intake Unit

Figure 26:
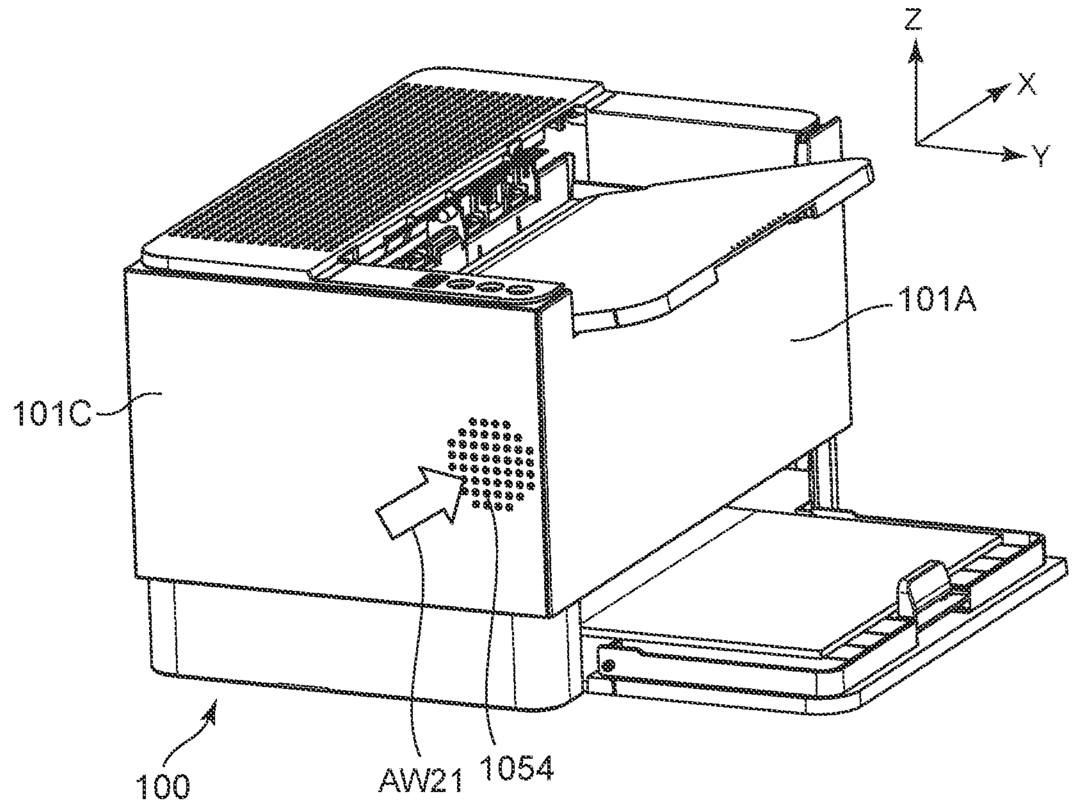
FIG. 26 is a perspective view illustrating intake holes of an exterior member.
Figure 27:
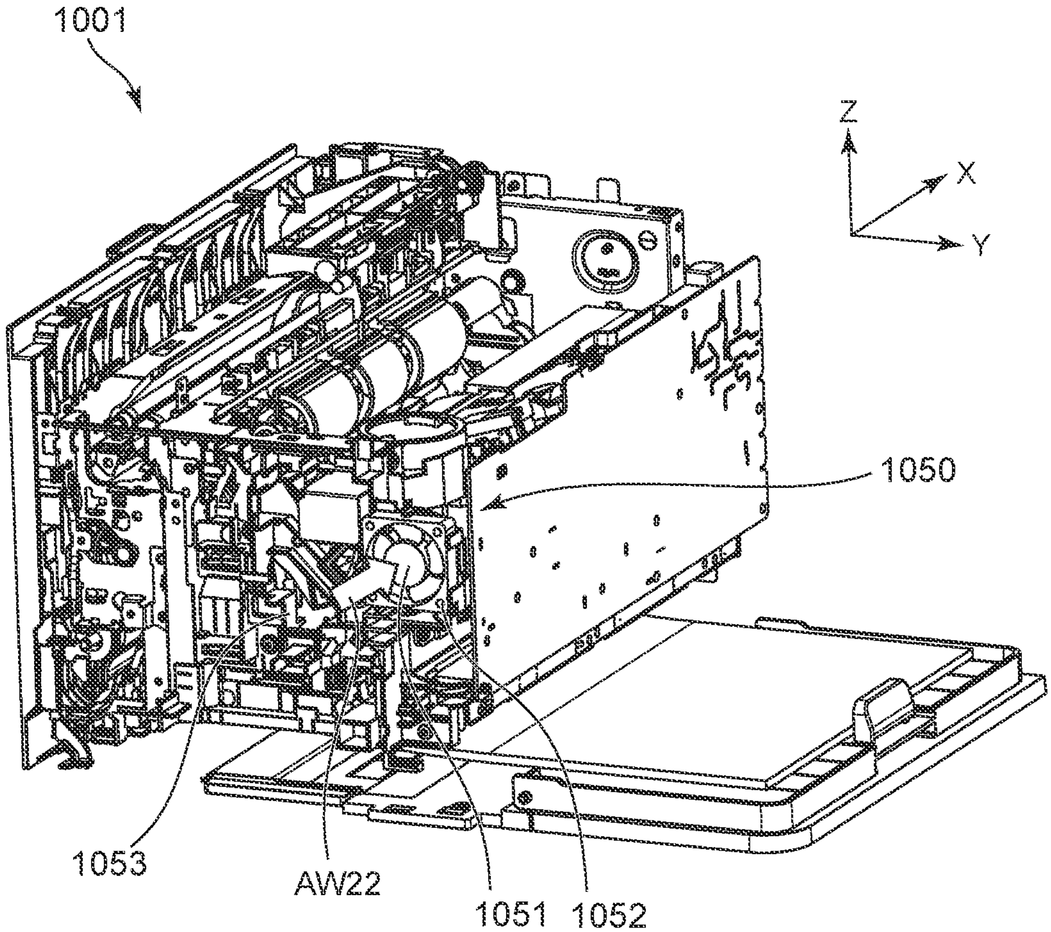
FIG. 27 is a perspective view illustrating the image forming apparatus with the exterior member hidden.
Figure 28:
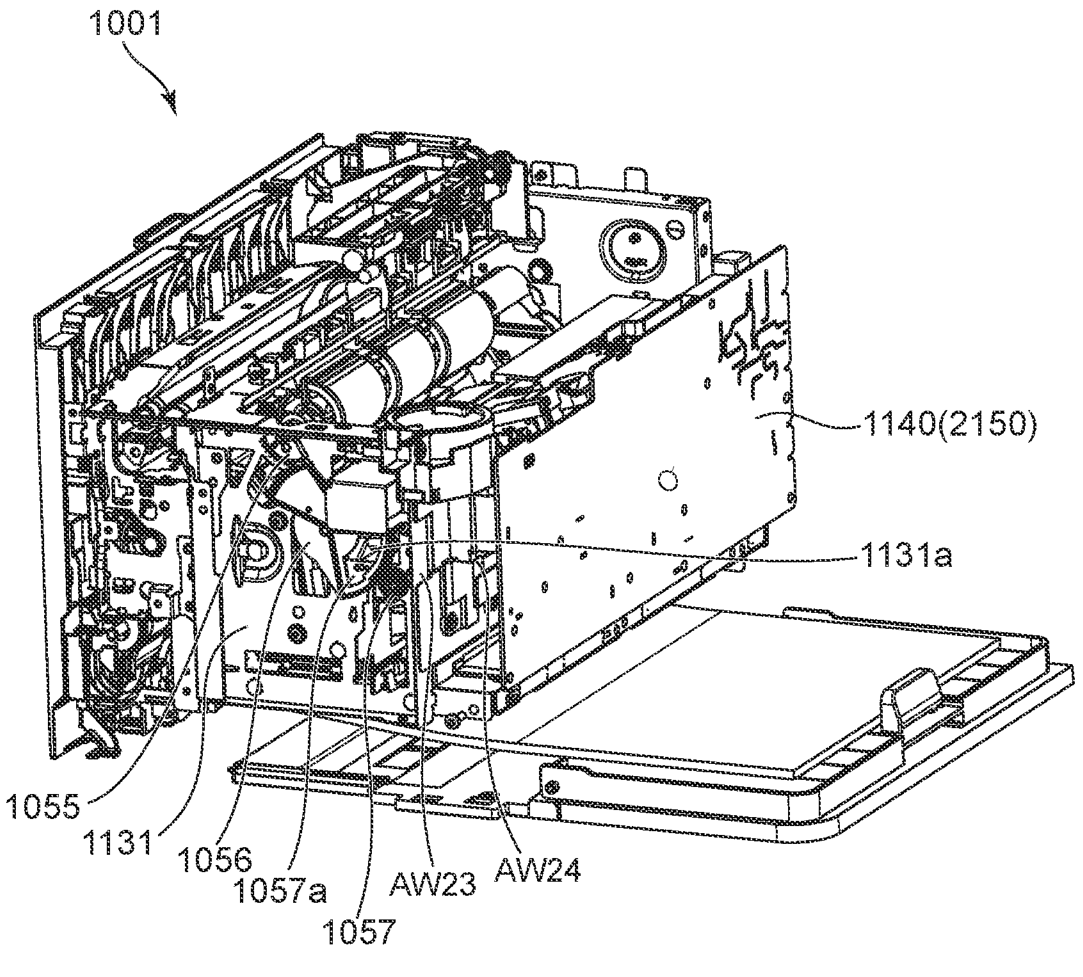
FIG. 28 is a perspective view illustrating the image forming apparatus with the exterior member and the intake unit hidden.

A configuration of the intake unit 1050 in the present embodiment will be described using FIGS. 26, 27, and 28. FIG. 26 is a perspective view illustrating the apparatus body 100, FIG. 27 is a perspective view with exterior members hidden from FIG. 26, and FIG. 28 is a perspective view with the intake fan 1051, the intake fan holder 1052, and the holder supporting member 1053 hidden from FIG. 27. The intake unit 1050 draws the outside air from intake holes 1054 disposed in a side cover 101C, serving as the exterior member, into an interior of the apparatus body 100 as represented by an airflow path AW21. The drawn air is sucked by the intake fan 1051 as represented by an airflow path AW22 illustrated in FIG. 27. The air discharged from the intake fan 1051 is divided into two paths as represented by airflow paths AW23 and AW24 illustrated in FIGS. 28 and 30, the airflow path AW23 enters inside of the first side plate 1131, and the airflow path AW24 contributes to cooling an electric board 1140. The electric board 1140 is an electric board extending in the width direction parallel to the X direction, and includes such as a high voltage power source unit and a low voltage power source unit. Since the electric board 1140 capable of supplying a power source easily overheats, an effect to suppress a temperature rise inside of the apparatus is increased by cooling using the intake fan 1051.

As illustrated in FIG. 28, replenishing separation gears 1055, 1056, and 1057 are supported by the first side plate 1131. These three gears work at a time when the user replenishes the toner as illustrated in FIG. 25B. By the action of opening the cover 83 performed by the user, the replenishing separation gears 1055, 1056, and 1057 are activated, and, by pressing a replenishing port 32*a* from below, the replenishing port 32*a* moves to the plus side in the Z direction, so that the user becomes able to access the replenishing port 32*a*. An opening portion 1057*a* is disposed in the replenishing separation gear 1057, and an opening 1131*a* is disposed in the first side plate 1131. Positions of these opening portions 1057*a* and 1131*a* overlap each other when viewed from the minus side in the X direction. In particular, at a time when the outside air is drawn by the intake unit 1050, the opening portion 1057*a* of the replenishing separation gear 1057 and the opening portion 1131*a* of the first side plate 1131 are positioned in overlapping positions. By passing through these opening portions 1057*a* and 1131*a*, the airflow path AW23 enters inside of the first side plate 1131.

Configuration of Airflow Path in Interior of Apparatus Body

Figure 29:
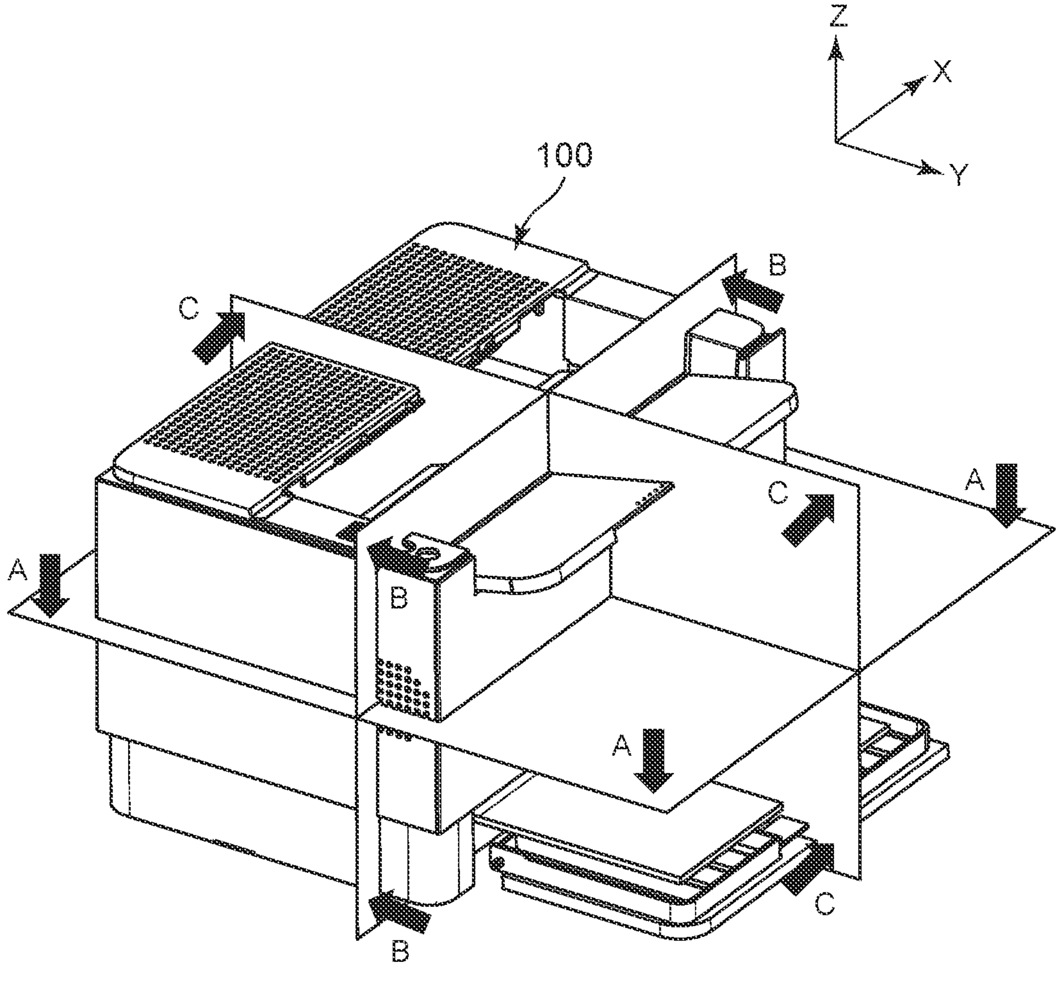
FIG. 29 is a perspective view illustrating an apparatus body.
Figure 31:
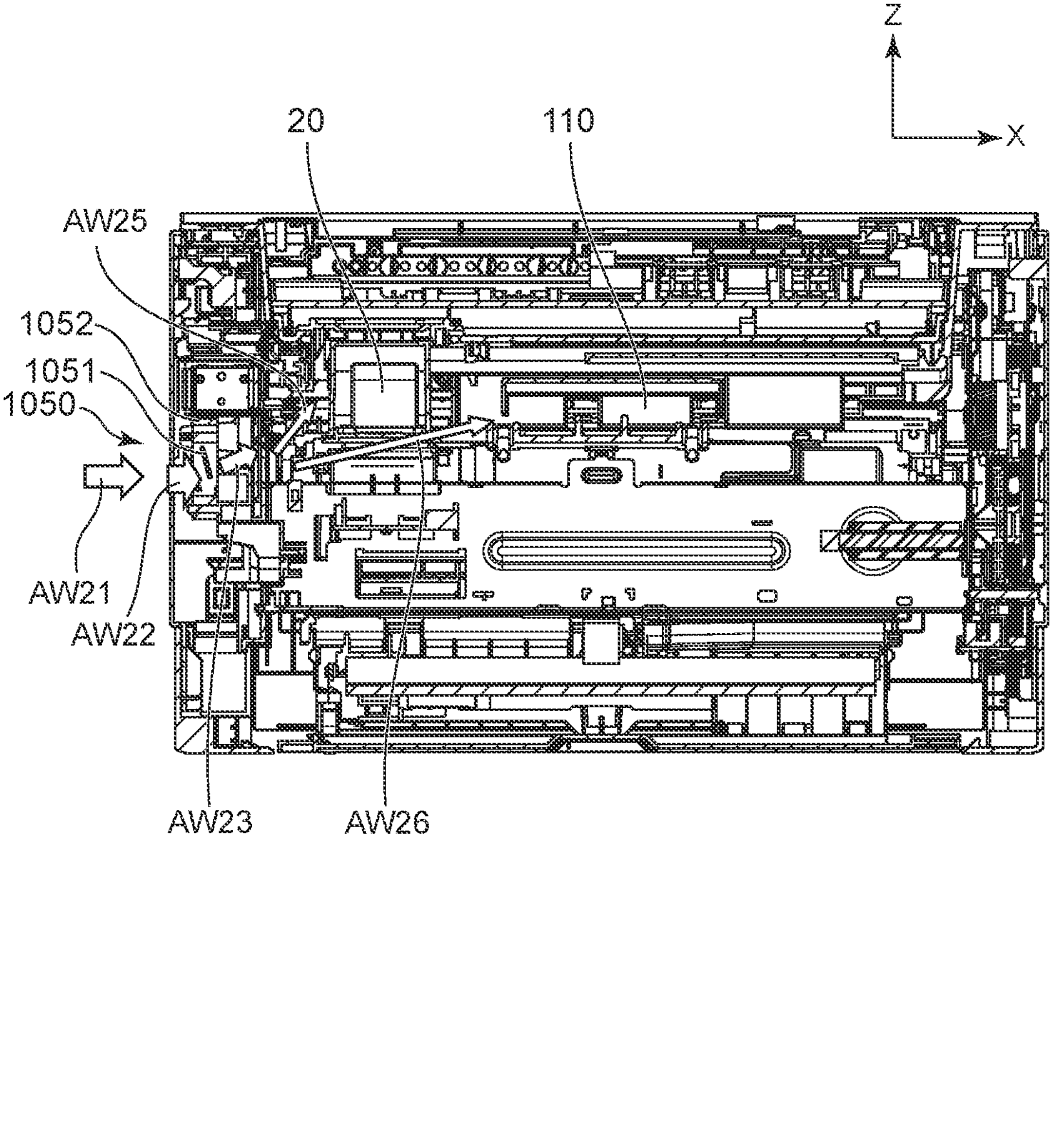
FIG. 31 is a cross-sectional view illustrating a cross section B-B of FIG. 29.
Figure 32:
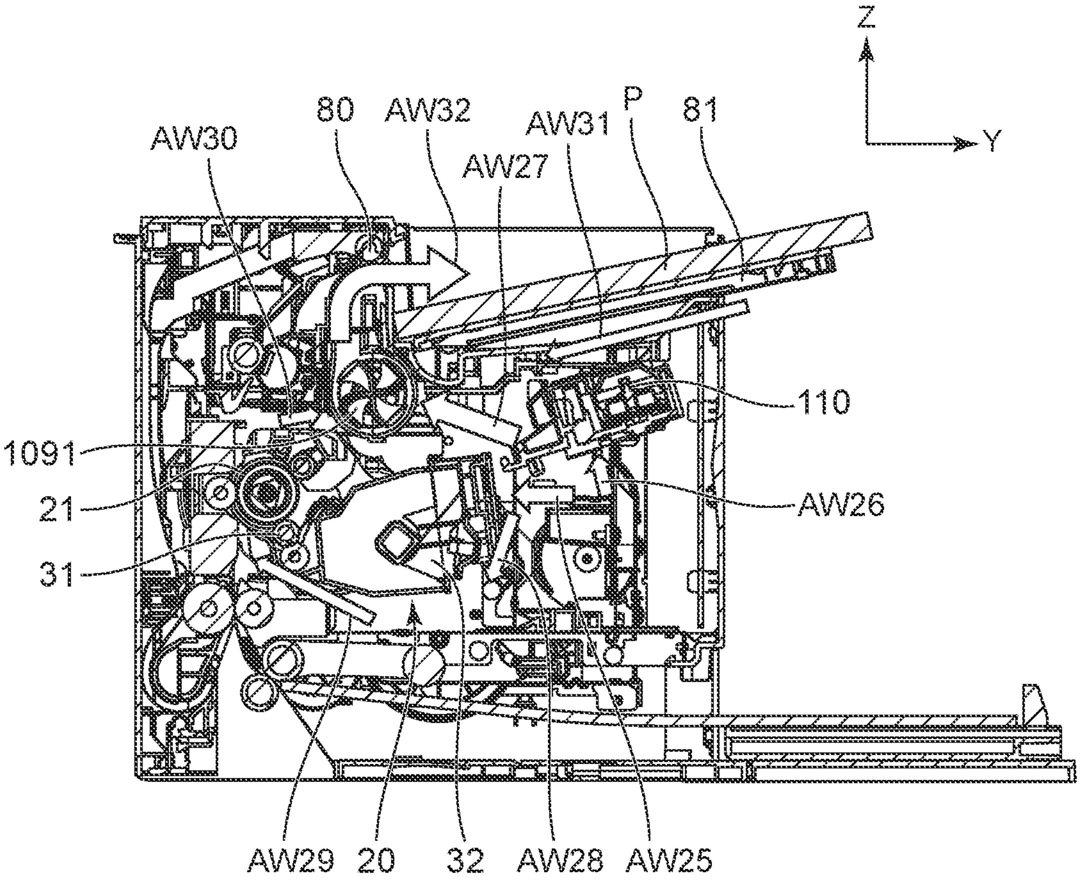
FIG. 32 is a cross-sectional view illustrating a cross section C-C of FIG. 29.

So as to describe airflow paths in an interior of the sheet metal frame 1130, cross sections are taken as illustrated in FIG. 29, and cross sections A-A, B-B, and C-C are respectively illustrated in FIGS. 31, and 32.

Figure 30:
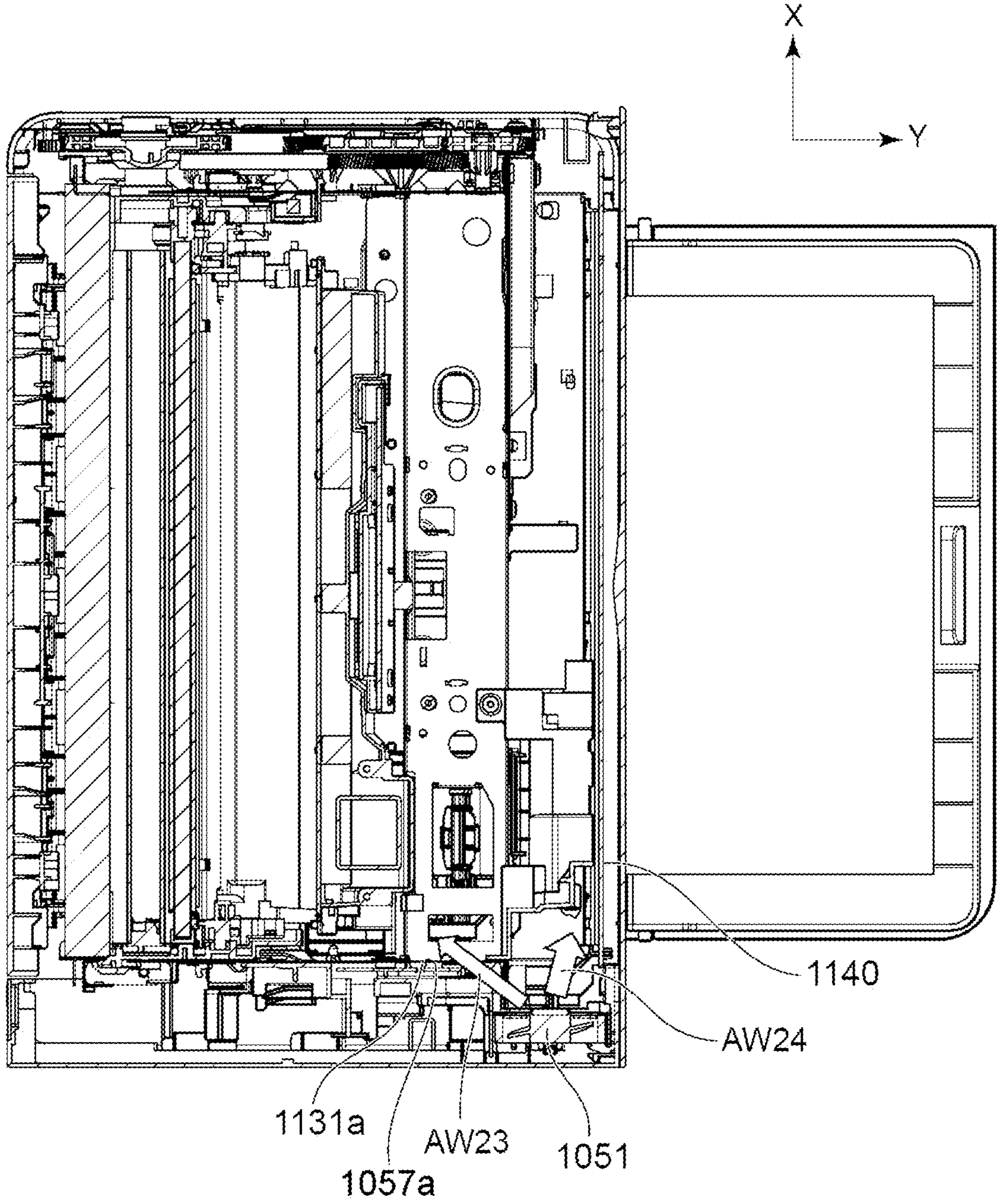
FIG. 30 is a cross-sectional view illustrating a cross section A-A of FIG. 29.

The airflow paths AW23 and AW24 illustrated in FIG. 28 are also illustrated in FIG. 30, and a state in which the airflow path AW23 passes through the opening portions 1057*a* and 1131*a* is illustrated in FIG. 30.

In the cross section B-B illustrated in FIG. 31, a state in which the airflow path AW23 branches into airflow paths AW25 and AW26 in the interior of the apparatus body 100 is illustrated. The airflow path AW25 proceeds toward the process cartridge 20, and the airflow path AW26 proceeds toward the scanner 110.

The airflow paths AW25 and AW26 are also illustrated in a cross section C-C illustrated in FIG. 32. After having passed through the vicinity of the scanner unit 110 and contributed to cooling the scanner unit 110, as with an airflow path AW27, the airflow path AW26 is drawn by the exhaust fan 1091. Part of the airflow path AW25 proceeding toward the process cartridge 20 merges with the airflow path AW27, and, as with an airflow path AW28, the other part of the airflow path AW25 proceeds to a lower side (minus side in the Z direction) of the apparatus body. By passing through the vicinity of the developing container 32, the airflow paths AW28 and AW29 contribute to cooling the developing container 32, and it is possible to prevent the solidification of the toner before development. Thereafter, after having passed through the vicinity of the photosensitive drum 21 and having ascended to the plus side in the Z direction, as with an airflow path AW30, the airflow path AW29 is drawn by the exhaust fan 1091. The exhaust fan 1091 discharges the air to the outside of the apparatus body as represented by an airflow path AW32, and contributes to cooling the sheet discharge roller pair 80 and the sheet P stacked on the sheet discharge tray 81.

In the present embodiment, the airflow quantity of the exhaust unit 1090 is set so as to become slightly larger with respect to the airflow quantity of the intake unit 1050. Therefore, airflow paths, such as an airflow path AW31, different from the airflow paths generated by the intake unit 1050 are generated. This airflow path is a path of the outside air passing through small gaps of such as the exterior members 101A and 101C.

To be noted, since there are gaps in the interior of the apparatus body 1001, the air flows through paths other than the airflow paths AW21 to AW30. The airflow paths AW21 to AW30 are main airflow paths between the intake unit 1050 and the exhaust unit 1090.

Configuration of Exhaust Unit

Figure 33A:
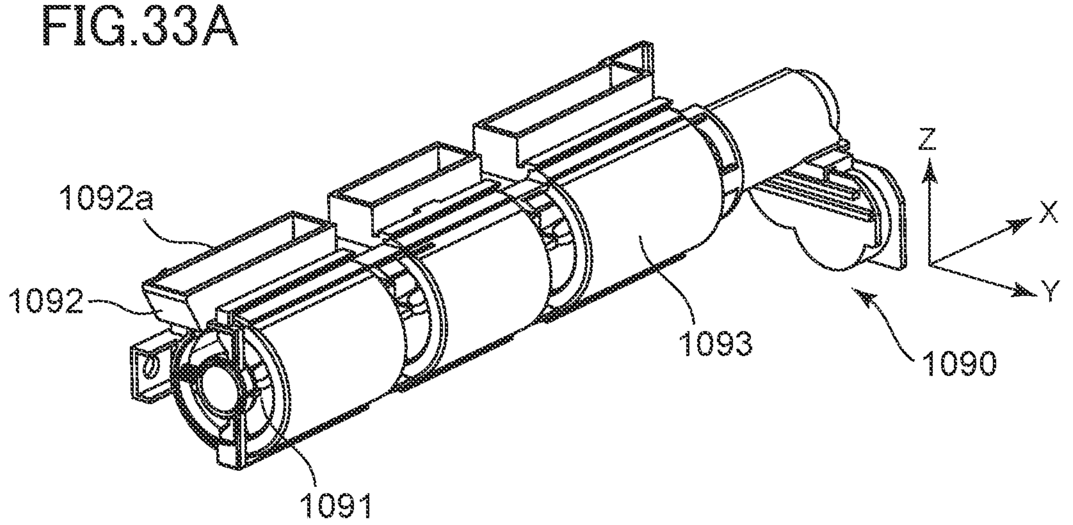
FIG. 33A is a perspective view illustrating the exhaust unit.

For the description of the exhaust unit 1090, a perspective view of the exhaust unit 1090 is illustrated in FIG. 33A. The exhaust unit 1090 includes the exhaust fan 1091, an exhaust fan holder 1092, supporting the exhaust fan 1091, and a holder cover 1093, supported by the exhaust fan holder 1092 and forming a duct. As illustrated in FIG. 24A, the exhaust fan holder 1092 is fixed to the back sheet metal stay 1134. Next, a perspective view with the holder cover 1093 of FIG.

Figure 33B:
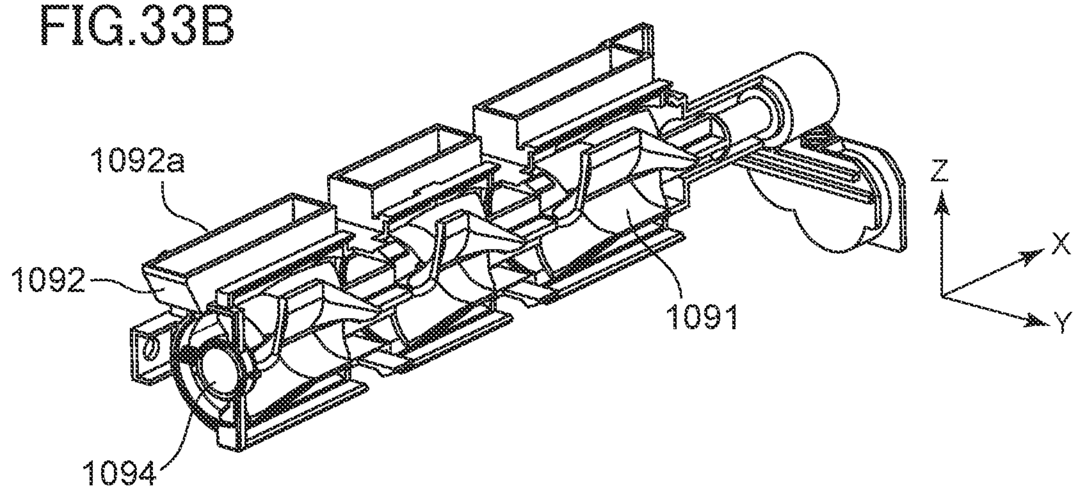
FIG. 33B is a perspective view illustrating the exhaust unit with a holder cover hidden.
Figure 33C:
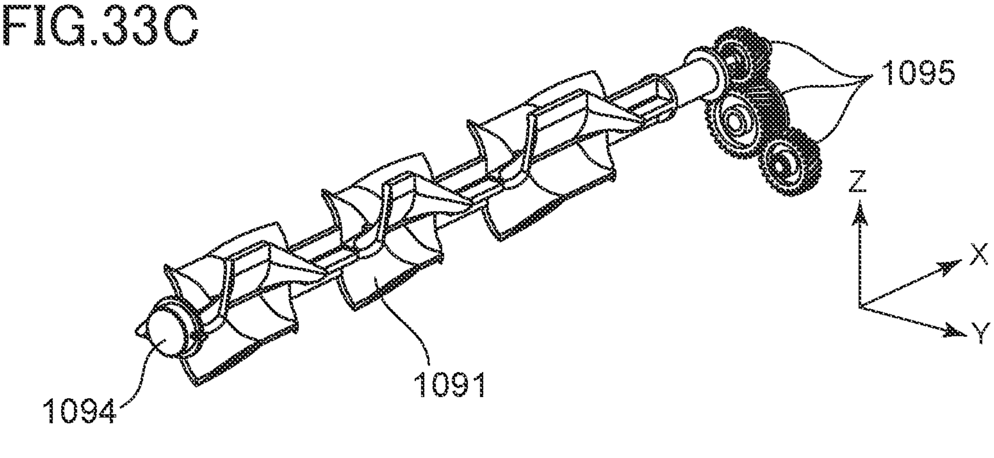
FIG. 33C is a perspective view illustrating the exhaust unit with an exhaust fan holder and the holder cover hidden.

33A hidden is illustrated in FIG. 33B. An end on the minus side in the X direction of the exhaust fan 1091 is supported by an exhaust fan bearing 1094, and the exhaust fan bearing 1094 is supported by the exhaust fan holder 1092. Next, a perspective view with the exhaust fan holder 1092 and holder cover 1093 of FIG. 33A hidden is illustrated in FIG. 33C. The exhaust fan 1091 is driven by a gear train 1095 constituted by three gears.

Figure 34A:
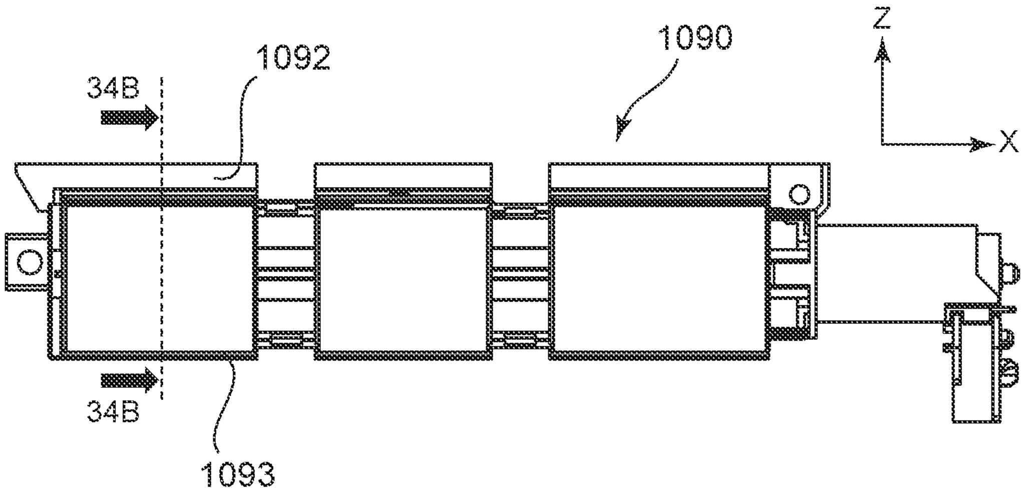
FIG. 34A is a cross-sectional view illustrating the exhaust unit.
Figure 34B:
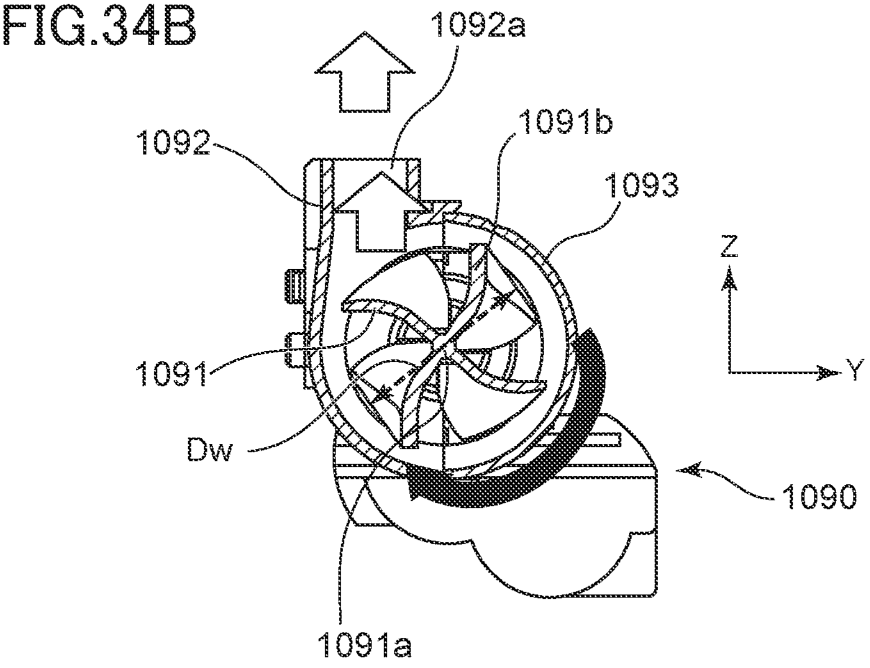
FIG. 34B is a cross-sectional view illustrating a cross section 34B-34B of FIG. 34A.

For the description of a blade shape of the exhaust fan 1091, a cross section 34B-34B of FIG. 34A is illustrated in FIG. 34B. In FIG. 34B, the exhaust fan 1091 rotates in the clockwise direction. In the present embodiment, the exhaust fan 1091 has a blade shape generally referred to as a turbofan (centrifugal fan). Other blade shapes such as a sirocco fan and a cross-flow fan can be used. The airflow is guided by a duct shape formed by the exhaust fan holder 1092 and the holder cover 1093, and is discharged from an opening portion 1092*a*. As illustrated in FIG. 22, the air discharged from the opening portion 1092*a* is guided to the sheet discharge port 85 by a duct 87. Then, the air discharged by the exhaust unit 1090 passes through the discharge port 85, and is blown to the sheet P stacked on the sheet discharge tray 81. Thereby, it is possible to cool the sheet P on the sheet discharge tray 81. As illustrated in FIG. 34B, a diameter of a rotation locus of the blade 1091*b* is defined by a diameter Dw. The exhaust fan 1091 includes a rotation shaft 1091*a* and four blades 1091*b* blowing the air by rotating integrally with the rotation shaft 1091*a*. The four blades 1091*b* are disposed, on the rotation shaft 1091*a*, at three different positions in the X direction. The length Lw (refer to FIG. 36C) of the blades 1091*b* in the X direction is longer than the diameter Dw of the rotation locus of the blade 1091*b*. To be noted, the length Lw is a distance from a first end to a second end in the X direction of the blades 1091*b* disposed on the rotation shaft 1091*a*.

As described above, since it is possible to uniformly efficiently deliver the air to a wide cooling object, the exhaust fan 1091 has a characteristic of capable of preventing left/right unevenness in cooling in the width direction. Further, since, by configuring the exhaust fan 1091 in a manner so as to be long in the width direction, it is possible to increase a total area of the exhaust fan 1091, it is possible to ensure a large airflow quantity even by slow rotation. To be noted, in the X direction, the width of the intake unit 1050 is shorter than the width of the exhaust unit 1090. Therefore, by miniaturizing the intake unit 1050 disposed outside in the X direction of the sheet metal frame 1130, it is possible to miniaturize the apparatus body 100 in the X direction.

Figure 35A:
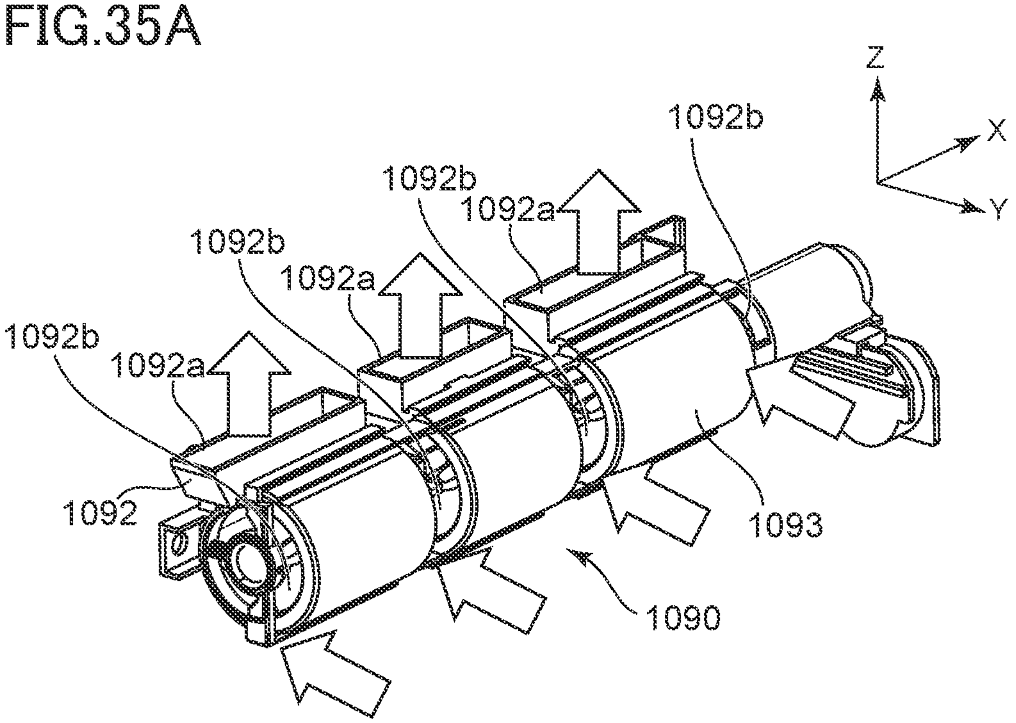
FIG. 35A is a perspective view for illustrating airflow paths of the exhaust unit.
Figure 35B:
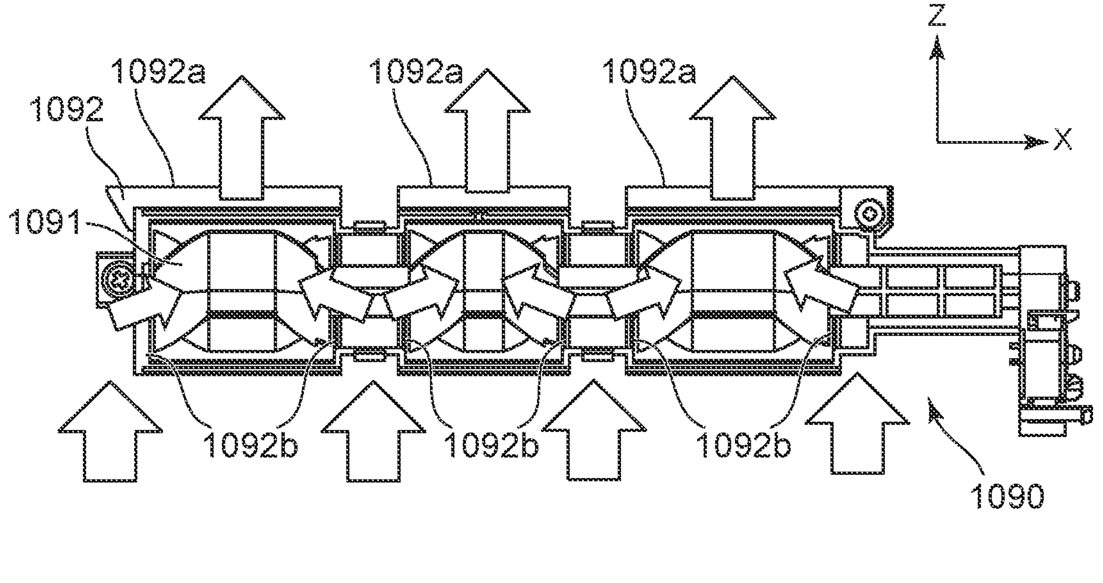
FIG. 35B is a front view for illustrating the airflow paths of the exhaust unit.

For the description of airflow paths of the exhaust unit 1090, a perspective view of the exhaust unit 1090 is illustrated in FIG. 35A, and FIG. 35B is a diagram illustrating the exhaust unit 1090 viewed from the plus side in the Y direction with the holder cover 1093 hidden. As illustrated in FIG. 35A, the exhaust unit 1090 draws the air from opening portions 1092*b* formed by the exhaust fan holders 1092 and the holder covers 1093, and discharges the air from the opening portions 1092*a* disposed in the exhaust fan holders 1092. As illustrated in FIG. 35B, in the present embodiment, six opening portions 1092*b* are disposed, and the six opening portions 1092*b* form three pairs of opening portions 1092*b*. When the air passes through the paired opening portions 1092*b*, airflow directions approach each other in a rotation axis direction (X direction) of the exhaust fan 1091. The blade shape of the exhaust fan 1091 near the opening portion 1092*b* is twisted (refer to FIG. 33C), and, thereby, an effect to draw the air in the rotation axis direction (X direction) is enhanced. To be noted, it is acceptable to change the magnitudes of twists on the left and right sides of the exhaust fan 1091 as necessary. Since, when there is a high air resistance in downstream airflow, the efficiency is sometimes improved by narrowing the size of the opening portion 1092*b* proportionally to the resistance, it is acceptable to change each size of the opening portions 1092*b* depending on the situation.

Figure 36A:
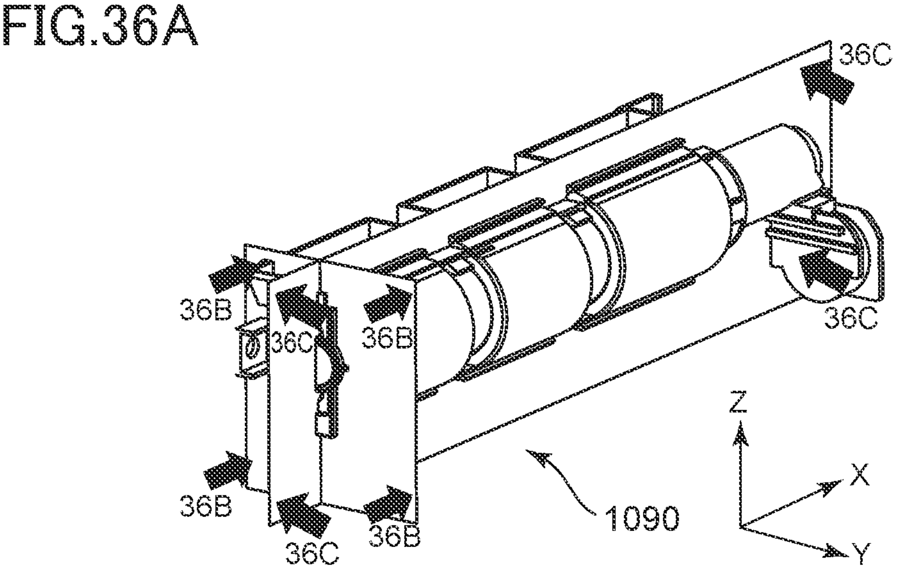
FIG. 36A is a perspective view illustrating the exhaust unit.
Figure 36B:
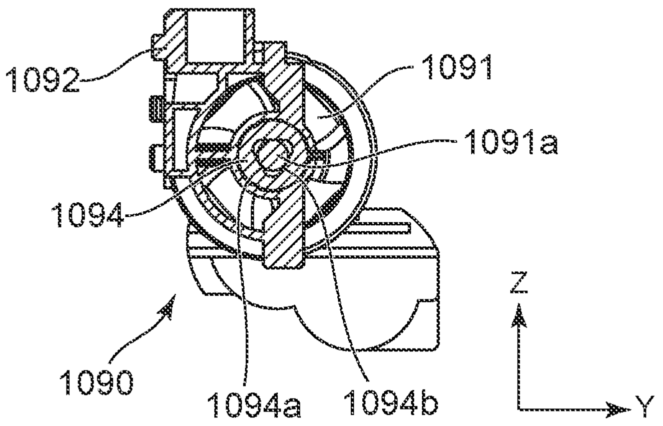
FIG. 36B is a cross-sectional view illustrating a cross section 36B-36B of FIG. 36A.
Figure 36C:
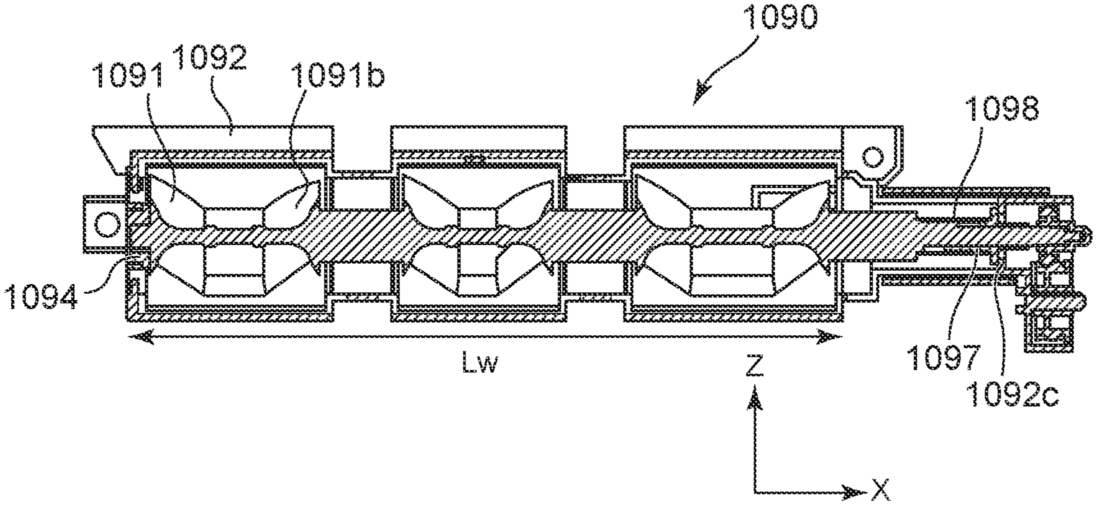
FIG. 36C is a cross-sectional view illustrating a cross section 36C-36C of FIG. 36A.

For the description of a configuration for suppressing the noise and the vibration of the exhaust unit 1090, a perspective view of the exhaust unit 1090 is illustrated in FIG. 36A. FIG. 36B illustrates a cross section 36B-36B of FIG. 36A, and FIG. 36C illustrates a cross section 36C-36C of FIG. 36A. As illustrated in FIG. 36B, a shape in which the exhaust fan bearing 1094 holds the rotation shaft 1091*a* is an inverted triangle. The exhaust fan 1091 always leans toward the minus side in the Z direction by the gravitational force. Therefore, the rotation shaft 1091*a* is supported by two surfaces 1094*a* and 1094*b* on the minus side in the Z direction of the exhaust fan bearing 1094 without rattling. Therefore, it is possible to suppress the noise and the vibration during the rotation of the exhaust fan 1091. In a case where force acting on the rotation shaft 1091*a* is directed to a direction other than the minus side in the Z direction by such as the airflow path resistance or the driving force of the gear, it is necessary to adjust directions of the two surfaces supporting the rotation shaft 1091*a*.

Further, as illustrated in FIG. 36C, an abutment member 1097 is disposed to the exhaust fan 1091. The abutment member 1097 is rotatably supported by the exhaust fan 1091, and rotates integrally with the exhaust fan 1091. Further, an urging member 1098 is disposed between the exhaust fan 1091 and the abutment member 1097. The urging member 1098 includes a compression spring made of a coiled spring wire material. By the urging member 1098, the exhaust fan 1091 is urged to the minus side in the X direction, and the abutment member 1097 is urged to the plus side in the X direction. Thereby, the exhaust fan 1091 comes into contact with the exhaust fan bearing 1094, and the abutment member 1097 comes into contact with a contacted portion 1092*c* disposed in the exhaust fan holder 1092. The noise and the vibration are suppressed by suppressing the excessive vibration of the exhaust fan 1091 in the Y or Z direction by friction force acting on these contact portions. Further, since, generally, the noise and the vibration of a gear drive are increased when loads on driven units are too low, it is possible to suppress the noise and the vibration by maintaining the load on the exhaust fan 1091 at or above a certain level by the urging member 1098.

Cooling Effect by Combination of Intake Unit and Exhaust Unit

As described above, the exhaust unit 1090 contributes to discharging the air, having a relatively high temperature with respect to the outside air, from the interior of the apparatus body 100, and the intake unit 1050 contributes to drawing the outside air, having a relatively low temperature with respect to the air in the interior of the apparatus body 100, into the interior of the apparatus body 100.

In the present embodiment, by arranging the units requiring cooling between the exhaust unit 1090 and the intake unit 1050, the cooling of various units is performed more efficiently without increasing the number of ducts guiding the air more than necessary.

In the present embodiment, by arranging the scanner unit 110 and the process cartridge 20 between the exhaust unit 1090 and the intake unit 1050, the cooling of these units are performed efficiently. That is, a cooling object units 2150 of the present embodiment include the scanner unit 110 and the process cartridge 20. Further, the cooling object units 2150 include an electric board 1140 (refer to FIG. 28). In particular, by the combination of air intake and exhaust, flow rates of flows in a route of the airflow paths AW26 to AW27 and in a route proceeding the airflow paths AW25, AW28, AW29, and AW30 sequentially are increased, and the cooling performance around these flows is greatly increased. Thereby, it is possible to prevent the solidification of the toner stored inside of the developing container 32 by suppressing a temperature rise of the process cartridge 20. Further, by suppressing temperature rises of the drive motor 1121 and a motor disposed inside of the scanner unit 110, it is possible to drive these motors for a longer time.

In the present embodiment, further, so as to contribute to increasing the cooling performance of these exhaust unit 1090 and intake unit 1050, the exhaust unit 1090 is disposed above (plus side in the Z direction) the units which require the cooling, and the airflow path AW24 (airflow path after having entered inside of the sheet metal frame 1130) generated by the intake unit 1050 is disposed below (minus side in the Z direction) the process cartridge 20 and the scanner unit 110. Since, generally, warmer air rises upward, basically, the air naturally flows from below to above also in the interior of the apparatus body 100 without disposing a fan. Therefore, by constructing the airflow paths in a manner so as to accelerate a natural flow of the air, the cooling performance is efficiently increased.

In the present embodiment, further, so as to contribute to increasing the cooling performance, the exhaust unit 1090 is arranged inside of the sheet metal frame 1130, and the intake unit 1050 is arranged outside of the sheet metal frame 1130. Since, with this arrangement relationship, it is possible to expand a space between the exhaust unit 1090 and the intake unit 1050, it is possible to cool a wider range of units.

In the present embodiment, further, so as to contribute to increasing the cooling performance, the exhaust unit 1090 and the intake unit 1050 are fixed to the sheet metal frame 1130 in directions different from each other. Since, with respect to the sheet metal frame 1130, the exhaust unit 1090 and the intake unit 1050 are respectively fixed on the plus side in the Z direction and on the minus side in the X direction, with this arrangement relationship, the number of units arranged between the exhaust unit 1090 and the intake unit 1050 is increased, and it is possible to cool a wider range of units.

Figure 37A:
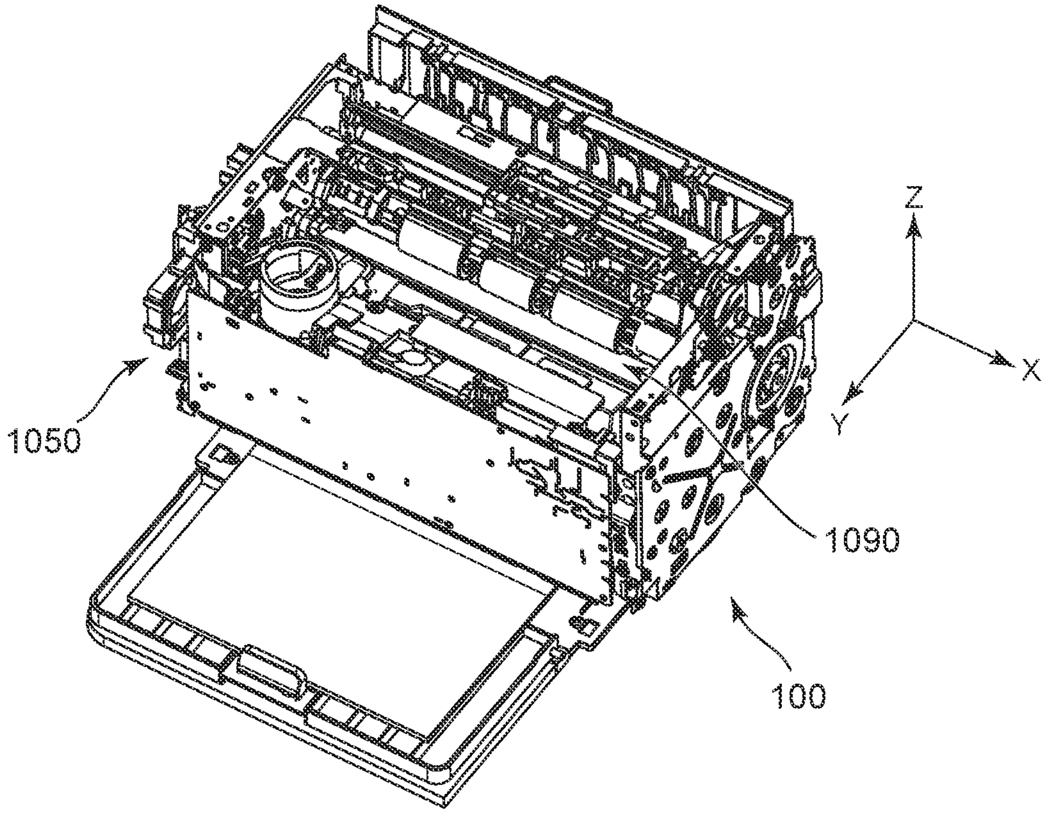
FIG. 37A is a perspective view illustrating the apparatus body.
Figure 37B:
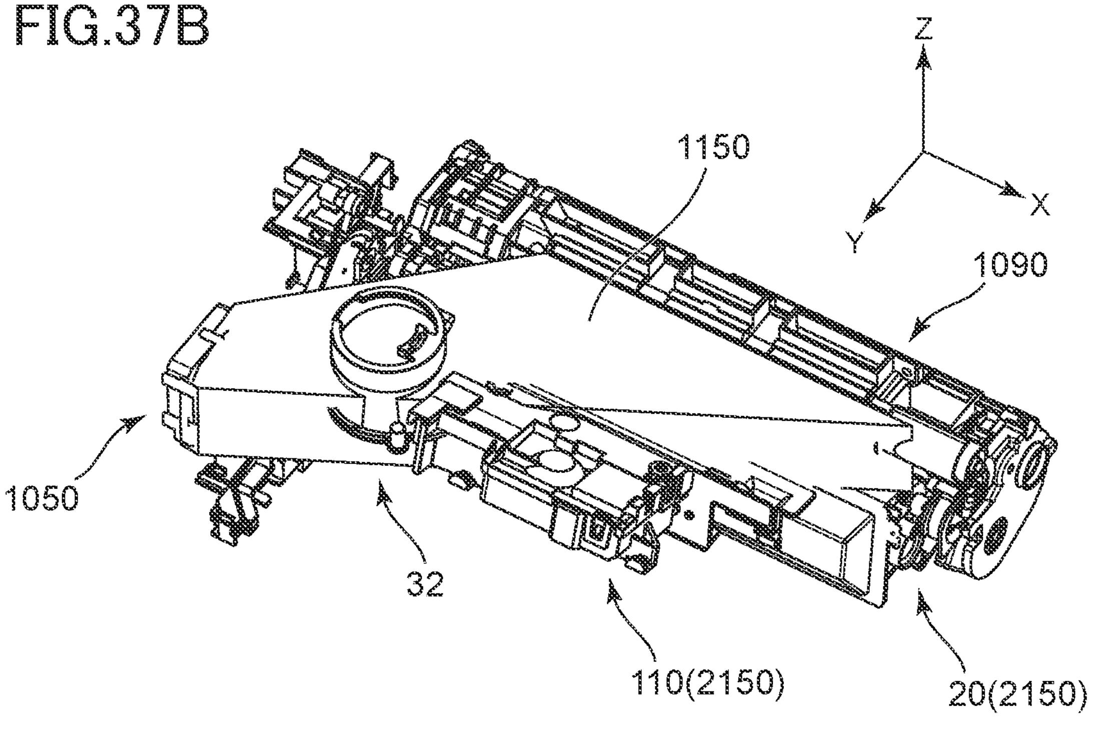
FIG. 37B is a perspective view illustrating a cooling area.

Here, a perspective view of the apparatus body 100 with the exterior members hidden is illustrated in FIG. 37A, and a perspective view illustrating only the intake unit 1050, the exhaust unit 1090, the process cartridge 20, and the scanner unit 110 is illustrated in FIG. 37B. Since, so as to avoid interference between the storage portion 32*c* and the exhaust unit 1090 at a time of the attachment and detachment of the process cartridge 20 in the Y direction, it is not possible to arrange the exhaust unit 1090 on the minus side in the X direction, the exhaust unit 1090 is arranged with a bias toward the plus side in the X direction. On the other hand, the intake unit 1050 is arranged on the minus side in the X direction. Here, an area 1150 connecting the intake fan 1051 and the exhaust fan 1091 is illustrated in FIG. 37B. As described above, by arranging the intake unit 1050 and the exhaust unit 1090 on the sides opposite to each other in the X direction of the apparatus body 100, it is possible to expand the area 1150, and is possible to efficiently cool this area 1150. Thereby, it is possible to efficiently cool the process cartridge 20, the storage portion 32*c*, and the scanner unit 110, which at least partly overlap the area 1150.

Other Embodiments

To be noted, while, in any of the embodiments described above, the heater 74 directly comes into contact with the fixing film 71, it is not limited to this. For example, it is acceptable that the heater 74 comes into contact with the fixing film 71 via a sheet material, such as iron alloy and aluminum, having good thermal conductivity.

Further, while, in the first to sixth embodiments, the cooling object units 150 include the drive motor 121, the scanner unit 110, and the process cartridge 20, it is not limited to this. For example, it is acceptable that the cooling object units 150 include any one or any two of the drive motor 121, the scanner unit 110, and the process cartridge 20, and is acceptable that, in addition to these, other units are cooled. Further, even in the seventh embodiment, it is acceptable to include the drive motor 1121 as the cooling object.

Further, while, in any of the embodiments described above, the intake unit is shorter than the exhaust unit in width in the X direction, it is not limited to this. For example, it is acceptable that the intake unit is longer than the exhaust unit in width in the X direction.

Further, while, in the first to sixth embodiments, the exhaust unit is fixed to the back sheet metal stay 135, it is not limited to this. For example, it is acceptable that the exhaust unit is fixed to such as the front sheet metal stay 133, the center sheet metal stay 134, the first side plate 131, or the second side plate 132.

Further, while, in any of the embodiments described above, the process cartridge 20 is configured in such a manner in which the photosensitive drum 21 and the developing unit 30 are integrated with each other, it is not limited to this. For example, it is acceptable to configure such that the process cartridge 20 can be divided into a drum cartridge, supporting the photosensitive drum 21, and a developing cartridge, supported by the drum cartridge and including the developing unit 30. In this case, it is acceptable as long as, at least, it is possible to cool the developing cartridge, serving as a cartridge, by an airflow path formed by the intake unit and the exhaust unit.

Further, while, in the seventh embodiment, the intake unit includes the intake fan 1051 incorporating the motor M1, it is not limited to this. For example, it is acceptable that the intake fan 1051 is driven by the drive motor 1121 or other motors without incorporating the motor M1. Further, in the first to sixth embodiment, it is acceptable that the intake unit 50 includes an intake fan incorporating a motor.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-100483, filed Jun. 22, 2022, Japanese Patent Application No. 2022-100037, filed Jun. 22, 2022, and Japanese Patent Application No. 2023-077857, filed May 10, 2023, which are hereby incorporated by reference herein in their entirety.

What is claimed is:

1. An image forming apparatus forming an image on a sheet conveyed in a sheet conveyance direction, the image forming apparatus comprising:

a frame including a first side plate and a second side plate disposed in parallel in a width direction orthogonal to the sheet conveyance direction;

an intake unit disposed on an outer side of the frame in the width direction and configured to draw air into an interior of the frame;

an exhaust unit disposed between the first side plate and the second side plate and configured to discharge air outside of the frame; and a cooling object unit disposed on a path of the air which is drawn into the interior of the frame by the intake unit and moves toward the exhaust unit, wherein the exhaust unit includes a rotation shaft extending in the width direction and a blade configured to blow the air by rotating along with the rotation shaft, and wherein a length of the blade in the width direction is longer than a diameter of a rotation locus of the blade.

2. The image forming apparatus according to claim 1, wherein the exhaust unit is disposed above the intake unit in a vertical direction, and wherein at least a part of the cooling object unit is disposed between the intake unit and the exhaust unit in the vertical direction.

3. The image forming apparatus according to claim 1, wherein, in the width direction, a width of the intake unit is shorter than a width of the exhaust unit.

4. The image forming apparatus according to claim 1, further comprising:

a stacking portion on which the sheet discharged outside of the image forming apparatus is stacked; and a duct configured to guide the air discharged from the exhaust unit toward the stacking portion.

5. The image forming apparatus according to claim 1, wherein an airflow quantity of the exhaust unit is equal to or more than an airflow quantity of the intake unit.

6. The image forming apparatus according to claim 1, wherein, in the width direction, a width of the blade is shorter than a width of a maximum size sheet usable by the image forming apparatus.

7. The image forming apparatus according to claim 1, wherein the frame includes a connection frame extending in the width direction and configured to connect the first side plate and the second side plate, and wherein the exhaust unit is fixed to the connection frame.

8. The image forming apparatus according to claim 1, wherein the cooling object unit includes an exposure unit configured to expose a photosensitive member.

9. The image forming apparatus according to claim 1, wherein the cooling object unit includes a cartridge including a developing unit configured to develop an electrostatic latent image formed on a photosensitive member.

10. The image forming apparatus according to claim 9, wherein the intake unit is disposed on an opposite side to the first side plate with respect to the second side plate in the width direction.

11. The image forming apparatus according to claim 10, wherein the intake unit is disposed between an exterior member of the image forming apparatus and the second side plate.

12. The image forming apparatus according to claim 10, wherein the cooling object unit includes a driving source configured to drive the cartridge, the exhaust unit and the intake unit, and wherein the driving source is fixed to the second side plate and is disposed between the first side plate and the second side plate in the width direction.

13. The image forming apparatus according to claim 9, wherein the intake unit is disposed on an opposite side to the second side plate with respect to the first side plate in the width direction.

14. The image forming apparatus according to claim 13, wherein the intake unit is disposed between an exterior member of the image forming apparatus and the first side plate.

15. The image forming apparatus according to claim 13, wherein the cartridge and the exhaust unit are configured to be driven by a driving source, and wherein the driving source is fixed to the second side plate, and disposed between the first side plate and the second side plate in the width direction.

16. The image forming apparatus according to claim 15, wherein the intake unit includes a fan configured to be driven by a motor different from the driving source.

17. The image forming apparatus according to claim 13, wherein the exhaust unit is disposed in a position closer to the second side plate than the first side plate in the width direction.

18. The image forming apparatus according to claim 13, wherein the cooling object unit includes an electric board capable of providing a power source.

* * * * *